(12) United States Patent
Assat et al.

(10) Patent No.: US 11,848,414 B2
(45) Date of Patent: Dec. 19, 2023

(54) ELECTROLYTE MATERIAL AND METHODS OF FORMING

(71) Applicant: SAINT-GOBAIN CERAMICS & PLASTICS, INC., Worcester, MA (US)

(72) Inventors: Gaurav Assat, Paris (FR); Vladimir Ouspenski, Saint-Pierre-lès-Nemours (FR)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 17/746,581

(22) Filed: May 17, 2022

(65) Prior Publication Data
US 2022/0376292 A1    Nov. 24, 2022

Related U.S. Application Data

(60) Provisional application No. 63/261,894, filed on Sep. 30, 2021, provisional application No. 63/189,597, filed on May 17, 2021.

(51) Int. Cl.
*H01M 10/0562* (2010.01)
*H01M 10/052* (2010.01)

(52) U.S. Cl.
CPC ..... *H01M 10/0562* (2013.01); *H01M 10/052* (2013.01); *H01M 2300/0068* (2013.01)

(58) Field of Classification Search
CPC ........... H01M 10/052; H01M 10/0562; H01M 2300/0068
See application file for complete search history.

(56) References Cited

U.S. PATENT DOCUMENTS

| | | | |
|---|---|---|---|
| 8,252,260 | B2 | 8/2012 | Iltis |
| 9,599,727 | B2 | 3/2017 | Ouspenski et al. |
| 10,854,915 | B2 | 12/2020 | Ling et al. |
| 2005/0188914 | A1 | 9/2005 | Iltis et al. |
| 2010/0098613 | A1 | 4/2010 | Iltis |
| 2019/0088995 | A1 | 3/2019 | Asano et al. |
| 2020/0075993 | A1 | 3/2020 | Ling et al. |

(Continued)

FOREIGN PATENT DOCUMENTS

| | | |
|---|---|---|
| CN | 108701860 A | 10/2018 |
| CN | 110994010 A | 4/2020 |

(Continued)

OTHER PUBLICATIONS

Baker, D. W. "A comprehensive study of the phase diagram of KxNa1—xNbO3," Applied Physics Letters, 2009, 95, pp. 091903-1-091903-3.

(Continued)

*Primary Examiner* — Osei K Amponsah
(74) *Attorney, Agent, or Firm* — Abel Schillinger, LLP; Adrian Lawrence

(57) ABSTRACT

A solid electrolyte material can include a halide material represented by $Li_{3-x-f}M_fRE_{1-y}Me^k{}_y(Cl_{1-u-p-q}Br_uF_pI_q)_{6-x+y^*(k-3)}$, wherein the halide material includes at least two halide anions. The halide material can include reduced content of one or more impurity phase, including binary halide phase, oxyhalide phase, or ternary halide phase.

20 Claims, 9 Drawing Sheets

(56) References Cited

U.S. PATENT DOCUMENTS

| | | | | |
|---|---|---|---|---|
| 2020/0127325 | A1* | 4/2020 | Takahashi | ......... H01M 10/0525 |
| 2020/0328453 | A1 | 10/2020 | Sakai et al. | |
| 2020/0328454 | A1 | 10/2020 | Sakai et al. | |
| 2020/0328456 | A1 | 10/2020 | Asano et al. | |
| 2020/0328457 | A1 | 10/2020 | Sakai et al. | |
| 2020/0328465 | A1* | 10/2020 | Sakaida | ................. C01F 17/36 |
| 2020/0350622 | A1 | 11/2020 | Sakaida et al. | |
| 2021/0269320 | A1 | 9/2021 | Kubo et al. | |
| 2021/0269324 | A1 | 9/2021 | Kubo et al. | |
| 2021/0320326 | A1 | 10/2021 | Ouspenski et al. | |
| 2021/0320327 | A1 | 10/2021 | Ouspenski et al. | |
| 2022/0045357 | A1 | 2/2022 | Ouspenski et al. | |

FOREIGN PATENT DOCUMENTS

| | | |
|---|---|---|
| CN | 111453758 A | 7/2020 |
| CN | 112928326 A | 6/2021 |
| EP | 3496202 A4 | 8/2019 |
| EP | 3496202 A1 | 12/2019 |
| JP | 2006244734 | 9/2006 |
| JP | 2018025582 A1 | 5/2019 |
| JP | 2021047980 A | 3/2021 |
| WO | 2018025582 A1 | 2/2018 |
| WO | 2019135315 A1 | 7/2019 |
| WO | 2019135316 A1 | 7/2019 |
| WO | 2019135317 A1 | 7/2019 |
| WO | 2019135318 A1 | 7/2019 |
| WO | 2019135319 A1 | 7/2019 |
| WO | 2019135320 A1 | 7/2019 |
| WO | 2019135321 A1 | 7/2019 |
| WO | 2019135322 A1 | 7/2019 |
| WO | 2019135323 A1 | 7/2019 |
| WO | 2019135328 A1 | 7/2019 |
| WO | 2019135336 A1 | 7/2019 |
| WO | 2019135341 A1 | 7/2019 |
| WO | 2019135342 A1 | 7/2019 |
| WO | 2019135343 A1 | 7/2019 |
| WO | 2019135344 A1 | 7/2019 |
| WO | 2019135345 A1 | 7/2019 |
| WO | 2019135346 A1 | 7/2019 |
| WO | 2019135347 A1 | 7/2019 |
| WO | 2019135348 A1 | 7/2019 |
| WO | 2019146216 A1 | 8/2019 |
| WO | 2019146217 A1 | 8/2019 |
| WO | 2019146218 A1 | 8/2019 |
| WO | 2019146219 A1 | 8/2019 |
| WO | 2019146236 A1 | 8/2019 |
| WO | 2019146292 A1 | 8/2019 |
| WO | 2019146293 A1 | 8/2019 |
| WO | 2019146294 A1 | 8/2019 |
| WO | 2019146295 A1 | 8/2019 |
| WO | 2019146296 A1 | 8/2019 |
| WO | 2019146308 A1 | 8/2019 |
| WO | 2020136952 A1 | 7/2020 |
| WO | 2020136954 A1 | 7/2020 |
| WO | 2020136956 A1 | 7/2020 |
| WO | 2020175171 A1 | 9/2020 |

OTHER PUBLICATIONS

Banerjee, A. et al. "Revealing Nanoscale Solid-Solid Interfacial Phenomena for Long-Life and High-Energy All-Solid-State Batteries," ACS Applied Materials & Interfaces, 2019, pp. A-H.

Bohnsack, A. et al.: "Ternary Halides of the A3 MX 6 Type. VI. Ternary Chlorides of the Rare-Earth Elements with Lithium, Li3MCl6(M=Tb-Lu, Y, Sc): Synthesis, Crystal Structures, and Ionic Motion," Physical Inorganic Chemistry, vol. 623, 1997, abstract only.

Bohnsack, A. et al., "Ternary Halides of the A3MX6 Type. VII. The Bromides Li3MBr6 (M=Sm—Lu, Y): Synthesis, Crystal Structure, and Ionic Mobility", Physical Inorganic Chemistry, vol. 623, 1997, abstract only.

Famprikis, T. et al. "Fundamentals of inorganic solid-state electrolytes for batteries." Nature Materials, 2019, 14 pages.

Hamadene, M. et al. "Phase transition, ferroelasticity and ferroelectricity in Li3InF6," Materials Letters, 27, 1996, pp. 33-39.

Lau, J. et al. "Sulfide Solid Electrolytes for Lithium Battery Applications," Advanced Energy Materials, 2018, 8, 1800933, 24 pages.

Li, X. et al. ""Progress and perspectives on halide lithium conductors for all-solid-state lithium batteries,"" Energy & Enviromental Science, vol. 13, Royal Society of Chemistry, Mar. 3, 2020, pp. 1429-1461.

Li, X. et al., "Water-Mediated Synthesis of a Superionic Halide Solid Electrolyte," Angew Chem Int Ed Engl., 2019, 58, pp. 16427-16432.

Liu, Z. et al. "High Ionic Conductivity Achieved in Li3Y(Br3Cl3) Mixed Halide Solid Electrolyte via Promoted Diffusion Pathways and Enhanced Grain Boundary," ACS Energy Letters, 2021, 6, pp. 298-304.

Mauger, A. et al. "Building Better Batteries in the Solid State: A Review," Materials, 2019, 12, 3892, pp. 1-86.

Meyer, Gerd et al. ""The Amomonium-Bromide Route to Anhydrous Rare Earth Bromides Mbr3"" Journal of the Less-Common Metals, 127, 1987, pp. 155-160.

Park, K-H. et al., ""High-Voltage Superionic Halide Solid Electrolytes for All-Solid-State Li-Ion Batteries,"" ACS Energy Letters,Jan. 30, 2020, 5, pp. 533-539.

Qie, Y. et al. ""Yttrium-Sodium Halides as Promising Solid-State Electrolytes with High Ionic Conductivity and Stability for Na-Ion Batteries,"" The Journal of Physical Chemistry Letters, 2020, 11, pp. 3376-3383.

Tomita, Y. et al. "Substitution effect of ionic conductivity in lithium ion conductor, LI3INBR6—xCLx," Solid State Ionics, 179, 2008, pp. 867-870.

Wang, S. et al., ""Lithium Chlorides and Bromides as Promising Solid-State Chemistries for Fast Ion Conductors with Good Electrochemical Stability."" Angewandte Chemie International Edition, 58.24 (2019), 8039-8043.

Yeandel, S. et al. "Structure and Lithium Ion Dynamics in Fluoride Doped Cubic LLZO (Li7La3Zr2O12) Garnet for Li Solid State Battery Applications," The Journal of Physical Chemistry, 2018, 31 pages.

Yu, C. et al. "Facile Synthesis toward the Optimal Structure-Conductivity Characteristics of the Argyrodite Li6PS5Cl Solid-State Electrolyte," Applied Materials & Interfaces, 2018, 10, 33296-33306.

Yu, S. et al. "Thermodynamic Assessment of Coating Materials for Solid-State Li, Na, and K Batteries," ACS Applied Materials & Interfaces, 2019, pp. 1-10.

Zevgolis, A. et al. "Alloying Effects on Superionic Conductivity in Lithium Indium Halides for All-Solid-State Batteries," Applied Physics Letters Materials, 2017, 16 pages.

Zhang, S. et al. "Advanced High-Voltage All-Solid-State Li-Ion Batteries Enabled by a Dual-Halogen Solid Electrolyte," Advanced Energy Materials, 2021, 10 pages.

Zhou, L. et al. "New Family of Argyrodite Thioantimonate Lithium Superionic Conductors," Journal of the American Chemical Society, 2019, 141, pp. 19002-19013.

International Search Report and Written Opinion for PCT/US2022/072378, dated Sep. 16, 2022, 12 pages.

* cited by examiner

ELECTROLYTE MATERIAL AND METHODS OF FORMING

CROSS-REFERENCE TO RELATED APPLICATION(S)

This application claims priority under 35 U.S.C. § 119(e) to U.S. Provisional Application No. 63/189,597, entitled "ELECTROLYTE MATERIAL AND METHODS OF FORMING," by Gaurav ASSAT et al., filed May 17, 2021, and claims priority to U.S. Provisional Application No. 63/261,894, entitled "ELECTROLYTE MATERIAL AND METHODS OF FORMING," by Gaurav ASSAT et al., filed Sep. 30, 2021, all of which are assigned to the current assignee hereof and incorporated herein by reference in their entireties.

FIELD OF THE DISCLOSURE

The following is directed to a solid electrolyte material and methods of forming the same, and to, in particular, a solid electrolyte material including a halide material including at least two halide anions and methods of forming the same.

DESCRIPTION OF THE RELATED ART

Solid-state lithium batteries, by enabling lithium metal anode, are expected to provide higher energy densities and faster recharging times and cause fewer safety concerns compared to conventional lithium-ion batteries. Current solid electrolyte materials include oxides, halides, sulfides, fluorides, and solid polymer electrolytes.

Oxide-based materials have been considered safe and possessing good chemical and electrochemical stability. The synthesis of these compounds generally uses high temperatures that are above 1000-1200° C. The oxide-based materials are typically dense, rigid, and brittle with ionic conductivity up to 1.0 mS/cm at room temperature ($IC_{RT}$).

Halide compounds, such as chlorides and bromides, are generally safe and have good chemical and electrochemical stability, deformability at room temperature, and plasticity, allowing relatively high compatibility with active electrode materials. Halides are generally hygroscopic and form hydrates or undergo hydrolysis upon exposure to moisture. Halide solid electrolytes, such as $Li_3YCl_6$ (LYC) and $Li_3YBr_6$ (LYB), are synthesized using high-energy ball milling-based solid-state synthesis methods. The synthesis possesses challenges for mass production applications, further because expensive binary halide reactants and/or high-temperature annealing are used.

Fluorides are very similar to oxides in physical, chemical, and electrochemical properties, but in general, have $IC_{RT}$ values below 1 mS/cm.

Sulfides have relatively high ionic conductivity. For instance, $IC_{RT}$ can be as high as 25 mS/cm, while commercially relevant sulfide or thiophosphate solid electrolytes can achieve 2-10 mS/cm. Sulfide materials are mechanically softer and deformable. However, sulfide materials tend to have poor electrochemical stability and cause safety concerns due to the risk of releasing toxic $H_2S$ gas when accidentally reacting together with water and heat. Further, high surface area sulfide solid electrolyte powders pose a particularly high $H_2S$ risk due to their increased reactivity even with ambient humidity.

Solid polymer electrolytes containing lithium salts, in general, have relatively low $IC_{RT}$ values and electrochemical stability.

The industry continues to demand improved solid electrolyte materials.

BRIEF DESCRIPTION OF THE DRAWINGS

The present disclosure may be better understood, and its numerous features and advantages made apparent to those skilled in the art by referencing the accompanying drawings.

Figure 1A:
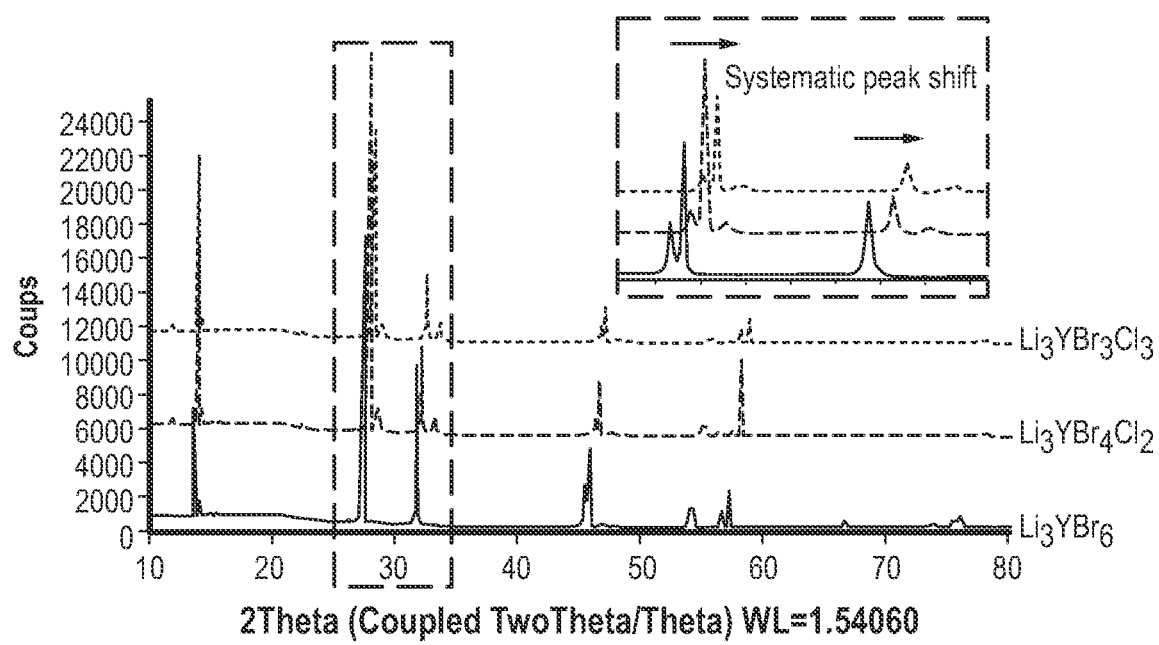
FIGS. 1A and 1B include an illustration including readouts of XRD patterns of halide materials.

Skilled artisans appreciate that elements in the figures are illustrated for simplicity and clarity and have not necessarily been drawn to scale. For example, the dimensions of some of the elements in the figures can be exaggerated relative to other elements to help improve understanding of embodiments of the invention. The use of the same reference symbols in different drawings indicates similar or identical items.

DETAILED DESCRIPTION

The following description, in combination with the figures, is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof are intended to cover a non-exclusive inclusion. For example, a process, method, article, or apparatus that comprises a list of features is not necessarily limited only to those features but can include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one, and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting.

Embodiments herein relate to a solid electrolyte material, including a halide material. In an embodiment, the halide material can include at least two halide anions, at least one alkali metal element, and at least one other metal element. In an embodiment, the solid electrolyte material can include a quaternary halide material. In another embodiment, the solid electrolyte material can include the halide material having one or more improved properties compared to conventional metal halide materials. For example, the halide material can have improved purity, crystalline structure features, or both. In another example, the halide material can have improved ionic conductivity, electronic conductivity, mechanical properties, electro-chemical thermodynamic stability, or any combination thereof. In embodiments, the solid electrolyte material can be used to form electrolyte, coating, catholyte, and/or anolyte, or another component of an electrochemical device. In an exemplary application, the solid electrolyte material may be particularly suitable for forming a catholyte or anolyte due to its improved properties, such as improved interfacial contact and wettability. In particular embodiments, the solid electrolyte material can be a suitable component of a solid-state lithium battery.

Further embodiments relate to methods of forming the solid electrolyte material, including the halide material. The methods can allow for the improved formation of the solid electrolyte material and facilitate the formation of the solid electrolyte material having improved properties. The method can be suitable for the massive production of ion conductive material in a cost-efficient manner.

In an embodiment, the solid electrolyte material can include a halide material represented by $Li_{3-x-y}M_xRE_{1-y}Me^k_y(Cl_{1-u-p-q}Br_uF_pI_q)_{6-x+y*(k-3)}$, wherein the halide material includes at least two halide anions, $-1<=x<=1$, $0<=y<=1$, $0<=u<1$, $0<=p<=1/3$, $0<=q<=1/6$, $0<(u+p+q)<1$, and $0<=f<=0.3$.

The halide anions can be elements selected from the group consisting of F, Cl, Br, and I. M can include at least one alkali metal other than Li. In particular examples, M can be one or more alkali metal elements selected from the group consisting of Na, K, Cs, Rb, and Fr. In another example, M can include Na, K, Cs, or a combination thereof. In more particular instances, M can include at least one of Na and K. In even more particular examples, M can consist of Na or K or a combination thereof.

RE can include at least one rare-earth element selected from the group, including Sc, Y, La, Ce, Pr, Nd, Pm, Sm, Eu, Gd, Tb, Dy, Ho, Er, Tm, Yb, and Lu. For example, RE can include Sc, Y, La, Gd, or any combination thereof. In another example, RE can include Y, Ce, Gd, Er, La, Yb, or a combination thereof. In a particular example, RE can consist of one or more elements selected from the group consisting of Sc, Y, La, Ce, Pr, Nd, Pm, Sm, Eu, Gd, Tb, Dy, Ho, Er, Tm, Yb, and Lu. In a more particular example, RE can consist of Ce, Gd, Er, La, Yb, or a combination thereof. In another more particular example, RE can consist of Y, Gd, or a combination thereof. In even more particular instances, RE can consist of Y or Gd.

Me can include at least one metal element that is different from RE. For example, Me can be one or more elements selected from the group consisting of Group IIIB elements, Group IVB elements, V, Cr, Mn, Fe, Co, Ni, Cu, Zn, Zr, Al, Sn, Pb, Bi, Sb, Mg, Ca, Ga, or Ge. In another example, Me can include Y, Ce, Gd, Er, Sm, Eu, Pr, Tb, Al, Zr, La, Yb, Mg, Zn, Sn, Mg, and Ca, or any combination thereof. In a particular example, Me can be at least one element selected from the group consisting of Gd, Yb, Zr, Zn, Mg, Al, and Ca. In a more particular example, Me can be Gd, Zr, Hf, Zn, or any combination thereof. As used herein, Groups of elements are in accordance with the Handbook of the Elements, 8th edition, 1998.

Me can have the valence k. In instances Me includes more than one metal element, k can be the average of the total of the valence of each Me metal element. For example, when Me includes a trivalent element and tetravalent element in equal molar quantity, $k=(3+4)/2=3.5$. For another example, when Me includes a divalent element and tetravalent element in equal molar quantity, $k=(2+4)/2=3$. In a particular aspect, k may be 2 or 3 or 4 or 5.

In an embodiment, the halide material can have improved purity. For example, the halide material can have a decreased content of one or more impurity phases compared to a corresponding conventional halide material. As used herein, a conventional corresponding halide material is intended to refer to a halide material having the same formula as the halide material of embodiments herein but is formed by a process that is different from the processes described in embodiments herein. In an aspect, an impurity phase can include one or more phases of an unreacted starting material, a by-product, a product resulted from degradation of the halide material or an intermediate product, or the like, or any combination thereof. In a further aspect, an impurity phase can include one or more phases of a binary halide, a ternary halide, an oxyhalide, an oxynitride, or any combination thereof.

In an embodiment, the halide material may include a reduced total content of binary halide phase comparing to a conventional corresponding halide material. The binary halide may include a cation of a metal element selected from the group consisting of Li, M, Me, and RE. In an aspect, the halide material may include a total content of binary halide phase of not greater than 10 wt % for a total weight of the halide material, such as not greater than 9 wt % of a total content of binary halide phase, not greater than 8 wt %, not greater than 7 wt %, not greater than 6 wt %, not greater than 5 wt %, not greater than 4 wt %, not greater than 3 wt %, not greater than 2 wt %, not greater than 1 wt %, or not greater than 0.5 wt % of the total content of binary halide phase for the total weight of the halide material. In another aspect, the halide material may include at least 0.0001 wt % of a total content of binary halide phase for the total weight of the halide material, such as at least 0.0005 wt %, at least 0.001 wt %, at least 0.005 wt %, at least 0.01 wt %, or at least 0.05 wt % of a total content of binary halide phase for the total weight of the halide material. In a further aspect, the halide material may include a total content of binary halide phase in a range including any of the minimum and maximum percentages noted herein. In a particular aspect, the halide material can be essentially free of binary halide phase.

The content of one or more impurity phase that may be present in the halide material may be determined by using known techniques, such as powder X-ray diffraction analysis or innovative Laser Raman mapping of the halide material. X-ray diffraction analysis may be particularly suited when the content of an impurity phase is at least 1 wt % for a total weight of the halide material.

In an embodiment, the binary phase may include one or more alkali metal halide phases. In an aspect, the halide material may include alkali metal halide phase in a total content of not greater than 7 wt % for the total weight of the halide material, not greater than 6 wt %, not greater than 5 wt %, not greater than 4 wt %, not greater than 3 wt %, not greater than 2 wt %, not greater than 1 wt %, or not greater than 0.5 wt % of the total content of alkali metal halide phase for the total weight of the halide material. In instances, the halide material may include at least 0.0001 wt % of a total content of alkali metal halide phase for the total weight of the halide material, such as at least 0.0005 wt %, at least 0.001 wt %, at least 0.005 wt %, at least 0.01 wt %, or at least 0.05 wt % of a total content of alkali metal halide phase for the total weight of the halide material. In a further instance, the halide material may include a total content of alkali metal halide phase in a range including any of the minimum and maximum percentages noted herein. In particular examples, the halide material can be essentially free of alkali metal halide phase.

In a particular embodiment, the halide material may include not greater than 7 wt % of the total content of lithium halide phase for the total weight of the halide material. Lithium halide phase may include one or more phases of LiCl phase, LiBr phase, LiI phase, and LiF phase. In an aspect, the halide material may include not greater than 6 wt % of the total content of lithium halide phase for the total weight of the halide material, not greater than 5 wt %, not greater than 4 wt %, not greater than 3 wt %, not greater than 2 wt %, not greater than 1 wt %, or not greater than 0.5 wt % of the total content of lithium halide phase for the total weight of the halide material. In instances, the halide material may include at least 0.0001 wt % of the total content of lithium halide phase for the total weight of the halide material, such as at least 0.0005 wt %, at least 0.001 wt %, at least 0.005 wt %, at least 0.01 wt %, or at least 0.05 wt % of the total content of lithium halide phase for the total weight of the halide material. In a further aspect, the halide material may include the total content of lithium halide phase in a range including any of the minimum and maximum percentages noted herein. In a particular aspect, the halide material can be essentially free of lithium halide phase.

In an embodiment, the binary phase may include one or more rare-earth halide phases, such as a $YX_3$ phase, wherein X represents a halide anion. In an aspect, the halide material may include not greater than 10 wt % of a total content of rare-earth halide phase, such as not greater than 9 wt %, not greater than 8 wt %, not greater than 7 wt %, not greater than 6 wt %, not greater than 5 wt %, not greater than 4 wt %, not greater than 3 wt %, not greater than 2 wt %, not greater than 1 wt %, or not greater than 0.5 wt % of the total content of rare-earth halide phase for the total weight of the halide material. In another aspect, the halide material may include at least 0.0001 wt % of the total content of rare-earth halide phase for the total weight of the halide material, such as at least 0.0005 wt %, at least 0.001 wt %, at least 0.005 wt %, at least 0.01 wt %, or at least 0.05 wt % of the total content of rare-earth halide phase for the total weight of the halide material. In a further aspect, the halide material may include the total content of rare-earth halide phase in a range, including any of the minimum and maximum percentages noted herein. In a particular aspect, the halide material can be essentially free of rare-earth halide phase.

In a particular embodiment, binary halide phase may include one or more $YX_3$ phase, such as one or more phase of $YCl_3$, $YBr_3$, $YI_3$, or $YF_3$. In an aspect, the halide material may include not greater than 10 wt % of the total content of $YX_3$ phase, such as not greater than 9 wt %, not greater than 8 wt %, not greater than 7 wt %, not greater than 6 wt %, not greater than 5 wt %, not greater than 4 wt %, not greater than 3 wt %, not greater than 2 wt %, not greater than 1 wt %, or not greater than 0.5 wt % of the total content of $YX_3$ phase for the total weight of the halide material. In another aspect, the halide material may include at least 0.0001 wt % of the total content of $YX_3$ phase for the total weight of the halide material, such as at least 0.0005 wt %, at least 0.001 wt %, at least 0.005 wt %, at least 0.01 wt %, or at least 0.05 wt % of the total content of $YX_3$ phase for the total weight of the halide material. In a further aspect, the halide material may include the total content of $YX_3$ phase in a range including any of the minimum and maximum percentages noted herein. In a particular aspect, the halide material can be essentially free of $YX_3$ phase.

In an embodiment, the halide material can include a reduced content of one or more oxyhalide phases comparing to a conventional corresponding halide material. Oxyhalide may include a cation of a metal element selected from the group consisting of M, Me, and RE. In an aspect, the halide material may include a total content of oxyhalide phase of not greater than 7 wt % for a total weight of the halide material, such as not greater than 6 wt % of the oxyhalide phase, not greater than 5 wt %, not greater than 4 wt %, not greater than 3 wt %, not greater than 2 wt %, not greater than 1 wt %, or not greater than 0.5 wt % of the oxyhalide phase for the total weight of the halide material. In another aspect, the halide material may include at least 0.0001 wt % of the total content of oxyhalide phase for the total weight of the halide material, such as at least 0.0005 wt %, at least 0.001 wt %, at least 0.005 wt %, at least 0.01 wt %, or at least 0.05 wt % of the total content of oxyhalide phase for the total weight of the halide material. In a further aspect, the halide material may include the total content of oxyhalide phase in a range including any of the minimum and maximum percentages noted herein. In a particular aspect, the halide material can be essentially free of oxyhalide phase.

A total content of impurity phase that may not be soluble in water may be determined by using an aquatic method described as follows. 50 g of the halide material can be dissolved in distilled $H_2O$. The solution can be filtered through 0.2-micron Millipore filter. Insoluble substance may be collected and weighed. The collected insoluble substance can include the hydrated form of the water insoluble impurity present in the halide material. For instance, at least the majority of the water insoluble impurity present in the halide material may be an oxyhalide of a rare earth element, a rare-earth oxide, oxyhalide of Me, MeO, or any combination thereof. The weight of the collected insoluble substance can be used to determine the total content of water insoluble impurity in the halide material. Using the insoluble impurity phase of metal oxyhalide, MeOX, as an example, the sedimented hydrated impurity form can be represented by $MeX(OH)_2$, and the content of MeOX can be determined using the formula, $C_{MeOX} = C_{MeOHX} \times (MW_{MeOX}/MW_{MeOHX})$, wherein $C_{MeOX}$ represents the weight content of MeOX relative to the weight of the halide material, $C_{MOHX}$ represents the weight content of the sedimented $MeX(OH)_2$ relative to the weight of the halide material, $MW_{MeOX}$ represents the molar mass of MeOX, and $MW_{MeOHX}$ represents the molar mass of $MeX(OH)_2$. In instances that synthesis of the halide material may include melting and solidification, traces of organic residues may be present on the surface of the synthesized blocks of the halide material. The organic residues are carbon concentrated at the surface of the blocks and may be removed by using a scalpel. The traces of carbon can be originated from pyrolysis of organic impurities that may be present in one or more raw materials used to synthesize the halide material.

In an embodiment, the halide material may include a reduced content of water insoluble impurity phase. In an aspect, the halide material may include a total content of water insoluble impurity phase of less than 0.11 wt % for a total weight of the halide material, such as not greater than 0.1 wt %, not greater than 0.09 wt %, not greater than 0.08 wt %, not greater than 0.07 wt %, not greater than 0.05 wt %, not greater than 0.04 wt %, not greater than 0.03 wt %, not greater than 0.01 wt %, not greater than 0.008 wt %, not greater than 0.006 wt %, not greater than 0.004 wt %, or not greater than 0.003 wt % for a total weight of the halide material. In another aspect, the halide material may include at least 0.0001 wt % of the total content of water insoluble impurity phase for the total weight of the halide material, such as at least 0.0003 wt %, at least 0.0005 wt %, at least 0.001 wt %, at least 0.005 wt %, at least 0.01 wt %, at least 0.013 wt %, at least 0.015 wt %, at least 0.02 wt %, at least 0.03 wt %, or at least 0.05 wt % of the total content of water insoluble impurity phase for the total weight of the halide material. In a further aspect, the halide material may include the total content of water insoluble impurity phase in a range including any of the minimum and maximum percentages noted herein. In a particular aspect, the halide material can be essentially free of water insoluble impurity phase. In instances, a majority of the water insoluble impurity phase may include one or more phase of rare earth oxyhalide, oxyhalide of Me, a rare-earth oxide, an oxide of Me, or any combination thereof. In another instance, the water insoluble impurity phase may consist essentially of one or more phases of rare earth oxyhalide, oxyhalide of Me, a rare-earth oxide, an oxide of Me, or any combination thereof.

In an embodiment, oxyhalide phase may include one or more rare-earth oxyhalide phase. In an aspect, the halide material may include not greater than 7 wt % of the total content of rare-earth oxyhalide phase, not greater than 6 wt %, not greater than 5 wt %, not greater than 4 wt %, not greater than 3 wt %, not greater than 2 wt %, not greater than 1 wt %, or not greater than 0.5 wt %. In particular aspect, the total content of rare earth oxyhalide phase may be or less than 0.3 wt %, such as less 0.2 wt %, least than 0.12 wt %, less than 0.11 wt %, less than 0.10 wt %, not greater than 0.09 wt. %, not greater than 0.07 wt %, not greater than 0.05 wt %, or not greater than 0.03 wt % of the rare-earth oxyhalide phase for the total weight of the halide material. In another aspect, the halide material may include at least 0.0001 wt % of the total content of rare-earth oxyhalide phase for the total weight of the halide material, such as at least 0.0005 wt %, at least 0.001 wt %, at least 0.005 wt %, at least 0.01 wt %, at least 0.02 wt %, or at least 0.05 wt % of the total content of rare-earth oxyhalide phase for the total weight of the halide material. In a further aspect, the halide material may include the total content of rare-earth oxyhalide phase in a range including any of the minimum and maximum percentages noted herein. In a particular aspect, the halide material can be essentially free of rare-earth oxyhalide phase that may be represented by REOX, where X is a halogen and RE is a rare-earth element.

In an embodiment, the halide material may include a reduced total content of one or more ternary halide phase comparing to a conventional corresponding halide material. An exemplary ternary halide may include two metal cations and one halide anion, such as alkali metal-rare-earth metal halide, or one metal element and two halide anions, or both. An exemplary metal cation can include a cation of Li, M, RE, and/or Me metal elements. In an aspect, the halide material may include a total content of ternary halide phase of not greater than 7 wt % for a total weight of the halide material, such as not greater than 6 wt %, not greater than 5 wt %, not greater than 4 wt %, not greater than 3 wt %, not greater than 2 wt %, not greater than 1 wt %, or not greater than 0.5 wt % of the total content of ternary halide phase for the total weight of the halide material. In another aspect, the halide material may include at least 0.0001 wt % of the total content of ternary halide phase for the total weight of the halide material, such as at least 0.0005 wt %, at least 0.001 wt %, at least 0.005 wt %, at least 0.01 wt %, or at least 0.05 wt % of the total content of ternary halide phase for the total weight of the halide material. In a further aspect, the halide material may include the total content of ternary halide phase in a range, including any of the minimum and maximum percentages noted herein. In a particular aspect, the halide material can be essentially free of ternary halide phase.

In an embodiment, the ternary phase may include one or more lithium-rare-earth halide phase, such as lithium yttrium halide phase. In an aspect, the halide material may include the total content of not greater than 7 wt % of the lithium-rare-earth halide phase, not greater than 5 wt %, not greater than 3 wt %, not greater than 2 wt %, not greater than 1 wt %, or not greater than 0.5 wt % of the total content of lithium-rare-earth halide phase for the total weight of the halide material. In another aspect, the halide material may include at least 0.0001 wt % of the total content of lithium-rare-earth halide phase for the total weight of the halide material, such as at least 0.0005 wt %, at least 0.001 wt %, at least 0.005 wt %, at least 0.01 wt %, or at least 0.05 wt % of the total content of lithium-rare-earth halide phase for the total weight of the halide material. In a further aspect, the halide material may include the total content of lithium-rare-earth halide phase in a range including any of the minimum and maximum percentages noted herein. In a particular aspect, the halide material can be essentially free of lithium-rare-earth halide phase.

In a particular embodiment, the ternary halide phase may include a total content of one or more ternary phases including two halide anions, such as $YBr_xCl_y$ or $LiBr_xCl_y$, of not greater than 7 wt % of ternary halide phase including two anions, such as not greater than 6 wt %, not greater than 5 wt %, not greater than 4 wt %, not greater than 3 wt %, not greater than 2 wt %, not greater than 1 wt %, or not greater than 0.5 wt % of the total content of ternary halide phase including two anions for the total weight of the halide material. In instances, the halide material may include at least 0.0001 wt % of the total content of ternary halide phase, including two halide anions for the total weight of the halide material, such as at least 0.0005 wt %, at least 0.001 wt %, at least 0.005 wt %, at least 0.01 wt %, or at least 0.05 wt % of the total content of ternary halide phase including two anions for the total weight of the halide material. In a further aspect, the halide material may include the total content of ternary halide phase, including two anions in a range including any of the minimum and maximum percentages noted herein. In a particular aspect, the halide material can be essentially free of ternary halide phase, including two anions.

In an embodiment, the halide material may include a reduced content of one or more nitride-based phases compared to a conventional corresponding halide material. Nitride-based phase can include one or more phases of oxynitride phase, carbon nitride phase, or nitride phase.

Nitride phase can include a cation of a metal element selected from the group consisting of Li, M, RE, and Me. In an aspect, the halide material can include a total content of nitride-based phase of not greater than 7 wt % for a total weight of the halide material, such as not greater than 6 wt %, not greater than 5 wt %, not greater than 4 wt %, not greater than 3 wt %, not greater than 2 wt %, not greater than 1 wt %, or not greater than 0.5 wt % of the total content of nitride-based phase for the total weight of the halide material. In another aspect, the halide material may include at least 0.0001 wt % of the total content of nitride-based phase for the total weight of the halide material, such as at least 0.0005 wt %, at least 0.001 wt %, at least 0.005 wt %, at least 0.01 wt %, or at least 0.05 wt % of the total content of nitride-based phase for the total weight of the halide material. In a further aspect, the halide material may include the total content of nitride-based phase in a range including any of the minimum and maximum percentages noted herein. In a particular aspect, the halide material can be essentially free of nitride-based phase.

In an embodiment, the halide material may include a reduced content of one or more oxynitride phases, such as a $REO_xN_y$ phase, compared to a conventional corresponding halide material. Oxynitride may include a cation of a metal element selected from the group consisting of Me and RE. In an aspect, the halide material may include a total content of oxynitride phase of not greater than 7 wt % for a total weight of the halide material, such as not greater than 6 wt %, not greater than 5 wt %, not greater than 4 wt %, not greater than 3 wt %, not greater than 2 wt %, not greater than 1 wt %, or not greater than 0.5 wt % of the total content of oxynitride phase for the total weight of the halide material. In another aspect, the halide material may include at least 0.0001 wt % of the total content of oxynitride phase for the total weight of the halide material, such as at least 0.0005 wt %, at least 0.001 wt %, at least 0.005 wt %, at least 0.01 wt %, or at least 0.05 wt % of the total content of oxynitride phase for the total weight of the halide material. In a further aspect, the halide material may include the total content of oxynitride phase in a range including any of the minimum and maximum percentages noted herein. In a particular aspect, the halide material can be essentially free of oxynitride phase.

In an embodiment, the halide material may include a reduced content of one or more carbon nitride phases, such as a $REC_xN_y$ phase, compared to a conventional corresponding halide material. Carbon nitride may include a cation of a metal element selected from the group consisting of Me and RE. In an aspect, the halide material may include a total content of carbon nitride phase of not greater than 7 wt % for a total weight of the halide material, such as not greater than 6 wt %, not greater than 5 wt %, not greater than 4 wt %, not greater than 3 wt %, not greater than 2 wt %, not greater than 1 wt %, or not greater than 0.5 wt % of the total content of carbon nitride phase for the total weight of the halide material. In another aspect, the halide material may include at least 0.0001 wt % of the total content of carbon nitride phase for the total weight of the halide material, such as at least 0.0005 wt %, at least 0.001 wt %, at least 0.005 wt %, at least 0.01 wt %, or at least 0.05 wt % of the total content of carbon nitride phase for the total weight of the halide material. In a further aspect, the halide material may include the total content of carbon nitride phase in a range including any of the minimum and maximum percentages noted herein. In a particular aspect, the halide material can be essentially free of carbon nitride phase.

In an embodiment, the halide material may include a reduced content of one or more nitride phases, such as a rare-earth nitride (e.g., REN) phase, compared to a conventional corresponding halide material. A nitride phase may include a cation of a metal element selected from the group consisting of Li, M, Me, and RE. In an aspect, the halide material may include a total content of nitride phase of not greater than 7 wt % for a total weight of the halide material, such as not greater than 6 wt %, not greater than 5 wt %, not greater than 4 wt %, not greater than 3 wt %, not greater than 2 wt %, not greater than 1 wt %, or not greater than 0.5 wt % of the total content of nitride phase for the total weight of the halide material. In another aspect, the halide material may include at least 0.0001 wt % of the total content of nitride phase for the total weight of the halide material, such as at least 0.0005 wt %, at least 0.001 wt %, at least 0.005 wt %, at least 0.01 wt %, or at least 0.05 wt % of the total content of nitride phase for the total weight of the halide material. In a further aspect, the halide material may include the total content of nitride phase in a range, including any of the minimum and maximum percentages noted herein. In a particular aspect, the halide material may be essentially free of at least one rare-earth nitride phase and Me metal nitride phase. In another particular aspect, nitride phase, when present in the halide material, may be essentially free of phase, including a cation of a metal element of RE or Me. In a more particular aspect, the halide material may be essentially free of rare-earth nitride phase and Me metal nitride phase.

In an embodiment, the halide material may include a total content of impurity phase of not greater than 16 wt %, such as not greater than 15 wt %, not greater than 14 wt %, not greater than 13 wt %, not greater than 12 wt %, not greater than 10 wt %, not greater than 9 wt %, not greater than 8 wt %, not greater than 7 wt % for a total weight of the halide material, such as not greater than 6 wt %, not greater than 5 wt %, not greater than 4 wt %, not greater than 3 wt %, not greater than 2 wt %, not greater than 1 wt %, not greater than 0.5 wt %, not greater than 0.3 wt %, or not greater than 0.1 wt % of the total content of impurity phase for the total weight of the halide material. In another aspect, the halide material may include at least 0.0001 wt % of the total content of impurity phase for the total weight of the halide material, such as at least 0.0005 wt %, at least 0.001 wt %, at least 0.005 wt %, at least 0.01 wt %, or at least 0.05 wt % of the total content of impurity phase for the total weight of the halide material. In a further aspect, the halide material may include the total content of impurity phase in a range, including any of the minimum and maximum percentages noted herein.

In a particular embodiment, the halide material can be essentially free of binary halide phase, ternary halide phase, oxynitride phase, and oxyhalide phase. In a more particular embodiment, the halide material may consist essentially of a single phase. For example, the halide material can consist of the phase represented by the formula $Li_{3-x-f}M_fRE_{1-y}Me^k_y$ $(Cl_{1-u-p-q}Br_uF_pI_q)_{6-x+y*(k-3)}$ and impurity phase, wherein the total content of impurity phase may be at most 0.5 mol % or at most 0.3 mol %.

In an embodiment, the halide material may include a particular crystalline structure feature that can facilitate the improved property of the halide material. A crystalline structure feature can include a crystal system, lattice system, space group, one or more unit cell parameters including a unit cell volume, values of a, b, c or any combination thereof, atom numbers within a unit cell, stacking order, atomic vacancy, occupation of vacancy, or any combination thereof.

In an embodiment, the halide material can include a crystalline structure of a monoclinic, trigonal, hexagonal, or orthorhombic crystal system. In a particular embodiment, the halide material can include a crystalline structure represented by a space group of a monoclinic crystal system. In particular examples, the halide material may include a crystalline structure represented by the C2/m space group.

In another particular embodiment, the halide material may include a crystalline structure represented by a space group of the rhombohedral lattice system, including R3, R$\bar{3}$, R32, R3m, R3c, R$\bar{3}$m, or R$\bar{3}$c space group. In particular examples, the halide material can have a crystalline structure represented by R$\bar{3}$m space group.

In another particular embodiment, the halide material may include a crystalline structure represented by a space group of the hexagonal crystal system. The hexagonal crystal system includes 27 space groups, including P6, P6$_1$, P6$_5$, P6$_2$, P6$_4$, P6$_3$, P$\bar{6}$, P6/m, P6$_3$/m, P622, P6$_1$22, P6$_5$22, P6$_2$22, P6$_4$22, P6$_3$22, P6mm, P6cc, P6$_3$cm, P6$_3$mc, P$\bar{6}$m2, P$\bar{6}$c2, P$\bar{6}$2m, P$\bar{6}$2c, P6/mmm, P6/mcc, P6$_3$/mcm, and P6$_3$/mmc. For example, the halide material can include a crystalline structure represented by any one of the space groups of the hexagonal crystal system. In a particular example, the halide material can include a crystalline structure represented by P6$_3$/mcm. In another particular example, the halide material can include a crystalline structure represented by P6$_3$/mmc space group.

In a particular embodiment, the halide material can include mixed crystalline interphase phases, including a plurality of crystalline interphases that are integrated at the atomic level, at the nanometric-domain level, or both. The nearest atomic distances are usually less than 0.5 nm, and the nanometric domain can have a larger size than the nearest atomic distances, such as greater than 1 nm. In an aspect, the halide material can include a first crystalline phase having a first crystalline structure represented by a first space group and a second crystalline phase having a different second crystalline structure represented by a second space group.

In a particular embodiment, the halide material may include a first crystalline interphase having a first crystalline structure represented by a space group of the rhombohedral lattice system and a second crystalline interphase represented by a space group of the monoclinic crystal system, such as C2/m. In a particular example, the halide material can include a first crystalline interphase having a crystalline structure represented by R$\bar{3}$m and a second crystalline interphase having a crystalline structure represented by C2/m. In another particular example, the halide material can include a third crystalline interphase having a different crystalline structure. In more particular examples, the third crystalline interphase may be represented by Fd$\bar{3}$m or Fm$\bar{3}$m.

For example, the first crystalline interphase can have a first crystalline structure represented by a space group of the hexagonal crystal system, and the second crystalline interphase can have a second crystalline structure represented by a space group of the trigonal crystal system or orthorhombic crystalline structure. In a particular example, the second crystalline interphase can have a second crystalline structure represented by P$\bar{3}$m1. In another particular example, the second phase can have a second crystalline structure represented by Pnma space group. In more particular examples, the halide material can include a first crystalline interphase having a first crystalline structure represented by P6$_3$/mcm or P6$_3$/mmc and a second crystalline interphase having a second crystalline structure represented by P$\bar{3}$m1 or Pnma.

In an embodiment, the halide material can include a crystalline structure, including a unit cell that is smaller than the unit cell of Li$_3$YBr$_6$. In particular aspects, the halide material may include a crystalline structure similar to Li$_3$YBr$_6$ but having a smaller unit cell volume. In another particular aspect, the halide material can include a powder X-ray diffraction (XRD) pattern, in which peaks of the halide material are shifted to higher angles compared to corresponding peaks of a powder diffraction pattern of Li$_3$YBr$_6$. Referring to FIG. 1A, powder XRD patterns measured with Cu K-alpha radiation of representative halide materials, Li$_3$YBr$_3$Cl$_3$ and Li$_3$YBr$_4$Cl$_2$, and Li$_3$YBr$_6$ are illustrated. Corresponding peaks of Li$_3$YBr$_3$Cl$_3$ and Li$_3$YBr$_4$Cl$_2$ are shifted to greater values of 2-theta compared to Li$_3$YBr$_6$.

Figure 1B:
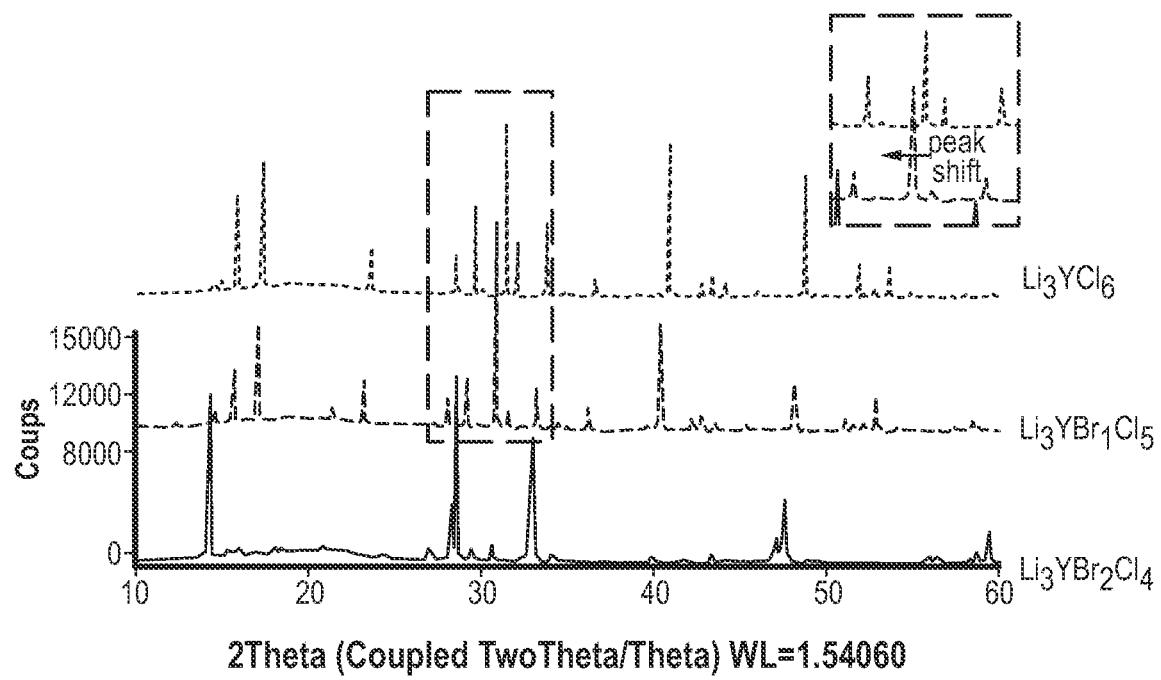

In another embodiment, the halide material may include a crystalline structure similar to Li$_3$YCl$_6$ but having a bigger unit cell volume. In particular examples, the halide material can include a powder X-ray diffraction (XRD) pattern, in which peaks of the halide material are shifted to smaller angles compared to corresponding peaks of a powder diffraction pattern of Li$_3$YCl$_6$. Referring to FIG. 1B, powder XRD patterns measured with Cu K-alpha radiation of representative halide materials, Li$_3$YBr$_2$Cl$_4$ and Li$_3$YBr$_1$Cl$_5$, and Li$_3$YCl$_6$ are illustrated. Corresponding peaks of Li$_3$YBr$_1$Cl$_5$ are shifted to smaller values of 2-theta compared to Li$_3$YCl$_6$. The XRD patterns of Li$_3$YBr$_4$Cl$_2$ may suggest the halide includes mixed interphases.

Figure 2:
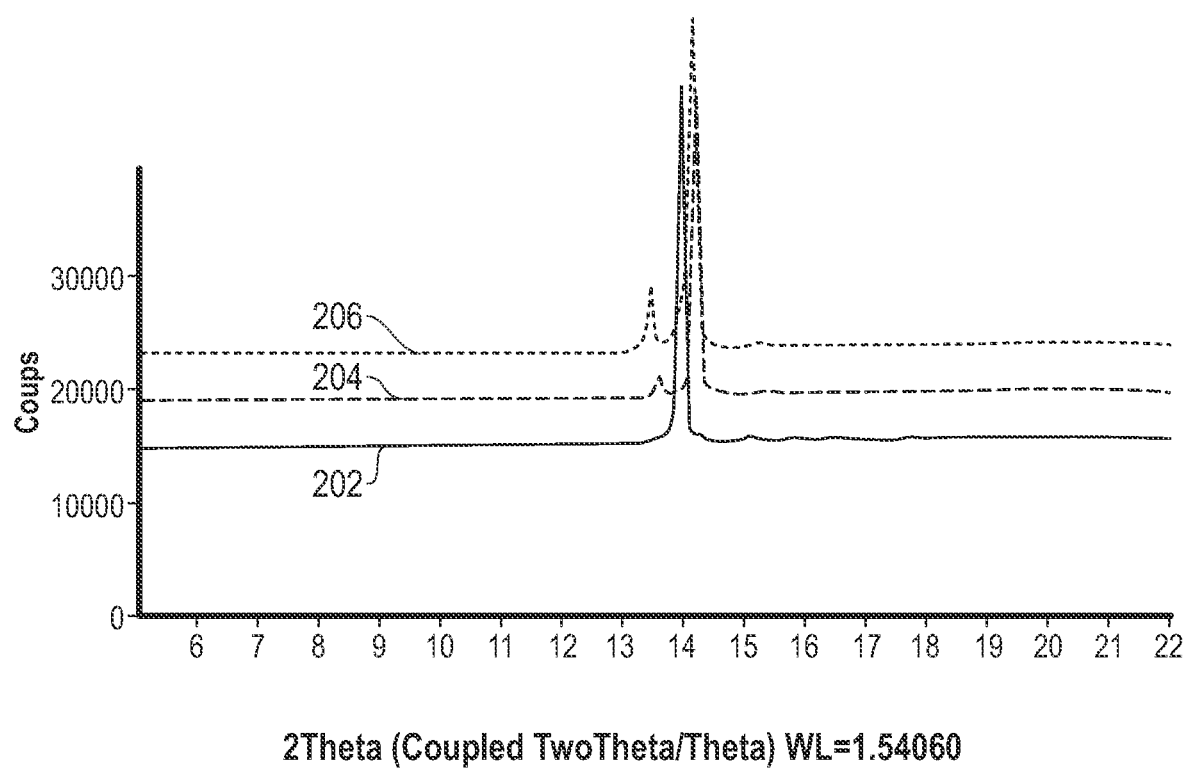
FIG. 2 includes an illustration including readouts of XRD patterns of additional halide materials.

In a particular example, the halide material can include an XRD pattern measured with Cu K-alpha radiation, including at least two peaks in a range of 13° to 15° of 2-theta. Referring to FIG. 2, the Cu K-alpha XRD patterns of three samples of Li$_{3-x}$Y(Cl$_{1-u}$Br$_u$)$_{6-x}$ are illustrated. Sample 202 with u being 0.59±0.03, demonstrates one peak in the range of 13° to 15° of 2-theta. Samples 204 and 206 with u being 0.38±0.03 and 0.31±0.03, respectively, demonstrate two peaks in the range of 13° to 15° of 2-theta.

In another embodiment, the halide material can include a particular average diffraction crystallite size that can facilitate improved property of the halide material. The average diffraction crystallite size can also be referred to as the cohere X-ray scattering domain size and determined using X-ray diffraction analysis of the halide-based material and Schrerrer's equation, L=(Kλ)/(β cos θ), wherein L represents the average diffraction crystallite size, wherein K is a dimensionless shape factor, with a value close to unity, and has a typical value from 0.9 to 1; λ is the X-ray wavelength; β is the line broadening at half the maximum intensity (FWHM), after subtracting the instrumental line broadening, in radians; and θ is the Bragg angle.

In an aspect, the halide material can include an average diffraction crystallite size of at least 20 nm, at least 25 nm, at least 30 nm, at least 35 nm, or at least 40 nm. In another aspect, the halide material can include an average diffraction crystallite size of at most 500 nm, at most 400 nm, at most 300 nm, at most 200 nm, or at most 100 nm. In a further aspect, the halide material can include an average diffraction crystallite size in a range including any of the minimum and maximum values noted herein.

In an embodiment, the solid electrolyte material can include a halide material, including a particular amount of Cl that can facilitate improved properties of the halide material and the solid electrolyte material. In an aspect, (1-u-p-q) may be at least 0.12, at least 0.15, at least 0.17, at least 0.20, at least 0.23, at least 0.25, at least 0.27, at least 0.29, at least 0.33, at least 0.36, at least 0.43, at least 0.48, at least 0.50, at least 0.54, or at least 0.58. In another aspect, (1-u-p-q) may be at most 0.99, at most 0.97, such as at most 0.92, at most 0.87, at most 0.83, at most 0.80, at most 0.77, at most 0.75, at most 0.70, or at most 0.66. In a further aspect, (1-u-p-q) may be in a range including any of the minimum and maximum values noted herein.

In a particular embodiment, the solid electrolyte material can include a halide material represented by $Li_{3-x-f}M_f RE_{1-y}Me^k_y(Cl_{1-u-p-q}Br_uF_pI_q)_{6-x+y^*(k-3)}$, wherein u can be greater than 0. More particularly, the halide material can include Br in a particular amount that can facilitate improved properties of the halide material. In an aspect, u can be at least 0.1, such as at least 0.12, at least 0.15, at least 0.17, at least 0.2, at least 0.23, at least 0.25, at least 0.27, at least 0.29, at least 0.32, or at least 0.34. In another aspect, u can be at most 0.85, at most 0.83, at most 0.8, at most 0.77, at most 0.75, at most 0.7, at most 0.67, at most 0.65, at most 0.62, at most 0.6, at most 0.57, at most 0.54, at most 0.52, at most 0.49), at most 0.45, or at most 0.42. In another aspect, u can be in a range including any of the minimum and maximum values noted herein.

In another embodiment, the halide material can include a particular ratio of the amount of Cl to the amount of Br, (1-u-p-q)/u, which can facilitate improved properties of the halide material. In an aspect, the ratio of (1-u-p-q)/u can be at least 0.03, such as at least 0.06, at least 0.1, at least 0.2, at least 0.3, at least 0.4, at least 0.5, at least 0.6, at least 0.7, at least 0.8, at least 0.9, at least 1.0, at least 1.2, at least 1.3, at least 1.4, at least 1.5, at least 1.6, at least 1.7, at least 1.8, at least 1.9, or at least 2.0. In another aspect, the ratio of (1-u-p-q)/u may be not greater than 9, not greater than 8.6, not greater than 8.3, not greater than 8, not greater than 7.7, not greater than 7.4, not greater than 7, not greater than 6.5, not greater than 6.2, not greater than 6, not greater than 5.5, not greater than 5, not greater than 4, not greater than 3, not greater than 2, or not greater than 1.4. In a further aspect, the ratio of (1-u-p-q)/u can be in a range including any of the minimum and maximum values noted herein.

In a further embodiment, the halide material can include halide anions consisting of Cl and Br. In a particular example, the halide material may be represented by $Li_{3-x}RE_{1-y}Me^k_y(Cl_{1-u}Br_u)_{6-x+y^*(k-3)}$, wherein u>0, and in particular applications, 0.08<=u<=0.67. In another example, the halide material can be represented by $Li_{3-x}Y(Cl_{1-u}Br_u)_{6-x}$, and in particular applications, u can be at least 0.55 or at most 0.45. In particular embodiments, 0.2<=u<=0.45.

After reading this disclosure, a skilled artisan will appreciate properties of the halide material of embodiments herein may be adjusted or tuned by carefully controlling the amount of one or more of the halide anions, the ratios thereof, crystalline structures of the halide material, or any combination thereof. In an embodiment, when Br and Cl are both present, by carefully controlling the amount of Br and/or Cl and/or the ratio of (1-u-p-q)/u, the halide material can include a layered crystalline structure similar to $Li_3YBr_6$, improved ionic conductivity compared to $Li_3YCl_6$ and improved electro-chemical thermodynamic stability and similar mechanical deformability comparing to $Li_3YBr_6$. In another embodiment, the halide material may include Br and Cl and have a crystalline structure, including mixed crystalline interphases described in embodiments herein. The halide material may have improved ionic conductivity comparing to $Li_3YCl_6$ and improved electro-chemical thermodynamic stability compared to $Li_3YBr_6$.

In another embodiment, when 0<u<0.33, the halide material may include a crystalline structure including hexagonal/trigonal crystalline structure similar to $Li_3YCl_6$, improved ionic conductivity and mechanical deformability, particularly, at lower temperatures (i.e., less than 200° C.) comparing to $Li_3YCl_6$ and improved electro-chemical thermodynamic stability compared to $Li_3YBr_6$. Such halide material may be particularly suitable for certain applications, such as manufacturing low-weight batteries, due to reduced density compared to $Li_3YBr_6$.

In a particular embodiment, the halide material represented by $Li_{3-x-f}M_fRE_{1-y}Me^k_y(Cl_{1-u-p-q}Br_uF_pI_q)_{6-x+y^*(k-3)}$, wherein p can be greater than 0. More particularly, the halide material can include F in a particular amount that can facilitate improved properties of the halide material. In an aspect, p can be at least 0.04, such as at least 0.06, at least 0.08, at least 0.09, at least 0.10, at least 0.12, at least 0.14, at least 0.15, at least 0.17, at least 0.2, or at least 0.22. In another aspect, p may be at most 0.33, such as at most 0.31, at most 0.29, at most 0.27, at most 0.25, at most 0.22, at most 0.20, at most 0.18, at most 0.16, at most 0.14, at most 0.12, or at most 0.10. In another aspect, p may be in a range including any of the minimum and maximum values noted herein.

An example of the halide material may include $Li_3Me^{3+}Cl_{6(1-p)}F_{6p}$, wherein 0<p<0.58. In particular examples, Me may include In, or more particularly, may consist of In. The solid-solution of the chloride-fluoride halide phase may have a crystalline structure represented by space group C2/m and improved ionic conductivity comparing to $Li_3InF_6$ and $Li_3InCl_6$.

In another embodiment, the halide material can include a particular ratio of the amount of Cl to the amount of Br, (1-u-p-q)/p that can facilitate improved properties of the halide material. In an aspect, the ratio of (1-u-p-q)/p can be at least 0.5, such as at least 0.7, at least 0.9, at least 1.0, at least 1.2, at least 1.4, at least 1.5, at least 1.6, at least 1.7, at least 1.8, at least 1.9, at least 2.0, at least 2.2, at least 2.4, at least 2.6, at least 2.8, at least 3.0, at least 3.2, at least 3.4, or at least 3.6. In another aspect, the ratio of (1-u-p-q)/p may be not greater than 24, such as not greater than 21, not greater than 19, not greater than 17, not greater than 15, not greater than 13, not greater than 12, not greater than 11, not greater than 9, not greater than 8, not greater than 6, or not greater than 5. In a further aspect, the ratio of (1-u-p-q)/p can be in a range including any of the minimum and maximum values noted herein.

In an embodiment, the halide material may be represented by the formula, $Li_aM_a\cdot Me_bMe'_bX_cX'_c$. M can be at least one alkali metal element other than Li, as described in the above embodiments. In particular examples, M can be at least one element of Na, K, and Cs.

Me can be at least one element from the group consisting of Group IIIB elements, Group IVB elements, V, Cr, Mn, Fe, Co, Ni, Cu, Zn, Zr, Al, In, Sn, Pb, Bi, Sb, Mg, Ca, Ga, and Ge, as described in embodiments herein. In particular examples, Me can be RE as discussed in embodiments herein.

Me' is different from Me and can be at least one element from the group consisting of Group IIIB elements, Group IVB elements, V, Cr, Mn, Fe, Co, Ni, Cu, Zn, Zr, Al, In, Sn, Pb, Bi, Sb, Mg, Ca, Ga, and Ge. In particular examples, Me' may be at least one element from a rare-earth element, Zr, and Fe.

X can be at least one halogen, and X' can be at least one halogen other than X. In particular examples, X may be at least one element of Cl, Br, and F. In another particular instance, X' may be at least one element of Br and F.

In another embodiment, the solid electrolyte material can include the halide material represented by $Li_aM_aMe_b$ $Me'_bX_cX'_{c'}$, wherein a≥a', b≥b', and c≥c'. In particular, the halide material can include a low level of one or more impurities as described in embodiments herein. In still another embodiment, the solid electrolyte material can include the halide material represented by $Li_aM_aMe_b$ $Me'_bX_cX'_{c'}$, wherein the anions of the halide material may be within a single phase.

In an embodiment, the halide material can include at least 4 elements. In a further embodiment, the halide material can have a crystallography phase transition that may be induced by adjusting stoichiometric proportions of two or more of the elements. In particular embodiments, stoichiometric proportions of the elements at the same site of the crystalline structure may be adjusted such that the halide material may have an improved property including, for example, ionic conductivity, electrochemical stability, conformability, or the like, or any combination thereof. After reading the instant disclosure, a skilled artisan will appreciate that Li and M may be present at the same crystallographic site; Me and Me' may be present at the same crystallographic site, and X and X' may be present at the same crystallographic site. In an example, the stoichiometric proportions of Me and Me', or the stoichiometric proportions of Li and M, or the stoichiometric proportions of X and X', or any combinations thereof, may be adjusted to improve one or more properties of the halide material. In particular examples, X may be Cl, X' may be Br, and the stoichiometric proportions of X and X' may be adjusted to improve ionic conductivity, such as $Li^+$ ionic conductivity, electrochemical stability, or both of the halide material. In another particular example, M may be Na, and the stoichiometric proportions of Li and M may be adjusted to improve ionic conductivity. In still another example, Me may be Y, and Me' may be In, and the stoichiometric proportions of Me and Me' may be adjusted to improve the ionic conductivity of the halide material.

The halide material can have a crystallography phase transition boundary on the composition phase diagram. In this disclosure, the crystallography phase transition boundary may also be referred to as morphotropic phase boundary (MPB). In an embodiment, a crystallography phase transition may be induced by changes of the stoichiometric proportions of Me and Me'. In particular, the halide material may have a phase transition when b/(b+b') is in the stoichiometry range from $(b/(b+b'))_t*0.84$ to $(b/(b+b'))_t*1.16$, wherein $(b/(b+b'))_t$ corresponds to the crystallography phase transition boundary on the composition phase diagram at the room temperature (i.e., 22° C.). In a particular aspect, b>b'>0, c≥0, c'≥0, and (c+c')>0. In another aspect, at least one of Me and Me' may include RE, as discussed in embodiments of this disclosure. In a particular aspect, Me may include RE, and Me' may include another tetravalent or trivalent element. In a more particular aspect, Me may include Y, Me' may include Zr. Even more particularly, Me may be Y, and Me' may be Zr.

In an embodiment, the halide material may have a crystallography phase transition that may be induced by changes of the stoichiometric proportions of X and X'. In particular, the halide material may have a phase transition when c/(c+c') is in the stoichiometry range on the composition phase diagram from $(c/(c+c'))_t*0.84$ to $(c/(c+c'))_t*1.16$, wherein $(c/(c+c'))_t$ corresponds to the crystallography phase transition boundary on the composition phase diagram at the room temperature (i.e., 22° C.). In a particular aspect, c≥c'>0, b≥0, b'≥0, and (b+b')>0. In another particular aspect, X may include Cl, and X' may include Br. In a more particular aspect, X may be Cl, and X' may be Br. In another particular aspect, at least one of M and M' may be RE, as discussed in embodiments of this disclosure. In an even more particular aspect, one of M and M' may be Y.

In another embodiment, the halide material may have a crystallography phase transition that may be induced by changes in the stoichiometric proportions of Li and M. In particular, the halide material may have a phase transition when a/(a+a') is in the stoichiometry range from $(a/(a+a'))_t*0.84$ to $(a/(a+a'))_t*1.16$, wherein $(a/(a+a'))_t$ corresponds to the crystallography phase transition boundary on the crystallography phase diagram at the room temperature (i.e., 22° C.). In a further embodiment, a>0, and a'>0. In a particular embodiment, a>a'. In another particular embodiment, M may include Na. In a more particular embodiment, M may be Na.

In an embodiment, the halide material may have a crystallography phase transition, including a transition across the crystallography phase transition boundary. In another embodiment, the crystallography phase transition may include changes to one or more characteristics of the crystalline structure. An example of a characteristic of the crystalline structure may include a volume of the unit cell, space group, crystal system, one or more features of the XRD pattern, or any combination thereof.

In an embodiment, the halide material may include a monoclinic, trigonal, hexagonal, or orthorhombic crystal system, and a crystallography phase transition may include a transition from one of the crystal systems to another. In a further embodiment, the halide material may include a crystallography phase transition, including a transition from a layered structure to a non-layered structure. For example, the crystallography phase transition may include a transition from the crystal system of monoclinic to trigonal. In a further embodiment, the crystallography phase transition may include a transition from C2/m space group or R-3m space group to P-3 m1 or Pnma space group. In yet another embodiment, the crystallography phase transition may include a transition from a cubic close-packed structure to a hexagonal close-packed structure.

In a further embodiment, the crystallography phase transition may include a transition from a non-layered structure to another non-layered structure. In still another embodiment, the crystallography phase transition may include a transition from a non-layered structure to a layered structure. In a particular example, the crystallography phase transition may include a transition from R3c to R3m. In another particular example, the crystallography phase transition may include a transition from P-3m1 or Pnma space group to C2/m space group or R-3m space group.

In a further embodiment, certain crystalline structure characteristics may not change when the halide material has a crystallography phase transition. For example, the XRD pattern of the halide material may include a phase transition feature representative of an increase or decrease of the unit cell volume, while certain other XRD features may not change. In a particular example, the halide material may include a crystallography phase transition and an XRD pattern, including the absence of a peak between 5° and 13° 2-theta.

In an embodiment, the halide material can have a phase transition without changing the elements of the halide material. As discussed above, stoichiometric proportions of elements may be adjusted. The proportions of elements may be represented by mol % or at %.

In an embodiment, the halide material can be stoichiometric. In another embodiment, the halide material may be non-stoichiometric. For example, the halide material may include vacancies that replace some of the elements in the composition and keep an electroneutrality of the phase under the scope.

In an embodiment, the halide material may be represented by $Li_{a-f}M_aRE_bMe'^k{}_{b'}(Cl_cBr_{c'})_{6-f+(k-3)*b'}$, wherein $(a+a')=3$, $-1\leq f\leq 1$, $(c+c')=1$, and $(b+b')=1$. In a particular embodiment, the halide material may include X and X', wherein $c>c'$, and $0.63\leq c/(c+c')\leq 0.98$.

In another embodiment, the halide material may be represented by $Li_{3-f}RE_bMe'^k{}_{b'}(Cl_cBr_{c'})_{6-f+(k-3)*b'}$, wherein $0\leq f\leq 0.3$, $(c+c')=1$, $(b+b')=1$, $b>0$, and $b'\geq 0$. In a particular aspect, b' may be 0. A particular example of the halide material may include $Li_3Y_1(Cl_cBr_{c'})_6$, wherein $0.63\leq c/(c+c')\leq 0.87$. In another aspect, $b>b'>0$. A particular example of the halide material may include $Li_{3-f}Y_bMe'^k{}_{b'}(Cl_cBr_{c'})_{6-f+(k-3)*b'}$, wherein k=3 or 4, and $0.65\leq c/(c+c')\leq 0.98$. A more particular example of the halide material may include $Li_{3-b}Y_bZr_b(Cl_cBr_{c'})_6$, wherein $0.72\leq c/(c+c')\leq 0.98$. Another more particular example of the halide material may include $Li_{3-f}Y_bYb_b(Cl_cBr_{c'})_{6-f}$, wherein $0.65\leq c/(c+c')\leq 0.89$. Another more particular example of the halide material may include $Li_{3-f}Y_bIn_b(Cl_cBr_{c'})_{6-f}$, wherein $0.69\leq c/(c+c')\leq 0.95$.

A more particular example of the halide material may include $Li_3Y_1(Cl_{0.8}Br_{0.2})_6$, $Li_3Y_1(Cl_{0.67}Br_{0.33})_6$, $Li_3Y_1(Cl_{0.79}Br_{0.21})_6$, $Li_3Y_1(Cl_{0.62}Br_{0.38})_6$, $Li_{2.95}(Y_{0.95}Zr_{0.05})(Cl_{0.9}Br_{0.1})_6$, $Li_3(Y_{0.95}Yb_{0.05})_1(Cl_{0.83}Br_{0.17})_6$, $Li_3(Y_{0.95}In_{0.05})_1(Cl_{0.9}Br_{0.1})_6$.

Figure 8:
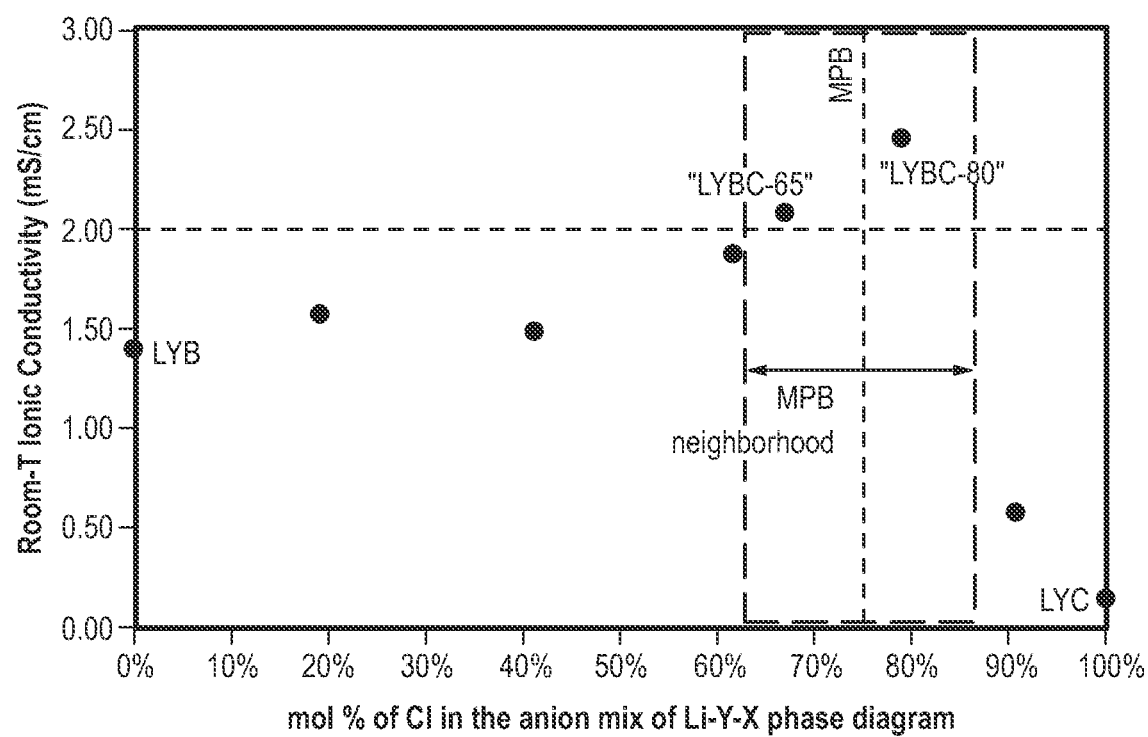
FIG. 8 includes a plot of concentration of Cl vs. ionic conductivity of a halide material in accordance with an embodiment.

FIG. 8 includes a plot of the concentration of Cl in mol % vs. ionic conductivity of $Li_3YCl_cBr_c$ at room temperature. As illustrated, Cl is at 75 mol % at the crystallography phase transition boundary (indicated by the vertical dotted line and referred to as MPB in FIG. 8). The halide material may have a crystalline structure similar to the layered crystalline structure of LYB before the mol % of Cl increases to 75 mol %. The halide material may have a crystalline structure similar to the non-layered crystalline structure of LYC when the mol % of Cl is at least 75 mol %.

As illustrated in FIG. 8, when the concentration of Cl is increased to approximately 63 mol %, the ionic conductivity of the halide material can be increased to approximately 2 ms/cm. As further illustrated, the ionic conductivity of the halide material can be greater than 2 ms/cm, when the concentration of Cl is adjusted to approximately 65 mol % (referred to as "LYBC-65" in FIG. 8) and 80 mol % (referred to as "LYBC-80" in FIG. 8). In particular, when the concentration of Cl is adjusted to the range from 63 mol % to 87 mol %, the ionic conductivity of the halide material can be at least 2.08 mS/cm or at least 2.20 mS/cm, which is unexpectedly higher than the ionic conductivity of LYB.

LYB has a layered crystalline structure that facilitates higher ionic conductivity of LYB than LYC that has a non-layered crystalline structure. When the concentration of Cl is in a range from 63 mol % to less than 75 mol %, the crystalline structure of the halide material is likely distorted and not a typical layered structure compared to the layered structure of LYB. When the concentration of Cl is from 75 mol % to 87 mol %, the halide material has a non-layered crystalline structure. It is thus unexpected that the halide material can have ionic conductivity that is significantly higher than the ionic conductivity of LYB, when the halide material has a crystalline structure that may be less favorable than the layered structure of LYB for having a higher ionic conductivity.

Figure 9A:
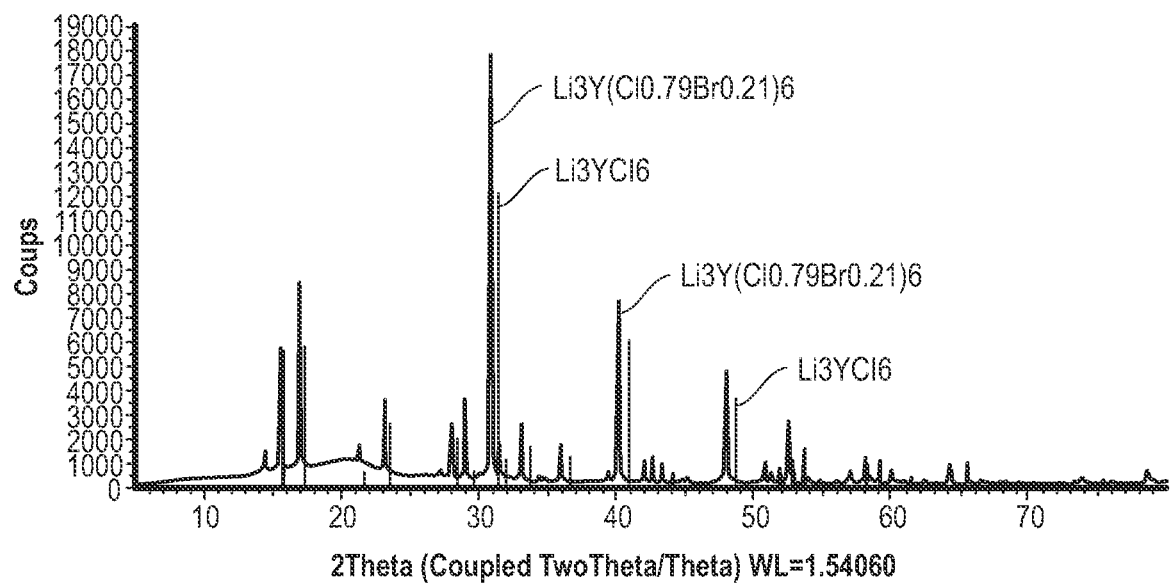
FIGS. 9A and 9B include illustrations, including readouts of XRD patterns of additional halide materials.
Figure 9B:
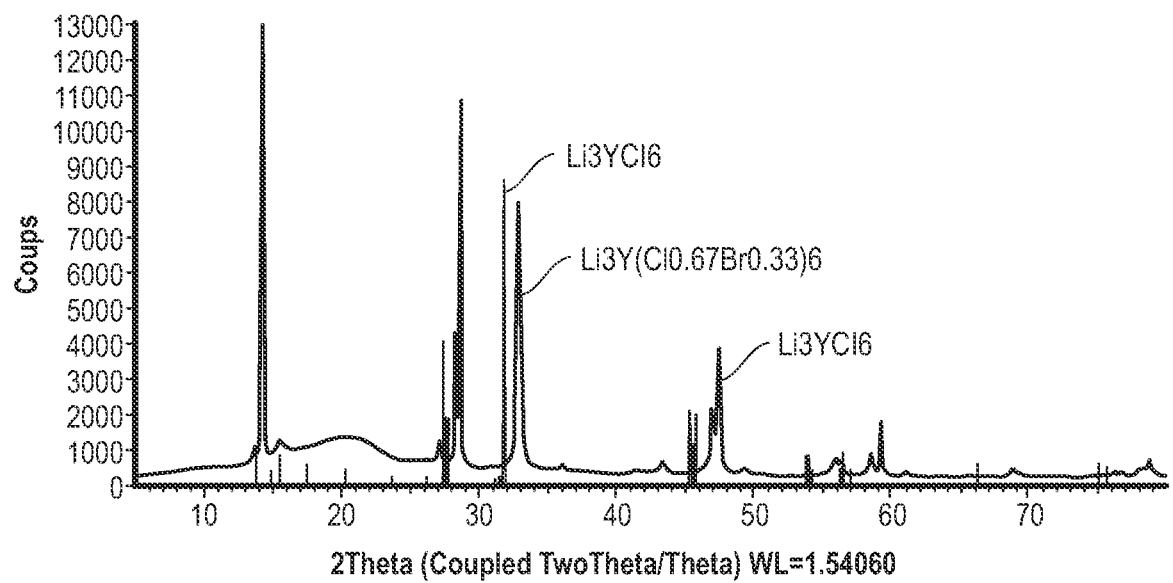

FIG. 9A includes an illustration of the powder XRD pattern measured with Cu K-alpha radiation of a representative halide material, $Li_3Y(Cl_{0.79}Br_{0.21})_6$, overlayed with the XRD pattern of $Li_3YCl_6$. The XRD peaks of the representative halide material are shifted to smaller angles compared to corresponding peaks of the powder XRD pattern of $Li_3YCl_6$. Referring to FIG. 9B, the powder XRD pattern measured with Cu K-alpha radiation of a representative halide material, $Li_3Y(Cl_{0.67}Br_{0.33})_6$ is combined with the XRD pattern of $Li_3YBr_6$. Corresponding peaks of the representative halide material are shifted to larger values of 2-theta compared to $Li_3YBr_6$. It can be observed that $Li_3Y(Cl_{0.67}Br_{0.33})_6$ is a single-phase halide material.

In an embodiment, the halide material may be represented by $Li_{3-f}RE_bMe'^k{}_{b'}X_{6-f+(k-3)*b'}$, wherein $-1\leq f\leq 1$, and $(b+b')=1$. In a particular aspect, k=3. For example, Me may include In. In another particular aspect, RE may include Y. In still another particular aspect, $0.67\leq b/(b+b')\leq 0.93$. A particular example of the halide material may include $Li_{3-f}Y_bIn_{b'}X_{6-f}$.

In another embodiment, the halide material may be represented by $Li_aM_aREX_6$, wherein $a>a'>0$, $(a+a')=3$, and $0.942\leq a/(a+a')\leq 0.958$. In an aspect, M may include Na. In another aspect, RE may include Y. In another aspect, X may include Cl. In a particular aspect, the halide material may be represented by $Li_aNa_{a'}YCl_6$, and $0.942\leq a/(a+a')\leq 0.958$.

A more particular example of the halide material may include $Li_3(Y_{0.85}In_{0.15})Cl_6$, and $(Li_{0.955}Na_{0.045})_3YCl_6$.

In an embodiment, the halide material may be represented by the formula, $Li_aM_aRE_bMe'_{b'}Cl_cX'_{c'}$, wherein Me may have a smaller ionic radius than RE. In a particular aspect, RE may be Y. In an aspect, Me having a smaller ionic radius may facilitate a crystallography phase transition of the halide material from a non-layered structure, when b'=0, to a layered crystalline structure. For example, the crystallography phase transition may include a transition from Pnma or P-3m1 to C2/m or C2/c. In another example, the crystallography phase transition may include a transition from orthorhombic to monoclinic crystallography. In a further aspect, crystallography phase transition may be controlled by adjusting stoichiometric proportions of RE and Me. In particular, when $(b/(b+b'))_t*0.84<b/(b+b')<(b/(b+b'))_t*1.16$, the halide material can have significantly improved properties including for example, ionic conductivity, compared to when $b/(b+b')>(b/(b+b'))_t*1.16$ and $b/(b+b')<(b/(b+b'))_t*0.84$. An example of Me may include a divalent element, a trivalent element, a tetravalent element, or any combination thereof. A particular example of Me may include Yb, SC, In, Zr, Ga, or any combination thereof.

In an embodiment, the halide material may be represented by the formula, $Li_aM_aRE_bMe'_{b'}Cl_cX'_{c'}$, wherein X' may have a larger ionic radius than Cl. In an aspect, X' may include Br, I, or a combination thereof. In a particular aspect, RE may be Y. In a further aspect, X' having a larger ionic radius may facilitate a crystallography phase transition from a non-layered structure of the halide material, when c'=0, to a layered crystalline structure by adjusting stoichiometric proportions of Cl and X'. In particular, the halide material can have significantly improved properties, such as ionic conductivity, when $(c/(c+c'))_t*0.84<c/(c+c')<(b/(b+b'))_t*1.16$, compared to when $(c/(c+c'))_t*0.84>c/(c+c')$ and $c/(c+c')>(b/(b+b'))_t*1.16$.

In another embodiment, the halide material may be represented by the formula, $Li_aM_aRE_bMe'_{b'}Cl_cX'_{c'}$, wherein M may have a larger ionic radius than Li. In an aspect, M may include Na, K, Cs, Cu, or a combination thereof. In a particular aspect, RE may be Y. In a further aspect, M having a larger ionic radius may facilitate a crystallography phase transition from a non-layered structure of the halide material, when a'=0, to a layered crystalline structure or another non-layered structure. For example, the crystallography phase transition may include a transition from Pnma or P-3ml to C2/m or C2/c. In another example, the transition may include transitioning from orthorhombic to cubic elpasolite or monoclinic crystalline structure. In a particular aspect, transition may be controlled by adjusting stoichiometric proportions of Li and M. In particular, the halide material can have significantly improved properties, such as ionic conductivity, electrochemical stability, conformity, or any combination thereof, when $(a/(a+a'))_t*0.84 < a/(a+a') < (a/(a+a'))_t*1.16$, compared to when $(a/(a+a'))_t*0.84 > a/(a+a')$ and $a/(a+a') > (a/(a+a'))_t*1.16$.

In an embodiment, the halide material may be represented by the formula, $Li_aM_aRE_bMe'_bCl_cX'_c$, wherein Me may have a larger ionic radius than RE. In a particular aspect, RE may be Y. In an aspect, Me having a larger ionic radius may facilitate a crystallography phase transition of the halide material from a non-layered structure, when b'=0, to a layered or another non-layered crystalline structure. For example, the crystallography phase transition may include a transition from Pnma or P-3ml to C2/m or C2/c. In another example, the crystallography phase transition may include a transition from orthorhombic to monoclinic crystallography. In a further aspect, crystallography phase transition may be controlled by adjusting stoichiometric proportions of RE and Me. In particular, when $(b/(b+b'))_t*0.84 < b/(b+b') < (b/(b+b'))_t*1.16$, the halide material can have significantly improved properties including for example, ionic conductivity, compared to when $b/(b+b') > (b/(b+b'))_t*1.16$ and $b/(b+b') < (b/(b+b'))_t*0.84$. An example of Me may include a divalent element, a trivalent element, a tetravalent element, or any combination thereof. A particular example of Me may include Bi, La, Ce, Gd, or any combination thereof.

In an embodiment, the halide material may be represented by the formula, $Li_aM_aRE_bMe'_bCl_cX'_c$, wherein X' may have a smaller ionic radius than Cl. In an aspect, X' may include F. In a particular aspect, RE may be Y. In a further aspect, X' having a smaller ionic radius may facilitate a crystallography phase transition from a non-layered structure of the halide material, when c'=0, to a layered or another non-layered crystalline structure by adjusting stoichiometric proportions of Cl and X'. In particular, the halide material can have significantly improved properties, such as ionic conductivity, electrochemical stability, conformity, or any combination thereof, when $(c/(c+c'))_t*0.84 < c/(c+c') < (b/(b+b'))_t*1.16$, compared to when $(c/(c+c'))_t*0.84 > c/(c+c')$ and $c/(c+c') > (b/(b+b'))_t*1.16$.

In an embodiment, the crystallography phase transition boundary may be determined as follows, using the halide material represented by $Li_{3-x*k}(Y_{1-x}Me^{k+}_x)(Cl_cBr_{c'})_6$ as an example. The MBP of the halide material may be determined according to the formula, $[c/(c+c')]_t=0.75+12*(\delta*x)$, wherein the ionic radius of $Me^{k+}$ is r, wherein $r=r\_Y^{3+}*(1-\delta)$, wherein $r\_Y^{3+}$ is the ionic radius of $Y^{3+}$. Similarly, the MPB could be determined for halide materials having the crystallography phase transition induced by adjusting Li substitution by M or induced by adjusting Me substitution by Me'.

In an embodiment, the halide material may include a crystalline phase that is within a particular band range, including the crystallography phase transition boundary on the composition phase diagram. In an aspect, the band range may be represented by the range of the concentration of an element of the halide material, such as one of Li and M, one of Me and Me', or one of X and X'. For example, the halide material may have the crystallography phase within the concentration range of an element from 0.84 to 1.16 folds of the concentration of the element at the crystallography phase transition boundary. In particular, the stoichiometric proportions of the element may be adjusted to facilitate the crystallography phase transition and improvement of properties of the halide material. In a particular aspect, the halide material may consist essentially of the crystalline phase that is within the particular band range. For instance, the anions of the halide material may be present in the same phase. As discussed in embodiments herein, the halide material can have a low content of impurities or may be essentially free of impurities. For instance, the levels of impurities may be below the detectable level using conventional detection methods. Accordingly, "consisting essentially of a single-phase" is intended to mean the halide material may include a low level of impurity phases in addition to the main phase of the complex compound of the halide material; or the halide material may be free of impurity phases. The impurity phase may also be referred to as parasitic impurity phase in this disclosure.

In an embodiment, the halide material can include a particular density that may facilitate improved property and/or performance of the solid electrolyte material. In an aspect, the density may be greater than 2.3 g/cm³, such as at least 2.5 g/cm³, at least 2.7 g/cm³, at least 2.9 g/cm³, at least 3.1 g/cm³, at least 3.3 g/cm³, or at least 3.5 g/cm³. In another aspect, the halide material may have a density of less than 3.8 g/cm³, such as not greater than 3.5 g/cm³, not greater than 3.4 g/cm³, not greater than 3.3 g/cm³, or not greater than 3.1 g/cm³. In another aspect, the halide material may have a density in a range including any of the minimum and maximum values noted herein. In a particular embodiment, the halide material may have a density smaller than the density of $Li_3YBr_6$ and greater than the density of $Li_3YCl_6$.

In an embodiment, the halide material may have notably improved thermodynamic electro-chemical stability comparing to $Li_3YBr_6$. In another embodiment, the halide material may include a Thermodynamic Electro-chemical Stability Value that can facilitate improved property of the solid electrolyte material. Thermodynamic Electro-chemical Stability Value can be determined based on the cyclic voltammetry or linear sweep voltammetry methods as follows. An electrochemical cell can be made with three layers. The active layer (i.e., working electrode) may include a mixture of carbon and the halide material. A separator layer may be made with the halide material. A counter electrode layer may be made of Indium metal or lithium-indium alloy. The voltage of the working electrode versus the counter electrode of the electrochemical cell can be gradually increased, and at the same time, the oxidative current can result in a peak or plateau indicating oxidation of the electrolyte and be measured. The onset value of the peak can be obtained by linear extrapolation of peak rise to the x-axis and is in volts. An offset of 0.62 V can be added to the onset value of the peak to obtain the Thermodynamic Electrochemical Stability Value and to convert the Indium counter electrode potential to the standard Li/Li+ potential.

In an aspect, the Thermodynamic Electrochemical Stability Value may be greater than 3.57 V, such as at least 3.60 V, at least 3.62 V, 3.65 V, or at least 3.71 V. In another aspect, the halide material may include a Thermodynamic Electrochemical Stability Value of not greater than 4.50 V, not greater than 4.30 V, not greater than 4.19 V, not greater than 4.15 V, not greater than 4.10 V, not greater than 3.85 V, not greater than 3.80 V, not greater than 3.75 V, or not greater than 3.71 V. In another aspect, the halide material can include a Thermodynamic Electrochemical Stability Value in a range including any of the minimum and maximum values noted herein.

In another embodiment, the halide material can include an improved ionic conductivity in bulk, including, for example, lithium ionic conductivity, compared to conventional corresponding halide material. The ionic conductivity in bulk can be measured at room temperature (i.e., 22° C.). In an aspect, the ionic conductivity can be greater than 0.05 mS/cm, greater than 0.15 mS/cm, at least 0.3 mS/cm, at least 0.5 mS/cm, at least 0.8 mS/cm, at least 0.9 mS/cm, at least 1.1 mS/cm, at least 1.5 mS/cm, or at least 1.7 mS/cm. In another aspect, the halide material may include an ionic conductivity in bulk measured at 22° C. of less than 4.5 mS/cm, less than 3.4 mS/cm, less than 2.8 mS/cm, less than 2.0 mS/cm, such as at most 1.9 mS/cm, at most 1.8 mS/cm, or at most 1.7 mS/cm. In another aspect, the halide material can have an ionic conductivity in bulk in a range including any of the minimum and maximum values noted herein.

In a further embodiment, the electrolyte material of embodiments herein can have further improved ionic conductivity, particularly when the halide material has a crystalline phase within a particular band range, including the morphotropic phase transition boundary (MPB) in the crystallography phase transition diagram. In an aspect, the halide material may have an ionic conductivity in bulk, as measured at 22° C., of at least 1.8 mS/cm, at least 1.85 mS/cm, at least 1.87 mS/cm, at least 2.0 mS/cm, at least 2.08 mS/cm, or at least 2.45 mS/cm. In another aspect, the halide material may include an ionic conductivity in bulk measured at 22° C. of at most 6.5 mS/cm, at most 6.1 mS/cm, at most 5.8 mS/cm, at most 5.3 mS/cm, at most 5.1 mS/cm, at most 4.7 mS/cm, at most 4.4 mS/cm, at most 4.1 mS/cm, at most 3.9 mS/cm, at most 3.6 mS/cm, at most 3.2 mS/cm, at most 3.0 mS/cm, at most 2.8 mS/cm, or at most 2.5 mS/cm. In another aspect, the halide material can have an ionic conductivity in bulk in a range including any of the minimum and maximum values noted herein.

As used herein, the ion conductivity in bulk can be measured by using electrochemical impedance spectroscopy applied to a dense pellet formed by pressing powder of the electrolyte material. The dense pellet can be sandwiched between stainless steel electrodes, and measurements can be performed under isostatic pressure of approximately 300 MPa. A sinusoidal voltage signal can be applied to the dense pellet at frequencies from 7 MHz down to 1 Hz with an amplitude of 50 mV. The ionic conductivity in bulk can be measured at 22° C. In embodiments, activation energy can be obtained to aid understanding of certain characteristics of the electrolyte material, such as ionic conductivity in bulk versus temperature. For example, lower activation energy may suggest less variation of ionic conductivity in bulk with temperature changes. To determine activation energy, ionic conductivity in bulk can be measured at temperatures from 22° C. to 150° C. to create an Arrhenius plot based on the equation, $IC(T)=A \times \exp(-E_a/RT)$, wherein A is pre-exponential constant, $E_a$ is the activation energy in eV, R is the universal constant that translates degrees Kelvin in eV, and T is the temperature in degree Kelvin. The slope of the line of the plot can be used to determine the activation energy. In particular embodiments, activation energy can be in the range of 0.2 eV and 0.5 eV.

Figure 3:
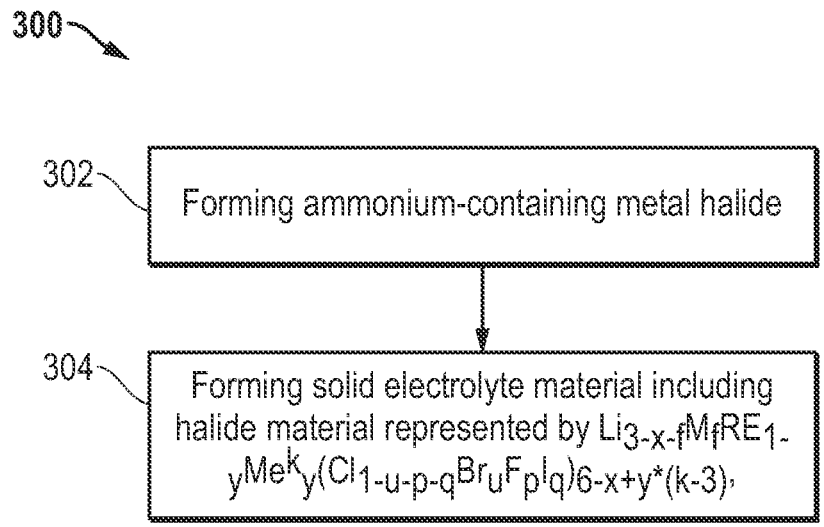
FIG. 3 includes a flowchart illustrating a process of forming a solid electrolyte material according to an embodiment.

Referring to FIG. 3, a process 300 for forming the solid electrolyte material, including the halide material, is illustrated.

The process 300 is different from the conventional solid-state synthesis for forming complex halide material. The conventional process utilizes high-energy ball milling or directly heating the solid reactants mixture (e.g., simple metal halides) at a temperature near or below the melting points of the metal halides to perform the solid-state reaction. Because the probability of reacting individually separated particles in a mixture decreases as the reaction proceeds, achieving the 100.00% completion of the reaction will theoretically take an infinite amount of time. It is thus understandable the reaction products resulted from the conventional solid-state synthesis that is based on high energy ball milling have a higher concentration of impurities, such as a simple metal halide (e.g., lithium halide and/or yttrium halide), due to incomplete reactions of the simple metal halides.

It is further notable the conventional synthesis of a complex halide based on the ammonium-halide route may not be applicable for forming the complex metal halide. Metal halides are used conventionally as starting materials. As some trivalent metal halides and tetravalent metal halides, and in particular rare-earth halides, tend to form stable metal halide hydrates, rendering it difficult to completely remove the water molecules from those hydrates. Increasing the temperature can result in the formation of undesired metal oxyhalide or metal oxyhydrate halide compounds at a higher concentration. Further, metal halide hydrates and metal oxyhalides, particularly those including rare-earth metal, are rather stable compounds and less likely to form complex compound phases containing a high concentration of Li, such as $Li_3RE(OX)Cl_3$, wherein X is a halogen other than Cl. Further, those complex compounds would not be stable and would likely decompose into simpler compounds.

The processes described in embodiments in this disclosure overcome the problems noted above.

The process 300 may start with forming a mixture of starting materials, including one or more metal compounds of Li, M, RE, Me, or any combination thereof, at a stoichiometric ratio or non-stoichiometric ratio. The metal compound may be non-hygroscopic. In particular, the starting materials can include ammonium halide, $NH_4X$, wherein X includes Cl, Br, I, F, or any combination thereof. The starting materials can further include an acid, such as hydrochloric or hydrobromic acid, to facilitate the acidic synthesis in an aqueous, alcohol, or other polar molecular liquid solution.

In exemplary implementations, the metal compound can include oxide, carbonate, sulfate, hydrate, hydroxide, oxalate, acetate, nitrate, or any combination thereof. For example, the starting material may include an oxide including $Me_2O_k$, including, for example, one or more of rare-earth oxide. In another example, hydroxide or carbonate, such as lithium carbonate, sodium carbonate, cesium carbonate, $Fe(OH)_2$ or $Fe(CO_3)$, or any combination thereof may be used.

Referring to FIG. 3, the process 300 may include forming an ammonium-containing halide from the starting materials, as illustrated at block 302. Exemplary ammonium-containing halide may include $(NH_4)_z RE_{1-y} Me^k_y (Cl_{1-u-p-q} Br_u F_p I_q)_{3+z+y*(k-3)}$; $(NH_4)_z RE_{1-y} Me^k_y (Cl_{1-u} Br_u)_{3+z+y*(k-3)}$, $(NH_4)_z RE_{1-y} Me^k_y (Cl_{1-p} F_p)_{3+z+y*(k-3)}$, $(NH_4)_z RE_{1-y} Me^k_y (Cl)_{3+z+y*(k-3)}$, $(NH_4)_z RE_{1-y} Me^k_y (Br)_{3+z+y*(k-3)}$, $(NH_4)_z RE_{1-y} Me^k_y (I)_{3+z+y*(k-3)}$, or a combination thereof. In particular implementations, $0.33 <= z <= 5$. In instances, forming the ammonium-containing metal-halide material can be conducted in a liquid medium, such as an acid solution. An exemplary acid can include hydrochloric acid, hydrobromic acid, hydrofluoric acid, hydroiodic acid, or any combination thereof. In further instances, forming the ammonium-containing metal-halide material can be conducted in a particular dry condition.

In an embodiment, forming the ammonium-containing metal-halide material can be conducted at a temperature of up to 250° C. For example, the temperature may be at least 20° C., at least 40° C., at least 50° C., at least 70° C., at least 90° C., at least 110° C., or at least 140° C. In another example, the temperature may be not greater than 200° C., not greater than 180° C., not greater than 160° C., or not greater than 140° C. In further examples, ammonium-containing metal-halide may be formed at a temperature in a range including any of the minimum and maximum values noted herein.

In an exemplary synthesis of the halide material, ammonium-containing metal-halide may include two metal cations and one halide anion and be used to form the halide material of embodiments herein. In at least one exemplary synthesis process, ammonium-containing metal-halide may be treated to form metal halide, and reactions between metal halides having different halide anions may be performed to form the halide material of embodiments herein. For example, $Li_3YBr_6$ and $Li_3YCl_6$ may be formed separately and then mixed to form $Li_3YCl_{6(1-u)}Br_{6u}$ described below in detail. The following reactions may take place in the mixture of the starting materials, including $Li_2CO_3$, $Y_2O_3$, HBr, $NH_4Br$, and $H_2O$ to form $Li_3YBr_6$.

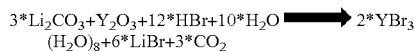
3*$Li_2CO_3$+$Y_2O_3$+12*HBr+10*$H_2O$ → 2*$YBr_3$ ($H_2O$)$_8$+6*LiBr+3*$CO_2$

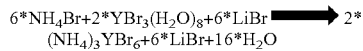
6*$NH_4Br$+2*$YBr_3$($H_2O$)$_8$+6*LiBr → 2*$(NH_4)_3YBr_6$+6*LiBr+16*$H_2O$ The above reaction mixture may be heated at 140° C. at reduced pressure to remove moisture and facilitate the following reaction in the solid-state.

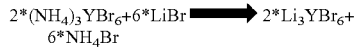
2*$(NH_4)_3YBr_6$+6*LiBr → 2*$Li_3YBr_6$+6*$NH_4Br$

The reaction mixture may be further heated at 550° C. to sublimate ammonium bromide.

$Li_3YCl_6$ may be formed as follows from the mixture of the starting materials, including $Y_2O_3$, $Li_2CO_3$, $H_2O$, $NH_4Cl$, and HCl.

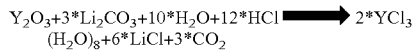
$Y_2O_3$+3*$Li_2CO_3$+10*$H_2O$+12*HCl → 2*$YCl_3$($H_2O$)$_8$+6*LiCl+3*$CO_2$

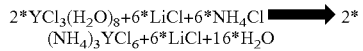
2*$YCl_3$($H_2O$)$_8$+6*LiCl+6*$NH_4Cl$ → 2*$(NH_4)_3YCl_6$+6*LiCl+16*$H_2O$ The reaction mixture may be heated at 140° C. at reduced pressure to remove moisture and facilitate the following reaction in the solid-state.

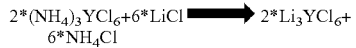
2*$(NH_4)_3YCl_6$+6*LiCl → 2*$Li_3YCl_6$+6*$NH_4Cl$

The reaction mixture may be further heated at 550° C. to sublimate ammonium chloride.

After formation, the $Li_3YCl_6$ phase may be mixed with the $Li_3YBr_6$ phases at stoichiometric ratios, and solid-state reaction may be performed at dry conditions in an inert atmosphere, such as nitrogen, to form $Li_3YCl_{(1-u)*6}Br_{6*u}$.

In certain instances, chunks of the $Li_3Y(Cl_{1-u}Br_u)_6$ material may be formed from the solid-state reaction, and milling may be performed in a neutral atmosphere of $N_2$ or Ar to form a powder.

In a further embodiment, ammonium-containing metal halides may be formed to facilitate the formation of the halide material of embodiments herein. Using the halide material represented by $Li_3YCl_cX'_{c'}$ as an example, $(NH_3)_3Li_3YBr_9$ and $(NH_3)_3Li_3YCl_9$ in the aquatic solution may be formed separately using raw materials described in embodiments herein. In an aspect, the solutions may be mixed and dried at 100 to 170° C. to allow evaporation of the moisture and acids. In a particular aspect, the solid-state reaction of the halide compounds and sublimation of $NH_3Cl$ and $NH_3Br$ from the charge may be performed in parallel at a relatively low temperature. For example, a flux with LiCl and $NH_4Cl$ may be formed at temperatures below the sublimation point of $NH_4Cl$. $NH_4Br$ may be sublimated at temperatures higher than 350° C. Not wishing to be bound to any theory, it is noted that the presence of ammonium halide may allow the formation of the final phase of $Li_3YCl_cX'_{c'}$ at relatively low temperatures, which help form the uniform c/c' ratio throughout the final phase, which can be advantageous over the synthesis of halide powder using a traditional solid-state reaction of LYC and LYB powders, because the traditional solid-state synthesis usually results in relatively high dispersions of c/c' ratios in the final product such that the final product can have a plurality of phases including different ratios of c/c'.

Figure 10:
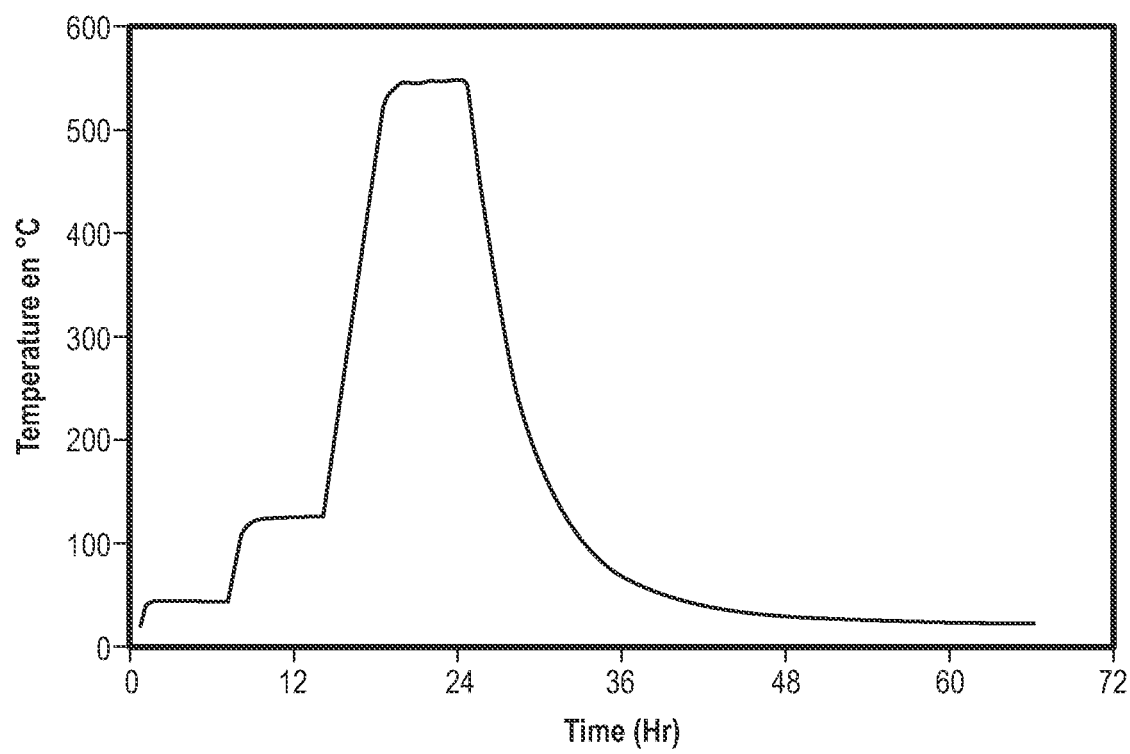
FIG. 10 includes an illustration of a forming process according to an embodiment.

In another aspect, following the sublimation of ammonium, cooling may be performed. In particular, cooling should be carefully controlled to avoid segregation of the crystalline phase of the halide material. In a particular implementation, the cooling rate may be up to 200° C./hour, such as greater than 40° C./hour, at least 60° C./hour, at least 70° C./hour, at least 90° C./hour, or at least 100° C., at least 150° C./hour, or at least 180° C./hour. FIG. 10 includes an illustration of an exemplary process of forming the halide material, $Li_3Y(C_{0.65}Br_{0.35})_6$, including a particular accelerated cooling step. In the illustrated process, after forming and combining the ammonium-containing LYB and ammonium-containing LYC solutions, drying the reaction mixtures is performed at approximately 120° C. The reaction mixtures are heated to approximately 550° C. to perform the solid-state reaction and sublimate ammonium in parallel. Accelerated cooling is performed after the sublimation. The halide material, $Li_3YC_{4.5}Br_{1.5}$, has a single phase.

A skilled artisan appreciates additional alkali metal compounds, such as $Na_2CO_3$ or NaCl, may be added to the mixture of starting materials to partially substitute Li in the halide material. Similarly, a compound of another RE or Me metal, such as $Fe_2O_3$, may also be added to the mixture to substitute Y in the halide material.

In applications, the reaction mixtures may be filtered to remove larger particles from the reactions in the solid-state. Larger particles can include impurities that come with any of the starting materials, remaining particles of the starting materials, carbon, or any combination thereof.

In another exemplary synthesis, ammonium-containing ternary halides may be used directly to form the halide material. Referring to the above exemplary synthesis reactions, after forming $(NH_4)_3YCl_6$ and $(NH_4)_3YBr_6$ separately, the reaction mixture of $(NH_4)_3YCl_6$ and LiCl can be combined with the reaction mixture of $(NH_4)_3YBr_6$ and LiBr in the aqueous solution and the mixture including the four reactants can be dried together to form $Li_3Y(Cl_{1-u}Br_u)_6$ in the solid-state reaction. Sublimation of ammonium halide may be performed at 550° C.

After sublimation of ammonium halide, cooling may be performed for forming the halide material. For example, cooling may be performed in air, dry air, or a nitrogen atmosphere. In another example, a cooling temperature, such as below 200° C., at most 100° C., at most 70° C., at most 50° C., or at most 30° C., may be applied. In particular implementations, cooling can be performed in a dry atmosphere at room temperature. Optionally, Ar or $N_2$ may be used to facilitate cooling.

In another embodiment, an ammonium-containing metal-halide including at least two halide anions at any predetermined ratio may be formed in a single step. In particular implementations, ternary halides may be mixed at a stoichiometric or nonstoichiometric ratio and melted in the presence of ammonium halide salt. Ammonium halide may help protect the reaction from moisture. In an example, each ternary halide may include two metal cations and one halide anion, wherein the halide anions may be different between the ternary halides. In certain examples, a ternary halide may include two halide anions. Metal cations may be the same or different between the ternary halides. An exemplary heating temperature may be up to 600° C. to help melt the materials and to facilitate the reaction in the solid-state. The heating temperature can further help ammonium escape from the halide material. Heating may be performed in a neutral atmosphere of nitrogen or argon. Cooling may be performed to solidify the halide material.

An exemplary synthesis process is illustrated below. The illustrated reaction may allow the formation of ammonium-containing metal-halide in one step from the starting materials, including $Li_3YCl_6$, $Li_3YBr_6$, and $NH_4Br$. A skilled artisan will appreciate that various ratios of the starting materials may be used to form halide materials having the predetermined ratios between the halide anions.

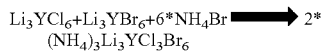

$$Li_3YCl_6 + Li_3YBr_6 + 6*NH_4Br \longrightarrow 2*(NH_4)_3Li_3YCl_3Br_6$$

Ammonium halide may be sublimated at the heating temperature from 250° C. to 650° C. In some instances, a dopant material, such as a Me compound, may be added to the melt to facilitate substitutions of one or more metal elements of the halide material. The reaction may be performed in a crucible made of quartz, alumina, silica-alumina, BN, glassy carbon, or graphite. Controlled cooling may be applied to the melt to solidify the halide material.

In particular implementations, the cooling rate may be controlled to facilitate a particular crystal growth rate to allow the growth of single crystals having a macroscopic size, such as a monocrystalline block of up to 10 centimeters. For example, cooling can be facilitated by an external thermal field with a cooling rate of 10° C./hour to 50° C./hour. The crystal growth rate can be at least 0.2 mm/hour, at least 0.3 mm/hour, or at least 0.5 mm/hour. Additionally, or alternatively, the growth rate can be at most 10 mm/hour, such as at most 8 mm/hour, at most 6 mm/hour, at most 5 mm/hour, at most 3 mm/hour, or at most 1 mm/hour.

In another particular implementation, the crystal growth rate may be relatively higher, such as at least 8 mm/hour, at least 10 mm/hour, at least 15 mm/hour, or at least 20 mm/hour to facilitate the growth of polycrystalline crystal. Additionally, or alternatively, the growth rate can be at most 80 mm/hour, at most 70 mm/hour, at most 60 mm/hour, at most 50 mm/hour, or at most 40 mm/hour.

In particular implementations, solidification may be performed by applying a thermal gradient in the melting zone to facilitate the growth of crystals having a particular crystalline orientation. For instance, a crucible with an aspect ratio of length to diameter of more than 5 may be used to facilitate the solidification of a block under a thermal gradient. The process might be particularly suited for crystals that are anisotropic. In particular instances, a strong thermal gradient may be applied, such as 10° C./cm or higher.

In another implementation, crystals that are anisotropy for magnetic permeability or dielectric constant, oriented crystal growth may be conducted using a strong permanent magnetic field, solidification under a strong electric field, or any combination thereof.

In another particular implementation, the crystallization of pellets or particles elongated in the crystallographic direction with higher ionic conductivity may be conducted. For example, single-crystal pellets may be arranged to form a ceramic halide material having a particular crystallographic orientation. In a further example, casting, compacting, pressing, heating, molding, or any combination thereof, may be used to facilitate the formation of orientated polycrystalline halide material. In particular instances, single-crystal pellets having the preferred crystallographic orientation may be used to form oriented ceramic halide material. Optionally, an X-ray goniometer can be used to identify the orientation of crystals. In further instances, utilizing a supporting seeding layer having a lattice parameter close to the oriented ceramics material and solidification in the flux media may help keep the oriented polycrystalline structure.

The single crystal halide material, as formed, may be smaller chunks of the order of a few millimeters or a densified block or large ingots up to tens of centimeters in size. In exemplary applications, a single crystal may be ground to form a fine powder of single-crystal particles. In further examples, a single crystal ingot or block may be sliced into thin sheets. For instance, the thin sheet can have a thickness from 5 microns to 500 microns. In particular, a single crystal can be sliced such that the crystallographic direction with a higher conductivity may be in the thickness direction of the thin sheet. For example, the halide material may be formed having a crystallographic orientation represented by <HKL> (or <HKLM>) that has a higher ionic conductivity than a different crystallographic orientation that the halide material may be oriented in and may be sliced such that the thickness of the slice extends in the crystallographic orientation of <HKL> (or <HKLM>).

In certain instances when an incongruent melting occurs, resulting parasitic phases may be removed from the solidified ingot, such as by grinding off the top that contains the parasitic phases. When present, parasitic phases may be at most 10 vol % of the crystal. Adding an excessive amount of a dopant material to the melt may help reduce the formation of parasitic phases and facilitate the formation of stoichiometric single-phase crystals at self-flux conditions, for example, with an excess of LiX or NaX.

Utilizing crystal growth to form the halide material can help further reduce one or more non-reacted simple halide phases, including the metal element of Li, RE, Me, or Me. The process can facilitate the formation of the halide material essentially free of simply metal halide phase.

In another embodiment, ammonium-containing halide may be mixed and co-melted to form crystalline halide material. For instance, ammonium-containing halides may be formed separately as described in embodiments herein, and the reaction mixtures, including the ammonium-containing halide, may be combined, dried, and co-melted. In a specific example, referring to the above exemplary synthesis reactions, after forming $(NH_4)_3YCl_6$ and $(NH_4)_3YBr_6$ separately, the reaction mixture of $(NH_4)_3YCl_6$ and LiCl can be combined with the reaction mixture of $(NH_4)_3YBr_6$ and LiBr in the aqueous solution and the mixture including the four reactants can be heated to dry and melt together to form the halide material, $Li_3Y(Cl_{1-u}Br_u)_6$, in the solid-state reaction at heating temperatures of up to 600° C. Sublimation of ammonium halide may occur at the heating temperatures. In instances, the ammonium halide phase may be removed by decomposition at a higher temperature, such as up to 800° C. Solidification can be performed as described in embodiments herein.

Removal of ammonium halide may be monitored by collecting and weighing ammonium halide that escapes from the halide material. Ammonium halide may be completely removed, or in certain instances, a particular amount of ammonium halide phase may remain in the halide material. For example, heating may be conducted for at least 15 minutes to at most 24 hours at a temperature in a range from 350° C. to 800° C. to allow partial or full sublimation and/or decomposition of ammonium halide. Sublimation or decomposition of ammonium halide may help remove undesired reaction products such as water, $CO_2$, ammonia, and halogen, such as by evaporation.

In an embodiment, the halide material may be formed essentially free of the ammonium halide phase. In at least one embodiment, the halide material may include a particular content of residual ammonium halide of at least 2 ppm for the total weight of the halide material, such as at least 10 ppm, at least 100 ppm, at least 300 ppm, at least 500 ppm, at least 0.2 wt %, at least 0.5 wt %, or at least 1 wt % for the total weight of the halide material. Alternatively, or additionally, the halide material includes at most 5 wt %, such as at most 3 wt % of ammonium halide for the weight of the halide material. It is noted including up to 5 wt % of ammonium halide phase in the halide material may help improve the ionic conductivity of the halide material.

After cooling and/or solidification, as illustrated at block 304, the halide material may be formed.

A corresponding halide material formed by a conventional synthesis method, such as ball-milling-based solid-state reaction, typically includes higher contents of impurities, and when used to grow crystals following the process of Bridgman-Stockbarger, Gradient-Freeze, Czochralski, or Bagdasarov (Horizontal Bridgman), is likely to melt incongruently, and crystals, as formed, is likely to have higher contents of impurity and parasitic phases. Utilizing simple compounds as the starting material for the melt to directly grow crystals can also result in higher contents of impurity and parasitic phases. Typical impurity and parasitic phases can include one or more simple metal halides, such as LiX and $Me^{k+}X_k$, wherein X is a halogen. It is notable that the processes described in embodiments herein can facilitate the formation of the halide material with improved purity comparing to a corresponding conventional halide material. It is further notable higher purity can facilitate improved ionic conductive of the halide material. In particular embodiments, the halide material consists of a single phase.

In a further aspect, the halide material may include an impurity including metal nitride including $Me_xN_k$, such as YN, $M_xN$, such as $LiN_3$, or any combination thereof. In an example, the content of metal nitride $Me_xN_k$ can be at most 0.3 wt % for the weight of the halide material, such as at most 0.1 wt %, at most 500 ppm, at most 300 ppm, at most 100 ppm, at most 50 ppm, at most 40 ppm, at most 30 ppm, at most 20 ppm, or at most 10 ppm for the weight of the halide material. In another instance, the content of metal nitride $Me_xN_k$ can be at least 0.2 ppm for the weight of the halide material, such as at least 0.5 ppm, at least 1 ppm, or at least 2 ppm for the weight of the halide material. In another aspect, the content of metal nitride $Me_xN_k$ may be in a range including any of the minimum or maximum values noted herein.

In an example, the content of metal nitride $M_xN$ can be at most 0.3 wt % for the weight of the halide material, such as at most 0.1 wt %, at most 500 ppm, at most 300 ppm, at most 100 ppm, at most 50 ppm, at most 40 ppm, at most 30 ppm, at most 20 ppm, or at most 10 ppm for the weight of the halide material. In another instance, the content of metal nitride $M_xN$ can be at least 0.2 ppm for the weight of the halide material, such as at least 0.5 ppm, at least 1 ppm, or at least 2 ppm for the weight of the halide material. In another aspect, the content of metal nitride $M_xN$ may be in a range including any of the minimum or maximum values noted herein.

In an example, the total content of metal nitride can be at most 0.3 wt % for the weight of the halide material, such as at most 0.1 wt %, at most 500 ppm, at most 300 ppm, at most 100 ppm, at most 50 ppm, at most 40 ppm, at most 30 ppm, at most 20 ppm, or at most 10 ppm for the weight of the halide material. In another instance, the total content of metal nitride can be at least 0.2 ppm for the weight of the halide material, such as at least 0.5 ppm, at least 1 ppm, or at least 2 ppm for the weight of the halide material. In another aspect, the total content of metal nitride may be in a range including any of the minimum or maximum values noted herein.

In this disclosure, the content of metal nitrides, such as alkali nitride and $Me_xN_k$, can be detected using the following methods. The ion conductive material can be dissolved in the water, as complex metal halide can be hygroscopic. Metal nitride is not hygroscopic and can be collected and analyzed after filtering the aquatic solution. X-ray diffraction analysis can be used to detect metal nitride at a content of above 0.2 wt %. For the content lower than 0.2 wt %, LECO can be used.

In an embodiment, the halide material can include a crystalline structure, including stacking faults. Stacking faults represent a defect in the crystalline structure caused by shifting of occupied or vacant atomic positions that generates disordering of crystallographic planes in the crystalline structure.

In a particular embodiment, the halide material can include a crystalline structure, including a particular amount of stacking faults that can facilitate improved property of the halide material. Stacking faults can lead to changes to the X-ray powder diffraction pattern, particularly leading to uneven broadening of only certain X-ray diffraction peaks. In this disclosure, stacking faults can be determined by using X-ray powder diffraction analysis of the halide-based material and a DIFFaX simulation and Rietveld refinement by using software, such as TOPAS 4.2 by Bruker Germany or FullProf (version 7.30, published in March 2020), or another version or software equivalent to TOPAS 4.2 or FullProf version 7.30, following the stacking faults quantification method described by Boulineau et al., Solid State Ionics 180 (2010) 1652-1659, which is incorporated herein by reference in its entirety. In brief, the quantification method can include fitting the simulation to the X-ray diffraction pattern of powder of the halide-based material. The simulation can define the primary blocks of the crystalline structure. These primary blocks can be constituted by a slab and an interslab space. The primary blocks can then be stacked according to one of the two or more possible stacking vectors. The exclusive occurrence of only one of the stacking vectors leads to the perfect stacking, i.e., 0% stacking faults. Alternations of the stacking vectors in the stacking direction of the crystalline structure create stacking faults. Fitting of the simulation to the X-ray diffraction pattern of the halide-based material can include varying one or more parameters of the crystalline structure (also known as "parameter refinement") and implementing a least-square difference minimization algorithm and stacking faults can be identified and quantified.

In further embodiments, the halide material can include a crystalline structure having at least 20% stacking faults, such as at least 25%, at least 30%, at least 40%, at least 50%, at least 60%, at least 70%, at least 80%, or at least 90% stacking faults. In particular embodiments, the stacking of the atomic layers can be completely disordered. For example, the crystalline structure can include 100% stacking faults. In another embodiment, the stacking faults may be at most 99%, such as at most 95%, at most 92%, at most 90%, at most 85%, at most 80%, at most 75%, or at most 70%. Moreover, the crystalline structure can include stacking faults in a range including any of the minimum and maximum percentages noted herein. In a particular example, the solid electrolyte material can include the halide material having a crystalline structure, including at least 50% stacking faults. In another particular example, the solid electrolyte material can include a halide material having greater than 50% and at most 100% stacking faults.

In an embodiment, the halide material may be in the form of powder, such as including particles of complex metal halide. In an aspect, the powder can have an average particle size (D50) of at least 0.1 microns, such as at least 0.3 microns, at least 0.5 microns, or at least 1 micron. In another aspect, the average particle size may be at most 1 mm, at most 800 microns, at most 500 microns, at most 200 microns, at most 100 microns, at most 50 microns, at most 10 microns, at most 5 microns, or at most 1 micron. In particular instances, the powder may include particles having an average particle size in a range, including any of the minimum or maximum values noted herein. In another aspect, the powder may include aggregated or agglomerated particles.

In a further aspect, the particles can have a particular shape that can facilitate improved formation and performance of an electrolyte and/or electrode. For example, the particles can be spherical or elongated. In another example, the particles may have the shape of rods, flakes, or needles. The shapes of the particles may be selected depending on 2D or 1D anisotropy in the ion conductivity of the halide material.

In another aspect, the powder can include particles having a particular average aspect ratio of length:width to facilitate the formation of electrolyte and/or an electrode having improved ion conductivity. In an example, the average aspect ratio can be at least 1, such as at least 1.2, at least 1.5, at least 2, at least 2.3, at least 2.5, at least 2.8, or at least 3. In another example, the average aspect ratio can be at most 30, at most 25, at most 22, at most 20, at most 15, at most 12, at most 10, at most 8, at most 5, or at most 4. Moreover, the particles can have an average aspect ratio in a range including any of the minimum and maximum values noted herein.

In another embodiment, the halide material can be monocrystalline. The halide material may be in the form of a monocrystalline sheet, a monocrystalline film, a monocrystalline block, a monocrystalline ingot, or a single crystal in another form, or any combination thereof. In a further embodiment, the halide material can be a ceramic material. The ceramic material may include ceramic particles, single crystal particles, or any combination thereof.

In another embodiment, the halide material can be oriented having a crystallographic orientation having a higher ionic conductivity. For instance, the halide material can be oriented single crystal or oriented ceramic.

In an embodiment, a solid electrolyte can include the halide material in any form noted in embodiments herein. In particular applications, the solid electrolyte material can consist of the halide material. In at least one application, the solid electrolyte material may include another material in addition to the halide material. For example, another material may include a solid-state electrolyte material different than the halide material, an electron conductive material, an additive, an active electrode material, or a combination thereof.

In an embodiment, a composite ion conductive layer can include the solid electrolyte material and an organic material. The organic material can include as a binder material, a polymeric electrolyte material, or a combination thereof. In another example, the composite ion conductive layer may include a plasticizer, a solvent, or a combination thereof. An exemplary organic material can include polytetrafluoroethylene (PTFE), polyvinylidene fluoride (PVdF), fluorine rubber, polypropylene, an ethylene-propylene-diene monomer (EPDM), sulfonated EPDM, natural butyl rubber (NBR), paraffin wax, polypropylene carbonate, polyisobutylene, polyvinyl pyrrolidone, polymethyl methacrylate, poly(propylene oxide), polyvinyl chloride, poly(vinylidene fluoride), poly(acrylonitrile), poly(dimethylsiloxane), poly[bis(methoxy ethoxyethoxide)-phosphazene], polyethylene carbonate, polypropylene glycol, polycaprolactone, poly(trimethylene carbonate), hydrogenated nitrile butadiene rubber, poly(ethylene vinyl acetate), high-density polyethylene, low-density polyethylene, polyurethane, or any combination thereof. In another example, the composite ion conductive layer may include a lithium salt. An exemplary lithium salt can include $LiSbF_6$, $LiN(SO_2CF_3)_2$, $LiN(SO_2C_2F_5)_2$, $LiN(SO_2CF_3)(SO_2C_4F_9)$, $LiC(SO_2CF_3)_3$, $LiAsF_6$, $LiClO_4$, $LiPF_6$, $LiBF_4$, $LiCF_3SO_3$, or any combination thereof.

In an embodiment, a catholyte material may include the solid electrolyte material, including the halide material. The catholyte material may also include a cathode-active material. An example of the cathode-active material can include, but is not limited to, lithium-containing transition metal oxides, such as $Li(NiCoAl)O_2$ and $LiCoO_2$, transition metal fluorides, polyanions, and fluorinated polyanion materials, and transition metal sulfides, transitions metal oxyfluorides, transition metal oxysulfides, transition metal oxynitrides, or the like, or any combination thereof. In particular examples, the catholyte material may include particles of cathode-active material, wherein at least some particles can be coated with the solid electrolyte material. In more particular examples, at least a portion of the surface of each particle of the cathode-active material can be coated with the solid electrolyte material. In another more particular example, surfaces of a majority of or all of the particles of the cathode active material may be coated with the solid electrolyte material.

In another embodiment, an anolyte material may include the solid electrolyte material, including the halide material. The anolyte may also include an active material. An exemplary anode active material can include carbon materials, such as artificial graphite, graphite carbon fibers, resin baking carbon, pyrolytic vapor-grown carbon, coke, mesocarbon microbeads (MCMB), furfuryl alcohol resin-baked carbon, polyacene, pitch-based carbon fibers, vapor-grown carbon fibers, natural graphite, non-graphitizable carbon, or the like, metal materials including lithium metal, lithium alloy, or the like, oxides, nitrides, tin compounds, silicon compounds, or any combination thereof. In some instances, the anolyte material may include an electron conductive additive. An example of the electron conductive additive can include carbon fiber, carbon powder, stainless steel fiber, nickel-coated graphite, or the like, or any combination thereof. In particular examples, the anolyte material may include particles of an active material, wherein at least some particles can be coated with the solid electrolyte material. In more particular examples, at least a portion of the surface of each particle of the active material may be coated with the solid electrolyte material. In another more particular example, surfaces of a majority of or all of the particles of the active material may be coated with the solid electrolyte material.

In a further embodiment, the solid electrolyte material may be formed into a layer, such as a catholyte layer, an anolyte layer, or an electrolyte layer, or a combination thereof. In a further embodiment, the layer may be a component of an electrochemical device.

Figure 4:
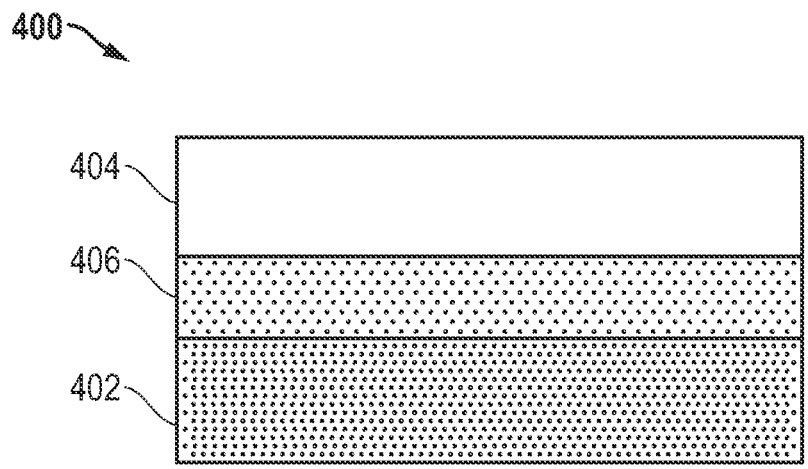
FIG. 4 includes an illustration of a portion of a cross-section of an exemplary electrochemical device.

In another embodiment, a structure, such as a portion of an electrochemical device, may include a solid electrolyte layer, an electrode layer, and an intermediate layer disposed between the solid electrolyte layer and the electrode layer, wherein at least one of the intermediate layers, electrolyte layer, and the electrode layer may include the solid electrolyte material. In an embodiment, the electrochemical device may include a solid-state lithium battery. Referring to FIG. 4, a portion of a cross-section of an exemplary solid-state battery 400 is illustrated, including an electrolyte layer 402, an intermediate layer 406 disposed between an electrode layer 404 and the electrolyte layer 402. In an example, the intermediate layer 406 may include the solid electrolyte material. In a particular example, the electrode layer 404 may include an anode layer, and the intermediate layer 406 may include an anolyte layer abutting the anode layer. In another particular example, the electrode layer 404 may include a cathode layer, and the intermediate layer 406 may include a catholyte layer abutting the cathode layer.

The intermediate layer 406 may include a thickness of at most 500 microns, such as at most 400 microns, at most 300 microns, at most 200 microns, at most 100 microns, or at most 50 microns. Additionally, or alternatively, the intermediate layer may have a thickness of at least 5 microns, at least 8 microns, at least 10 microns, at least 12 microns, or at least 20 microns. Moreover, in particular examples, the thickness of the intermediate layer may be in a range including any of the minimum and maximum values noted herein.

Figure 7A:
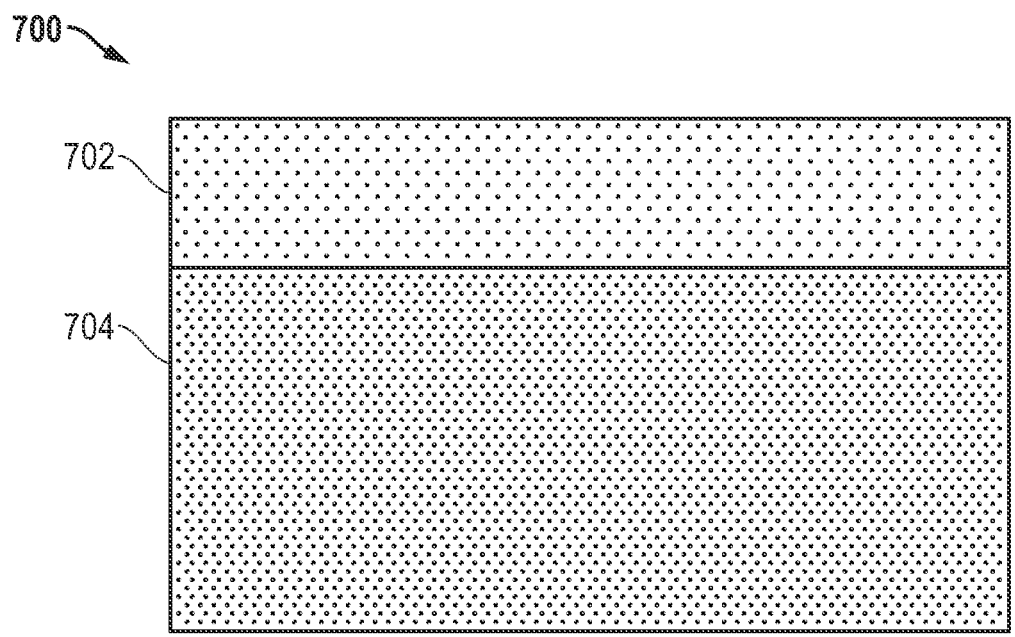
FIGS. 7A and 7B include illustrations of exemplary electro-chemical devices according to embodiments herein.

FIG. 7A includes an illustration including a portion of an electro-chemical device 700 according to an embodiment including a solid electrolyte layer 704 including the solid electrolyte material of embodiments herein overlying an electrode layer. In particular, the solid electrolyte material may include the halide material, including at least one of Cl and F and optionally another halogen element such as Br, I, or both. The electrode layer may include a cathode layer including a cathode-active material, wherein at least a portion of the cathode-active material can be in contact with the solid electrolyte material. As illustrated, the electrode layer 702 and the electrolyte layer 704 are in contact with each other. In particular embodiments, when an electrical voltage is applied to the electrochemical device 700, the solid electrolyte layer 704 can be capable of forming a concentration gradient of one or more halogen anions. For example, the solid electrolyte layer 704 may include $Li_3Y(Br_uCl_{1-u})_6$, wherein $0<u<1$, and form a concentration gradient of $Br^-$, a concentration gradient of $Cl^-$, or both when an electrical voltage is applied. More particularly, under the electrical voltage, the solid electrolyte layer 704 may include a chlorine-deficient region proximal to the electrode layer 702, wherein the chlorine-deficient region may include a lower concentration of chlorine, comparing to a region of the solid electrolyte layer 704 that is distant to the electrode layer 702. The concentration of a halogen anion can be the concentration in at % or in mol % relative to the total of the anions.

Figure 7B:
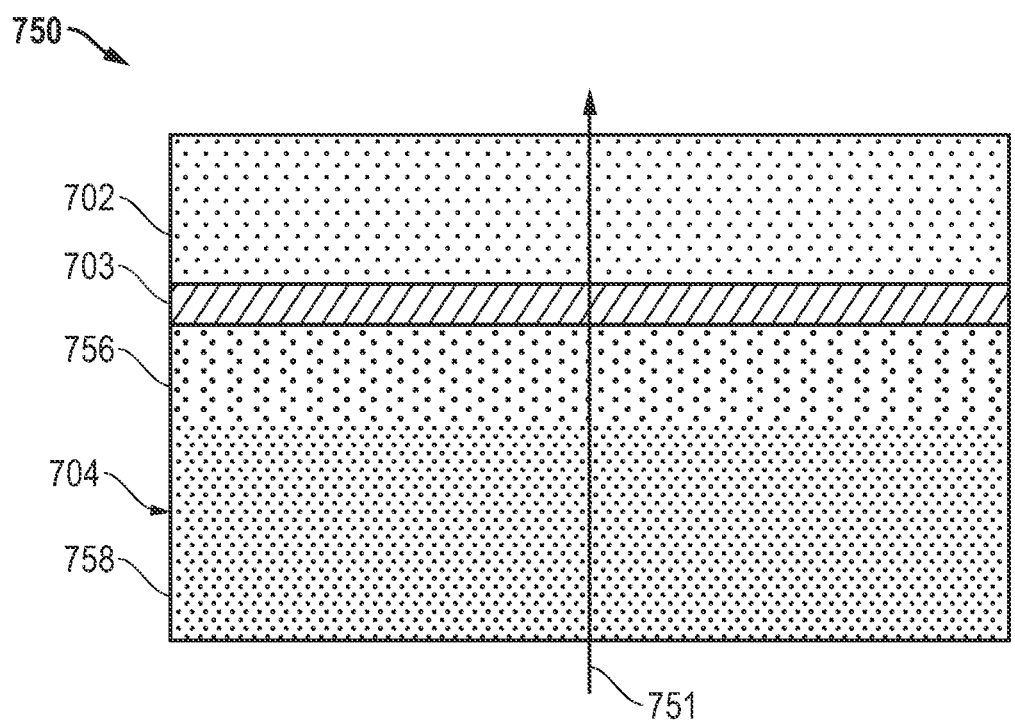

Referring to FIG. 7B, an electrochemical device 750 may include the solid electrolyte layer 704 and the electrode layer 702. In a particular example, the electrode layer 702 may be a cathode layer. As illustrated, the electrochemical device 750 may include an intermediate layer 703 between the solid electrolyte layer 704 and the electrode layer 702, wherein at least a portion of the intermediate layer 703 may be in contact with at least a portion of the cathode-active material. As illustrated, the intermediate layer 703 may be in contact with the solid electrolyte layer 704 and the electrode layer 702. In particular examples, the intermediate layer 703 may include a lithium-metal halide material different from the solid electrolyte material, wherein the lithium-metal halide material can include at least one halogen anion that is the same as a halogen anion of the solid electrolyte material. For example, the intermediate layer may include a lithium-metal halide represented by $Li_{3-x-f}M_fRE_{1-y}Me^k_y(Cl_{1-p}F_p)_{6-x+y*(k-3)}$, wherein $-1<=x<=1$, $0<=y<=1$, $0<=p<=\frac{1}{3}$, and $0<=f<=0.3$. In a particular embodiment, the solid electrolyte layer may include the electrolyte material including the halide material represented by $Li_{3-x-f}M_fRE_{1-y}Me^k_y(Cl_{1-p}F_p)_{6-x+y*(k-3)}$, wherein $0<p<=\frac{1}{3}$, and the intermediate layer may include a lithium-metal halide represented by $Li_{1-x-f}M_fRE_{1-y}Me^k_yF_{4-x+y*(k-3)}$, $-0.3<=x<=0.3$, $0<=y<=1$, $0<=f<=0.3$. In a more particular example, the solid electrolyte material may include $Li_3Y(Br_uCl_{1-u})_6$, wherein $0<u<1$, and the intermediate layer can include a lithium-metal halide represented by $Li_{3(1-z)}Y_{(1+z)}Cl_6$, wherein $0<=z<0.3$. The solid electrolyte material may help stabilize the intermediate layer under an oxidative condition over time. For instance, the solid electrolyte material may help sustain one or more halogen anions of the intermediate layer over time to reduce the decomposition of the intermediate layer that may be due to depletion of halogen anions under an oxidative condition. The solid electrolyte layer 704 may further help maintain $Li^+$ ionic current, cationic current, or both of the electrochemical devices. $Li^+$ ions may flow in the direction 751, as illustrated in FIG. 7B, under an electric voltage, such as a charging condition of a solid-state battery.

In further embodiments, the intermediate layer 703 may have improved oxidative stability when placed in contact with a cathode layer. In particular, the intermediate layer may demonstrate reduced decomposition comparing to an intermediate layer, including $Li_3YBr_6$. In particular embodiments, the intermediate layer may be capable of forming a concentration gradient of $Cl^-$ under an oxidative condition, which may allow the intermediate layer to function as a self-passivation layer under battery operation. More particularly, under an oxidative condition, a higher concentration of $Cl^-$ may be formed in the vicinity of the cathode layer compared to the concentration of $Cl^-$ in a distance. Even more particularly, the concentration of $Cl^-$ may reduce in the direction from the surface in contact with the cathode layer to the opposite surface of the intermediate layer.

In a particular embodiment, the intermediate layer 703 may be a passivation layer having a particular thickness that can facilitate improved performance or formation of the electrochemical device. For example, the intermediate layer may include a thickness of at most 1 micron, at most 800 nm, at most 600 nm, at most 400 nm, at most 300 nm, at most 200 nm, at most 100 nm, at most 80 nm, at most 60 nm, at most 50 nm, at most 40 nm, at most 20 nm, at most 10 nm, or at most 8 nm. In another example, the intermediate layer may include a thickness of at least 1 nm, at least 2 nm, at least 3 nm, at least 4 nm, at least 5 nm, at least 10 nm, at least 20 nm, or at least 50 nm. Moreover, the intermediate layer may include a thickness in a range including any of the minimum and maximum values noted herein. In a particular instance, the intermediate layer may have a thickness in a range including at least 2 nm and at most 5 nm.

In an embodiment, the intermediate layer may be formed in-situ from the solid electrolyte material. In an embodiment, the intermediate layer may be formed at an interface between a solid electrolyte material and a cathode-active material. For example, an intermediate layer may be formed at the interface of a particle of a cathode-active material and a particle of the solid electrolyte material, wherein the particle of the cathode-active material may be coated with one or more of the particles of the solid electrolyte material. In another example, referring to FIG. 7A, an intermediate layer may be formed at the interface of the solid electrolyte layer 704 and the electrode layer 702 from the solid electrolyte material.

In a further embodiment, forming the intermediate layer may include applying an electric voltage to the electrochemical device, such as 700, that includes an interface between the solid electrolyte material and a cathode-active material. In an example, the electric voltage may include a voltage of at least 3.0 V, at least 3.6 V, at least 4.0 V, at least 4.5 V, or at least 5.0 V. In another example, the electric voltage may be at most 5.1V.

In an embodiment, forming the intermediate layer may include partial decomposition of the solid electrolyte material, including at least one of Cl and F. In an exemplary implementation, the solid electrolyte material may include the halide material represented by $Li_3Y(Br_uCl_{1-u})_6$. Under an electric voltage, $Li_3Y(Br_uCl_{1-u})_6$ in contact with the cathode-active material may undergo electrochemical reactions that may cause partial decomposition of $Li_3Y(Br_uCl_{1-u})_6$ and result in the formation of $Li_3YBr_{6u}$ and $Li_3YCl_{(1-u)6}$ at the interface. $Li_3YCl_{(1-u)6}$ can form into a thin intermediate layer in contact with the cathode-active material. $Li_3YBr_{6u}$ may be reorganized and absorbed by the solid electrolyte material $Li_3Y(Br_uCl_{1-u})_6$.

Referring to FIGS. 7A and 7B, partial decomposition of the solid electrolyte layer 704 under an electric voltage can result in the formation of the intermediate layer 703. Further, a Cl— and/or F— deficient region may be formed within the solid electrolyte layer 704. As illustrated, the region 756, proximal o the cathode-active material included in the electrode layer 702 may include a lower concentration of Cl— and/or F— compared to the region 758 that is distant to the cathode-active material.

Known techniques may be used to form an electrolyte, a composite ion conductive layer, an anode, a cathode, an anolyte, a catholyte, the intermediate layer, or another component of an electrochemical device with the solid electrolyte material of embodiments herein. Such techniques include, but are not limited to, casting, molding, deposition, printing, pressing, heating, or the like, or any combination thereof. For forming a multi-layer structure, the layers, such as electrolyte, electrode, anolyte, and catholyte, may be formed separately and then laminated to form a multi-layer structure. Alternatively, a stack of green layers may be formed followed by a further treatment, such as pressing, heating, drying, or any combination thereof to form the finally formed multi-layer structure.

In particular embodiments, the single-crystal block or ingot can be processed together with cathode or anode active materials, for example, by mechanical pressing or by thermally-activated co-extrusion, to ensure intimate electrode to electrolyte contact.

In another particular embodiment, the single crystal block and ingot of the halide material may be grown directly around the particles of the anode and/or cathode-active materials to form an anolyte or catholyte layer. In an aspect, an anolyte or catholyte layer can include the single-crystal halide material, including inclusions that include an anode or cathode active material. In another aspect, a catholyte or anolyte layer can include an anode or cathode active material that is densely packed within a single crystal ingot or block.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. A solid electrolyte material, comprising a halide material including at least two halide anions selected from the group consisting of F, Cl, Br, and I and represented by $Li_{3-x-f}M_fRE_{1-y}Me^k_y(Cl_{1-u-p-q}Br_uF_pI_q)_{6-x+y*(k-3)}$, wherein: $-1<=x<=1$; $0<=y<=1$; $0<=u<1$; $0<=p<=\frac{1}{3}$; $0<=q<=\frac{1}{6}$; $0<(u+p+q)<1$; $0<=f<=0.3$; M is at least one alkali metal element other than Li; RE is a rare-earth element; k is a valence of Me; and Me is at least one element from the group consisting of Group IIIB elements, Group IVB elements, V, Cr, Mn, Fe, Co, Ni, Cu, Zn, Zr, Al, Sn, Pb, Bi, Sb, Mg, Ca, Ga, and Ge, wherein Me is different from RE; and wherein the halide material comprises for a total weight of the halide material: a total content of one or more binary halide phase of not greater than 10 wt %; a total content of one or more oxyhalide phase of not greater than 7 wt %; and a total content of one or more a ternary halide phase of not greater than 7 wt %.

Embodiment 2. The solid electrolyte material of embodiment 1, wherein the halide material comprises an X-ray diffraction pattern measured with Cu K-alpha radiation, including an absence of a peak between 5° and 13° 2-theta.

Embodiment 3. The solid electrolyte material of embodiment 1 or 2, wherein the halide material comprises not greater than 9 wt % of a binary halide phase, not greater than 8 wt %, not greater than 7 wt %, not greater than 6 wt %, not greater than 5 wt %, not greater than 4 wt %, not greater than 3 wt %, not greater than 2 wt %, not greater than 1 wt %, or not greater than 0.5 wt % of the binary halide phase for the total weight of the halide material.

Embodiment 4. The solid electrolyte material of any one of embodiments 1 to 3, wherein the binary phase comprises a lithium halide phase, wherein the halide material comprises not greater than 7 wt % of the lithium halide phase, not greater than 6 wt %, not greater than 5 wt %, not greater than 4 wt %, not greater than 3 wt %, not greater than 2 wt %, not greater than 1 wt %, or not greater than 0.5 wt % of the lithium halide phase for the total weight of the halide material.

Embodiment 5. The solid electrolyte material of any one of embodiments 1 to 4, wherein the binary phase comprises a rare-earth halide phase, wherein the halide material comprises not greater than 10 wt % of the rare-earth halide phase, not greater than 7 wt %, not greater than 5 wt %, not greater than 4 wt %, not greater than 3 wt %, not greater than 2 wt %, not greater than 1 wt %, or not greater than 0.5 wt % of the rare-earth halide phase for the total weight of the halide material.

Embodiment 6. The solid electrolyte material of any one of embodiments 1 to 5, wherein the halide material comprises not greater than 6 wt % of the ternary halide phase, not greater than 5 wt %, not greater than 4 wt %, not greater than 3 wt %, not greater than 2 wt %, not greater than 1 wt %, or not greater than 0.5 wt % of the ternary halide phase for the total weight of the halide material.

Embodiment 7. The solid electrolyte material of any one of embodiments 1 to 6, wherein the ternary halide phase comprises a ternary phase including two anions, wherein the halide material comprises not greater than 7 wt % of the ternary halide phase including two anions, not greater than 4 wt %, not greater than 3 wt %, not greater than 2 wt %, not greater than 1 wt %, or not greater than 0.5 wt % of the ternary halide phase including two anions for the total weight of the halide material.

Embodiment 8. The solid electrolyte material of any one of embodiments 1 to 6, wherein the ternary phase comprises a lithium-rare-earth halide phase, where the halide material comprises not greater than 7 wt % of the lithium-rare-earth halide phase, not greater than 5 wt %, not greater than 3 wt %, not greater than 2 wt %, not greater than 1 wt %, or not greater than 0.5 wt % of the lithium-rare-earth halide phase for the total weight of the halide material.

Embodiment 9. The solid electrolyte material of any one of embodiments 1 to 8, wherein the halide material comprises not greater than 6 wt % of the oxyhalide phase, not greater than 5 wt %, not greater than 4 wt %, not greater than 3 wt %, not greater than 2 wt %, not greater than 1 wt %, or not greater than 0.5 wt % of the oxyhalide phase for the total weight of the halide material.

Embodiment 10. The solid electrolyte material of any one of embodiments 1 to 9, wherein the oxyhalide phase comprises a rare-earth oxyhalide phase, wherein the halide material comprises not greater than 7 wt % of the rare-earth oxyhalide phase, not greater than 5 wt %, not greater than 4 wt %, not greater than 3 wt %, not greater than 2 wt %, not greater than 1 wt %, or not greater than 0.5 wt % of the rare-earth oxyhalide phase for the total weight of the halide material.

Embodiment 11. The solid electrolyte material of any one of embodiments 1 to 10, wherein the halide material is free of at least one of the phases selected from the group consisting of the binary halide phase, the ternary halide phase, and the oxyhalide phase.

Embodiment 12. The solid electrolyte material of any one of embodiments 1 to 11, wherein the halide material is free of the binary halide phase, the ternary halide phase, and the oxyhalide phase.

Embodiment 13. An electrolyte material, comprising a halide material including at least two halide anions selected from the group consisting of F, Cl, Br, and I within a single phase, wherein the halide material is represented by $Li_{3-x-f}M_fRE_{1-y}Me^k_y(Cl_{1-u-p-q}Br_uF_pI_q)_{6-x+y*(k-3)}$, wherein: $-1 \leq x \leq 1$; $0 \leq y \leq 1$; $0 \leq u < 1$; $0 \leq p \leq 1/3$; $0 \leq q \leq 1/6$; $0 < (u+p+q) < 1$; $0 \leq f \leq 0.3$; M is at least one alkali metal element other than Li; RE is a rare-earth element; k is a valence of Me; and Me is at least one element selected from the group consisting of Group IIIB elements, Group IVB elements, V, Cr, Mn, Fe, Co, Ni, Cu, Zn, Zr, Al, Sn, Pb, Bi, Sb, Mg, Ca, Ga, and Ge, wherein Me is different from RE.

Embodiment 14. The solid electrolyte material of any one of embodiments 1 to 13, wherein the halide material comprises a crystalline structure of a monoclinic, trigonal, hexagonal, or orthorhombic crystal system.

Embodiment 15. The solid electrolyte material of embodiment 14, wherein the halide material comprises a crystalline structure represented by a rhombohedral space group.

Embodiment 16. The solid electrolyte material of embodiment 14 or 15, wherein the crystalline structure comprises a unit cell that is smaller than the unit cell of $Li_3YBr_6$.

Embodiment 17. The solid electrolyte material of any one of embodiments 1 to 16, wherein peaks of a powder diffraction pattern of the halide material are shifted to higher angles compared to corresponding peaks of a powder diffraction pattern of $Li_3YBr_6$.

Embodiment 18. The solid electrolyte material of any one of embodiments 1 to 17, wherein the halide material is represented by $Li_{3-x-f}M_fRE_{1-y}Me^k_y(Cl_{1-u-p}Br_uF_p)_{6-x+y*(k-3)}$.

Embodiment 19. The solid electrolyte material of any one of embodiments 1 to 18, wherein the halide material is represented by $Li_{3-x-f}M_fRE_{1-y}Me^k_y(Cl_{1-u}Br_u)_{6-x+y*(k-3)}$.

Embodiment 20. The solid electrolyte material of any one of embodiments 1 to 18, wherein the halide material is represented by $Li_{3-x-f}M_fRE_{1-y}Me^k_y(Cl_{1-p}F_p)_{6-x+y*(k-3)}$, wherein $0 \leq p < 2$.

Embodiment 21. The solid electrolyte material of any one of embodiments 1 to 20, wherein RE comprises Y, Ce, Gd, Er, La, or Yb.

Embodiment 22. The solid electrolyte material of any one of embodiments 1 to 21, wherein Me comprises Y, Ce, Gd, Er, Sm, Eu, Pr, Tb, Al, Zr, La, Yb, Mg, Zn, Sn, Mg, Ca, or any combination thereof.

Embodiment 23. The solid electrolyte material of any one of embodiments 1 to 22, wherein RE consists of Y.

Embodiment 24. The solid electrolyte material of any one of embodiments 1 to 23, wherein Me is at least one element selected from the group consisting of Gd, Yb, Zr, Zn, Mg, Al, and Ca.

Embodiment 25. The solid electrolyte material of any one of embodiments 1 to 24, wherein M comprises Na or K, wherein M consists of Na or K.

Embodiment 26. The solid electrolyte material of any one of embodiments 1 to 19 and 21 to 25, wherein $u \geq 0.1$, $u \geq 0.12$, $u \geq 0.15$, $u \geq 0.17$, $u \geq 0.2$, $u \geq 0.23$, $u \geq 0.25$, $u \geq 0.27$, $u \geq 0.29$, $u \geq 0.32$, or $u \geq 0.34$.

Embodiment 27. The solid electrolyte material of any one of embodiments 1 to 19 and 21 to 25, wherein $u \leq 0.85$, $u \leq 0.83$, $u \leq 0.8$, $u \leq 0.77$, $u \leq 0.75$, $u \leq 0.7$, $u \leq 0.67$, $u \leq 0.65$, $u \leq 0.62$, $u \leq 0.6$, $u \leq 0.57$, $u \leq 0.54$, $u \leq 0.52$, $u \leq 0.49$, $u \leq 0.45$, $u \leq 0.42$.

Embodiment 28. The solid electrolyte material of any one of embodiments 1 to 20 and 22 to 25, wherein $p \geq 0.04$, $p \geq 0.06$, $p \geq 0.08$, $p \geq 0.09$, $p \geq 0.10$, $p \geq 0.12$, $p \geq 0.14$, $p \geq 0.15$, $p \geq 0.17$, $p \geq 0.2$, or $p \geq 0.22$.

Embodiment 29. The solid electrolyte material of any one of embodiments 1 to 20, 22 to 25, and 28, wherein $p \leq 0.33$, $p \leq 0.31$, $p \leq 0.29$, $p \leq 0.27$, $p \leq 0.25$, $p \leq 0.22$, $p \leq 0.20$, $p \leq 0.18$, $p \leq 0.16$, $p \leq 0.14$, or $p \leq 0.10$.

Embodiment 30. The solid electrolyte material of any one of embodiments 1 to 29, wherein $(1-u-p-q) \geq 0.12$, $(1-u-p-q) \geq 0.15$, $(1-u-p-q) \geq 0.17$, $(1-u-p-q) \geq 0.20$, $(1-u-p-q) \geq 0.23$, $(1-u-p-q) \geq 0.25$, $(1-u-p-q) \geq 0.27$, $(1-u-p-q) \geq 0.29$, $(1-u-p-q) \geq 0.33$, $(1-u-p-q) \geq 0.36$, $(1-u-p-q) \geq 0.43$, $(1-u-p-q) \geq 0.48$, $(1-u-p-q) \geq 0.50$, $(1-u-p-q) \geq 0.54$, or $(1-u-p-q) \geq 0.58$.

Embodiment 31. The solid electrolyte material of any one of embodiments 1 to 30, wherein $(1-u-p-q) \leq 0.97$, $(1-u-p-$ q)<=0.92, (1-u-p-q)<=0.87, (1-u-p-q)<=0.83, qk (1-u-p-q)<=0.80, (1-u-p-q)<=0.77, (1-u-p-q)<=0.75, (1-u-p-q)<=0.70, or (1-u-p-q)<=0.66.

Embodiment 32. The solid electrolyte material of any one of embodiments 1 to 19 and 21 to 31, wherein a ratio of (1-u-p-q)/u is at least 0.03, at least 0.06, at least 0.1, at least 0.2, at least 0.3, at least 0.4, at least 0.5, at least 0.6, at least 0.7, at least 0.8, at least 0.9, at least 1.0, at least 1.2, at least 1.3, at least 1.4, at least 1.5, at least 1.6, at least 1.7, at least 1.8, at least 1.9, or at least 2.0.

Embodiment 33. The solid electrolyte material of any one of embodiments 1 to 19 and 21 to 32, wherein a ratio of (1-u-p-q)/u is not greater than 15, not greater than 11, not greater than 10, not greater than 9, not greater than 8, not greater than 7, not greater than 6, not greater than 5, not greater than 4, not greater than 3, not greater than 2, or not greater than 1.4.

Embodiment 34. The solid electrolyte material of any one of embodiments 1 to 19 and 21 to 33, wherein the halide material is represented by $Li_{3-x}RE_{1-y}Me^k_y(Cl_{1-u}Br_u)_{6-x+y*(k-3)}$, wherein $0.08<=u<=0.67$.

Embodiment 35. The solid electrolyte material of embodiment 34, wherein the halide material is represented by $Li_{3-x}Y(Cl_{1-u}Br_u)_6$.

Embodiment 36. The solid electrolyte material of embodiments 34 or 35, wherein $u>=0.55$ or $u<=0.45$.

Embodiment 37. The solid electrolyte material of any one of embodiments 34 to 36, wherein $0.2<=u<=0.45$.

Embodiment 38. The solid electrolyte material of any one of embodiments 34 to 37, wherein $u<0.33$.

Embodiment 39. The solid electrolyte material of any one of embodiments 1 to 38, wherein the halide material comprises an X-ray diffraction pattern measured with Cu K-alpha radiation, including at least two peaks in a range of 13° to 15° 2-theta.

Embodiment 40. The solid electrolyte material of any one of embodiments 1 to 39, wherein the halide material comprises an average diffraction crystallite size of at least 20 nm, at least 25 nm, at least 30 nm, at least 35 nm, or at least 40 nm.

Embodiment 41. The solid electrolyte material of any one of embodiments 1 to 40, wherein the halide material comprises an average diffraction crystallite size of at most 500 nm, at most 400 nm, at most 300 nm, at most 200 nm, or at most 100 nm.

Embodiment 42. The solid electrolyte material of any one of embodiments 1 to 41, wherein the halide material comprises a density of greater than 2.3 g/cm$^3$, at least 2.5 g/cm$^3$, at least 2.7 g/cm$^3$, at least 2.9 g/cm$^3$, at least 3.1 g/cm$^3$, at least 3.3 g/cm$^3$, or at least 3.5 g/cm$^3$.

Embodiment 43. The solid electrolyte material of any one of embodiments 1 to 42, wherein the halide material comprises a density of less than 3.8 g/cm$^3$, not greater than 3.5 g/cm$^3$, not greater than 3.4 g/cm$^3$, not greater than 3.3 g/cm$^3$, or not greater than 3.1 g/cm$^3$.

Embodiment 44. The solid electrolyte material of any one of embodiments 1 to 43, wherein the halide material comprises a Thermodynamic Electrochemical Stability Value of greater than 3.57 V, at least 3.60 V, at least 3.62 V, 3.65 V, or at least 3.71 V.

Embodiment 45. The solid electrolyte material of any one of embodiments 1 to 44, wherein the halide material comprises Thermodynamic Electrochemical Stability Value of not greater than 4.30 V, not greater than 4.19 V, not greater than 4.15 V, not greater than 4.10 V, not greater than 3.85 V, not greater than 3.80 V, not greater than 3.75 V, or not greater than 3.71 V.

Embodiment 46. The solid electrolyte material of any one of embodiments 1 to 45, wherein the halide material comprises an improved electrochemical stability compared to $Li_3YBr_6$.

Embodiment 47. The solid electrolyte material of any one of embodiments 1 to 45, wherein the halide material comprises an ionic conductivity measured at 22° C. of greater than 0.15 mS/cm, at least 0.3 mS/cm, at least 0.5 mS/cm, at least 0.8 mS/cm, at least 0.9 mS/cm, at least 1.1 mS/cm, at least 1.5 mS/cm, or at least 1.7 mS/cm.

Embodiment 48. The solid electrolyte material of any one of embodiments 1 to 45, wherein the halide material comprises an ionic conductivity measured at 22° C. of less than 2.0 mS/cm, at most 1.9 mS/cm, at most 1.8 mS/cm, or at most 1.7 mS/cm.

Embodiment 49. A catholyte material, comprising the solid electrolyte material of any one of embodiments 1 to 48.

Embodiment 50. The catholyte material of embodiment 49, comprising particles of a cathode-active material, wherein at least some of the particles are coated with the solid electrolyte material.

Embodiment 51. An anolyte material, comprising the solid electrolyte material of any one of embodiments 1 to 48.

Embodiment 52. The anolyte material of embodiment 51, comprising particles of anode-active material, wherein at least some of the particles are coated with the solid electrolyte material.

Embodiment 53. A layer, comprising the solid electrolyte material of any one of embodiments 1 to 48, wherein the layer comprises a catholyte layer, an anolyte layer, an electrolyte layer, or a combination thereof.

Embodiment 54. A catholyte layer comprising the catholyte material of embodiment 49 or 50.

Embodiment 55. An anolyte layer, comprising the anolyte material of embodiment 51 or 52.

Embodiment 56. An electrochemical device, comprising: a solid electrolyte layer comprising the solid electrolyte material of any one of embodiments 1 to 48, wherein the halide material comprises at least one of Cl and F, an electrode layer comprising a cathode-active material in contact with the solid electrolyte material, wherein the solid electrolyte layer is capable of forming a chlorine-deficient or a fluorine-deficient region proximal to the electrode layer under an oxidative condition, wherein the chlorine- or fluorine-deficient region comprises a lower concentration of chlorine or fluorine, respectively, comparing to a region of the solid electrolyte layer that is distal to the electrode layer.

Embodiment 57. An electrochemical device, comprising a solid electrolyte layer comprising the solid electrolyte material of any one of embodiments 1 to 48, an electrode layer comprising a cathode-active material, and an intermediate layer between the solid electrode layer and the cathode-active material.

Embodiment 58. The electrochemical device of embodiment 57, wherein the intermediate layer comprises a catholyte layer abutting the electrode layer.

Embodiment 59. The electrochemical device of embodiment 57, wherein the intermediate layer comprises a lithium-metal halide represented by $Li_{3-x-f}M_fRE_{1-y}Me^k_y(Cl_{1-p}F_p)_{6-x+y*(k-3)}$, wherein $-1<=x<=1$, $0<=y<=1$, $0<=p<=1/3$, and $0<=f<=0.3$.

Embodiment 60. The electrochemical device of embodiment 57, wherein the solid electrolyte layer comprises the electrolyte material comprising the halide material represented by $Li_{3-x-f}M_fRE_{1-y}Me^k_y(Cl_{1-p}F_p)_{6-x+y*(k-3)}$, wherein $0<p<=1/3$, and the intermediate layer comprises a lithium-metal halide represented by $Li_{1-x-f}M_fRE_{1-y}Me^k{}_yF_{4-x+y*(k-3)}$, $-0.3<=x<=0.3$, $0<=y<=1$, $0<=f<=0.3$.

Embodiment 61. The electrochemical device of embodiment 57, wherein the solid electrolyte layer comprises the electrolyte material comprising the halide material represented by $Li_3Y(Br_uCl_{1-u})_6$, wherein $0<u<1$, and the intermediate layer comprises a lithium-metal halide represented by $Li_{3(1-z)}Y_{(1+z)}Cl_6$, wherein $0<=z<0.3$.

Embodiment 62. The electrochemical device of any one of embodiments 57 and 59 to 61, wherein the intermediate layer comprises a thickness of at most 1 micron, at most 800 nm, at most 600 nm, at most 400 nm, at most 300 nm, at most 200 nm, at most 100 nm, at most 80 nm, at most 60 nm, at most 50 nm, at most 40 nm, at most 20 nm, at most 10 nm, or at most 8 nm.

Embodiment 63. The electrochemical device of any one of embodiments 57 and 59 to 62, wherein the intermediate layer comprises a thickness of at least 1 nm, at least 2 nm, at least 3 nm, at least 4 nm, at least 5 nm, at least 10 nm, at least 20 nm, or at least 50 nm.

Embodiment 64. The electrochemical device of any one of embodiments 57 and 59 to 63, wherein the intermediate layer is a passivation layer.

Embodiment 65. A method of forming an intermediate layer for an electrochemical device, comprising: applying an electric voltage to the electrochemical device, wherein the electrochemical device comprises an interface between the solid electrolyte material of any one of embodiments 1 to 48 and a cathode-active material; forming an intermediate layer in contact with the cathode-active material, wherein the intermediate layer comprises a lithium-metal halide material different than the solid electrolyte material, wherein the intermediate layer is formed in-situ.

Embodiment 66. The method of embodiment 65, wherein the lithium-metal halide material is formed by partial decomposition of the solid electrolyte material, wherein the solid electrolyte material comprises the halide material comprising at least one of Cl and F.

Embodiment 67. The method of embodiment 65 or 66, wherein the electrochemical device comprises a solid electrolyte layer comprising the solid electrolyte material, and wherein the method further comprises forming a Cl— or F— deficient region in the solid electrolyte layer, wherein the Cl— or F— deficient region is proximal to the intermediate layer and comprises a lower concentration of Cl— or F—, respectively, comparing to a region in the solid electrolyte layer that is distant to the intermediate layer.

Embodiment 68. The method of any one of embodiments 65 to 67, wherein the electric voltage comprises a voltage of at least 3.0 V, at least 3.6 V, at least 4.0 V, at least 4.5 V, at least 5.0 V.

Embodiment 69. The method of any one of embodiments 65 to 68, wherein the intermediate layer comprises a lithium-metal halide represented by $Li_{3-x-f}M_fRE_{1-y}Me^k{}_y(Cl_{1-p}F_p)_{6-x+y*(k-3)}$, wherein $-1<=x<=1$, $0<=y<=1$, $0<=p<=1/3$, and $0<=f<=0.3$.

Embodiment 70. The method of any one of embodiments 65 to 69, wherein the electrolyte material comprises the halide material represented by $Li_{3-x-f}M_fRE_{1-y}Me^k{}_y(Cl_{1-p}F_p)_{6-x+y*(k-3)}$, wherein $0<p<=1/3$, and the intermediate layer comprises a lithium-metal halide represented by $Li_{1-x-f}M_fRE_{1-y}Me^k{}_yF_{4-x+y*(k-3)}$, $-0.3<=x<=0.3$, $0<=y<=1$, $0<=f<=0.3$.

Embodiment 71. The method of any one of embodiments 65 to 70, wherein the electrolyte material comprises the halide material represented by $Li_3Y(Br_uCl_{1-u})_6$, wherein $0<u<1$, and the intermediate layer comprises a lithium-metal halide represented by $Li_{3(1-z)}Y_{(1+z)}Cl_6$, wherein $0<=z<0.3$.

Embodiment 72. The method of any one of embodiments 65 to 71, wherein the intermediate layer comprises a thickness of at most 1 micron, at most 800 nm, at most 600 nm, at most 400 nm, at most 300 nm, at most 200 nm, at most 100 nm, at most 80 nm, at most 60 nm, at most 50 nm, at most 40 nm, at most 20 nm, at most 10 nm, or at most 8 nm.

Embodiment 73. The method of any one of embodiments 65 to 72, wherein the intermediate layer comprises a thickness of at least 1 nm, at least 2 nm, at least 3 nm, at least 4 nm, at least 5 nm, at least 10 nm, at least 20 nm, or at least 50 nm.

Embodiment 74. A method of forming a solid electrolyte material, comprising forming a solid solution of a halide material including at least two halide anions selected from the group consisting of F, Cl, Br, and I wherein the halide material is represented by $Li_{3-x-f}M_fRE_{1-y}Me^k{}_y(Cl_{1-u-p-q}Br_uF_pI_q)_{6-x+y*(k-3)}$, wherein: $-1<=x<=1$; $0<=y<=1$; $0<=u<1$; $0<=p<=1/3$; $0<=q<=1/6$; $0<=(u+p+q)<1$; $0<=f<=0.3$; M is at least one alkali metal element other than Li; RE is a rare-earth element; k is a valence of Me; and Me is at least one element from the group consisting of Group IIIB elements, Group IVB elements, V, Cr, Mn, Fe, Co, Ni, Cu, Zn, Zr, Al, Sn, Pb, Bi, Sb, Mg, Ca, Ga, and Ge, wherein Me is different from RE.

Embodiment 75. The method of embodiment 74, further comprising forming an ammonium-containing metal-halide material.

Embodiment 76. The method of embodiment 74 or 75, further comprising forming $(NH_4)_zRE_{1-y}Me^k{}_y(Cl_{1-u-p-q}Br_uF_pI_q)_{3+z+y*(k-3)}$, $(NH_4)_zRE_{1-y}Me^k{}_y(Cl_{1-u}Br_u)_{3+z+y*(k-3)}$, $(NH_4)_zRE_{1-y}Me^k{}_y(Cl_{1-p}F_p)_{3+z+y*(k-3)}$, $(NH_4)_zRE_{1-y}Me^k{}_y(Cl)_{3+z+y*(k-3)}$, $(NH_4)_zRE_{1-y}Me^k{}_y(Br)_{3+z+y*(k-3)}$, $(NH_4)_zRE_{1-y}Me^k{}_y(I)_{3+z+y*(k-3)}$, or a combination thereof, wherein $0.33<=z<=5$.

Embodiment 77. The method of embodiment 75 or 76, wherein forming the ammonium-containing metal-halide is performed in a single step with a predetermined ratio between at least two halogen elements selected from the group consisting of F, Cl, Br, and I.

Embodiment 78. The method of any one of embodiments 75 to 77, wherein forming the ammonium-containing metal-halide material is conducted in a liquid medium.

Embodiment 79. The method of any one of embodiments 75 to 78, wherein forming the ammonium-containing metal-halide material is conducted at a temperature of up to 250° C.

Embodiment 80. The method of embodiment 79, wherein the temperature is at least 20° C., at least 40° C., at least 50° C., at least 70° C., at least 90° C., at least 110° C., or at least 140° C.

Embodiment 81. The method of embodiment 79 or 80, wherein the temperature is not greater than 200° C., not greater than 180° C., not greater than 160° C., or not greater than 140° C.

Embodiment 82. The method of any one of embodiments 78 to 81, wherein the liquid medium comprises an acidic solution.

Embodiment 83. The method of any one of embodiments 78 to 82, wherein the liquid medium comprises an acid including hydrochloric acid, hydrobromic acid, hydrofluoric acid, hydroiodic acid, or any combination thereof.

Embodiment 84. The method of any one of embodiments 75 to 83, further comprising partial or complete thermal decomposition of the ammonium-containing metal-halide material into ammonium halide and lithium-containing metal-halide.

Embodiment 85. The method of embodiment 84, further comprising complete or partial separation of ammonium halide and lithium-containing metal-halide.

Embodiment 86. The solid electrolyte material of any one of embodiments 1 to 48, wherein the halide material comprises a crystalline structure comprising at least 20% stacking faults, at least 30%, at least 40%, at least 50%, at least 60%, at least 70%, at least 80%, or at least 90% stacking faults.

Embodiment 87. The solid electrolyte material of any one of embodiments 1 to 48 and 86, wherein the halide material comprises an electric charge-neutral metal nitride including $Me_xN_k$, $M_xN$, or a combination thereof, wherein x is a valence of N and k is the valence of Me, wherein a total content of the electric charge-neutral metal nitride is at most 0.3 wt % for a weight of the halide material.

Embodiment 88. A solid electrolyte material, comprising a halide material represented by $Li_aM_aMe_bMe'_{b'}X_cX'_{c'}$,
wherein the halide material has a crystallography phase transition within the stoichiometry range of:
$(b/(b+b'))_t*0.84<b/(b+b')<(b/(b+b'))_t*1.16$, wherein $(b/(b+b'))_t$ corresponds to a crystallography phase transition boundary on the crystallography phase diagram at a temperature of 22° C.;
$(c/(c+c'))_t*0.84<c/(c+c')<(c/(c+c'))_t*1.16$, wherein $(c/(c+c'))_t$ corresponds to the crystallography phase transition on the crystallography phase diagram at the temperature of 22° C.; or
$(a/(a+a'))_t*0.84<a/(a+a')<(a/(a+a'))_t*1.16$, wherein $(a/(a+a'))_t$ corresponds to the crystallography phase transition on the crystallography phase diagram at the temperature of 22° C.;
wherein:
Me is at least one element from the group consisting of Group IIIB elements, Group IVB elements, V, Cr, Mn, Fe, Co, Ni, Cu, Zn, Zr, Al, In, Sn, Pb, Bi, Sb, Mg, Ca, Ga, and Ge and;
Me' is at least one element other than Me and from the group consisting of Group IIIB elements, Group IVB elements, V, Cr, Mn, Fe, Co, Ni, Cu, Zn, Zr, Al, In, Sn, Pb, Bi, Sb, Mg, Ca, Ga, and Ge;
Where b>=b'; c>=c'; a>=a'
X is at least one halogen other than X';
X' is at least one halogen; and
M is at least one alkali metal element other than Li; and
wherein the halide material comprises for a total weight of the halide material:
a total content of one or more binary halide phase of not greater than 10 wt %;
a total content of one or more oxyhalide phase of not greater than 7 wt %; and
a total content of one or more a ternary halide phase of not greater than 7 wt %.

Embodiment 89. A solid electrolyte material, comprising a halide material represented by $Li_aM_aMe_bMe'_{b'}X_cX'_{c'}$,
wherein the halide material has a crystallography phase transition within the stoichiometry range of:
$(b/(b+b'))_t*0.84<b/(b+b')<(b/(b+b'))_t*1.16$, wherein $(b/(b+b'))_t$ corresponds to the crystallography phase transition on the crystallography phase diagram at a temperature from 20° C. to 25° C.;
$(c/(c+c'))_t*0.84<c/(c+c')<(c/(c+c'))_t*1.16$, wherein $(c/(c+c'))_t$ corresponds to the crystallography phase transition on the crystallography phase diagram at the temperature from 20° C. to 25° C.; or
$(a/(a+a'))_t*0.84<a/(a+a')<(a/(a+a'))_t*1.16$, wherein $(a/(a+a'))_t$ corresponds to the crystallography phase transition on the crystallography phase diagram at the temperature from 20° C. to 25° C.;
wherein:
Me is least one element from the group consisting of Group IIIB elements, Group IVB elements, V, Cr, Mn, Fe, Co, Ni, Cu, Zn, Zr, Al, In, Sn, Pb, Bi, Sb, Mg, Ca, Ga, and Ge;
Me' is at least one element other than Me and from the group consisting of Group IIIB elements, Group IVB elements, V, Cr, Mn, Fe, Co, Ni, Cu, Zn, Zr, Al, In, Sn, Pb, Bi, Sb, Mg, Ca, Ga, and Ge;
Where b>=b'; c>=c'; a>=a'; X is at least one halogen other than X';
X' is a halogen; and
M is at least one alkali metal element other than Li; and
wherein anions of the halide material are within a single phase.

Embodiment 90. The solid electrolyte material of embodiment 88 or 89, wherein the halide material comprises an X-ray diffraction pattern measured with Cu K-alpha radiation, including an absence of a peak between 5° and 13° 2-theta.

Embodiment 91. The solid electrolyte material of any one of embodiments 88 to 90, wherein the halide material comprises a crystalline structure of a monoclinic, trigonal, hexagonal, or orthorhombic crystal system.

Embodiment 92. The solid electrolyte material of any one of embodiments 88 to 91, wherein the crystallography phase transition comprises a transition from a layered crystal structure to a non-layered crystal structure.

Embodiment 93. The solid electrolyte material of any one of embodiments 88 to 92, wherein the crystallography phase transition comprises a transition from a cubic close-packed structure to a hexagonal close-packed structure.

Embodiment 94. The solid electrolyte material of any one of embodiments 88 to 93, wherein the crystallography phase transition comprises a transition from C2/m space group or R-3m space group to P-3m1 or Pnma space group.

Embodiment 95. The solid electrolyte material of any one of embodiments 88 to 93, wherein the crystallography phase transition comprises a transition from a non-layered crystal structure to another non-layered crystal structure or to a layered crystal structure.

Embodiment 96. The solid electrolyte material of any one of embodiments 88 to 91 and 95, wherein the crystallography phase transition comprises a transition from R3c to R3m.

Embodiment 97. The solid electrolyte material of any one of embodiments 88 to 91 and 95 to 96, wherein the crystallography phase transition comprises a transition from P-3m1 or Pnma space group to C2/m space group or R-3m space group.

Embodiment 98. The solid electrolyte material of any one of embodiments 88 to 97, wherein Me is at least one rare-earth element.

Embodiment 99. The solid electrolyte material of any one of embodiments 88 to 98, wherein Me' is at least one element of a rare-earth element, In, Zr, and Fe.

Embodiment 100. The solid electrolyte material of any one of embodiments 88 to 99, wherein M is at least one element of Na, K, and Cs.

Embodiment 101. The solid electrolyte material of any one of embodiments 88 to 100, wherein X is at least one element of Cl and Br.

Embodiment 102. The solid electrolyte material of any one of embodiments 88 to 101, wherein X' is at least one element of Br and F.

Embodiment 103. The solid electrolyte material of any one of embodiments 88 to 102, wherein the halide material is represented by $Li_{a-f}M_aRE_bMe'^k{}_{b'}(Cl_cBr_{c'})_{6-f+(k-3)*b'}$, wherein:
a+a'=3;
−1≤f≤1;
c+c'=1; and
b+b'=1.

Embodiment 104. The solid electrolyte material of any one of embodiments 88 to 102, wherein the halide material is represented by $Li_{3-f}RE_bMe'^k{}_{b'}(Cl_cBr_{c'})_{6-f+(k-3)*b'}$, wherein:
−1≤f≤1;
c+c'=1; and
b+b'=1.

Embodiment 105. The solid electrolyte material of embodiment 104, wherein b>0, b'>0, and 0.65≤c/(c+c')≤0.95.

Embodiment 106. The solid electrolyte material of embodiment 104 or 105, wherein RE comprises Y, Me' comprises In, Yb, or Zr.

Embodiment 107. The solid electrolyte material of any one of embodiments 104 to 106, wherein Me' is Yb, and 0.65≤c/(c+c')≤0.89.

Embodiment 108. The solid electrolyte material of any one of embodiments 104 to 106, wherein Me' is In, and 0.69≤c/(c+c')≤0.95.

Embodiment 109. The solid electrolyte material of any one of embodiments 104 to 106, wherein the halide material is represented by $Li_3Y_bYb_{b'}(Cl_cBr_{c'})_6$, wherein 0.65≤c/(c+c')≤0.89.

Embodiment 110. The solid electrolyte material of any one of embodiments 104 to 106 and 108, wherein the halide material is represented by $Li_3Y_bIn_{b'}(Cl_cBr_{c'})_6$, wherein 0.69≤c/(c+c')≤0.95.

Embodiment 111. The solid electrolyte material of any one of embodiments 104 to 106, wherein Me' is Zr, and 0.72≤c/(c+c')≤0.98.

Embodiment 112. The solid electrolyte material of any one of embodiments 104 to 106, wherein the halide material is represented by $Li_{3-b}Y_bZr_{b'}(Cl_cBr_{c'})_6$, wherein 0.72≤c/(c+c')≤0.98.

Embodiment 113. The solid electrolyte material of any one of embodiments 88 to 104, wherein the halide material is represented by $Li_{3-f}RE(Cl_cBr_{c'})_{6-f}$ wherein:
0<=f<=0.3;
c+c'=1; and
0.63≤c/(c+c')≤0.87.

Embodiment 114. The solid electrolyte material of embodiment 113, wherein RE includes Y.

Embodiment 115. The solid electrolyte material of embodiment 113 or 114, wherein RE consists of Y, wherein 0.65≤c/(c+c')≤0.87; or 0.66≤c/(c+c')≤0.85; or 0.67≤c/(c+c')≤0.83.

Embodiment 116. The solid electrolyte material of any one of embodiments 88 to 104, wherein the halide material is represented by $Li_{3-f}RE_bMe'^k{}_{b'}X_{6-f+(k-3)*b'}$, wherein:
0<=f<=0.3; and
b+b'=1.

Embodiment 117. The solid electrolyte material of embodiment 116, wherein 0.67≤b/(b+b')≤0.93.

Embodiment 118. The solid electrolyte material of embodiment 116 or 117, wherein RE comprises Y, Me' comprises In, and X comprises Cl.

Embodiment 119. The solid electrolyte material of any one of embodiments 116 to 118, wherein the halide material is represented by $Li_{3-f}RE_bIn_{b'}X_{6-f}$, wherein 0.67≤b/(b+b')≤0.93.

Embodiment 120. The solid electrolyte material of embodiment 118, wherein the halide material is represented by $Li_3Y_bIn_{b'}X_6$.

Embodiment 121. The solid electrolyte material of any one of embodiments 116 to 117, wherein the halide material is represented by $Li_{3-f}RE_bIn_{b'}X_{6-f}$.

Embodiment 122. The solid electrolyte material of any one of embodiments 88 to 103, wherein the halide material is represented by $Li_aM_{a'}REX_6$, wherein:
a>a'>0;
a+a'=3; and
0.942≤a/(a+a')≤0.958.

Embodiment 123. The solid electrolyte material of embodiment 122, wherein M comprises Na.

Embodiment 124. The solid electrolyte material of embodiment 122 or 123, wherein RE comprises Y.

Embodiment 125. The solid electrolyte material of any one of embodiments 122 to 124, wherein X comprises Cl.

Embodiment 126. The solid electrolyte material of any one of embodiments 122 to 124, wherein the halide material is represented by $Li_aNa_{a'}YCl_6$.

Embodiment 127. The solid electrolyte material of any one of Embodiments 88 to 126, wherein the halide material comprises an X-ray diffraction pattern measured with Cu K-alpha radiation, including at least two peaks in a range of 13° to 15° 2-theta when wherein the halide material has the crystallography phase transition within the stoichiometry range of (c/(c+c'))t*0.84<c/(c+c')<(c/(c+c'))t*1.16, wherein (c/(c+c'))t corresponds to the crystallography phase transition on the crystallography phase diagram at the temperature from 20° C. to 25° C., and when c/(c+c')<0.75.

EXAMPLES

Example 1

Samples 1 to 8 were synthesized by forming solid solutions from $(NH4)_3Li_3YBr_6$ and $(NH4)_3Li_3YCl_6$ according to embodiments herein. The compositions and properties of the samples are noted in Table 1.

Ionic conductivity of the samples was determined using an electro-chemical impedance spectroscopy method with gold blocking electrodes under the condition of an AC frequency of 3 MHz-10 Hz and 10 to 50 mV of peak-to-peak sinusoidal AC voltage signal at room temperature (approximately 22° C.).

The ion conductivity of bulk grains is included in Table 1. The conductivity contribution from bulk grains could be separated from grains boundary and the electrode contact because the bulk grain conductivity features appear at the highest frequencies and are associated with the lowest value of double-layer capacitance.

TABLE 1

| N | Phase | x, $Br_{1-x}Cl_x$ | Crystallography | RT Ionic conductivity, mS/cm | Phase density, $g/cm^3$ | Electrochemical stability, V vs Li |
|---|---|---|---|---|---|---|
| 1 | $Li_3YBr_6$ | 0 | type LYB | 2.0 | 3.6 | 3.57 |
| 2 | $Li_3YBr_4Cl_2$ | 0.33 | type LYB | 1.9 | 3.4 | 3.60 |
| 3 | $Li_3YBr_3Cl_3$ | 0.5 | type LYB | 1.8 | 3.3 | 3.62 |
| 4 | $Li_3YBr_{2.5}Cl_{3.5}$ | 0.58 | type LYB | 1.7 | 3.1 | 3.65 |
| 5 | $Li_3YBr_2Cl_4$ | 0.66 | type LYB | 1.5 | 2.9 | 3.71 |
| 6 | $Li_3YBr_{1.5}Cl_{4.5}$ not a single phase | 0.75 | Mixed interphases | 0.9 | 2.7 | 3.71 |
| 7 | $Li_3YBr_1Cl_5$ | 0.83 | type LYC | 0.8 | 2.5 | 3.8 |
| 8 | $Li_3YCl_6$ | 1 | type LYC | 0.15 | 2.4 | 4.2 |

Example 2

Figure 5:
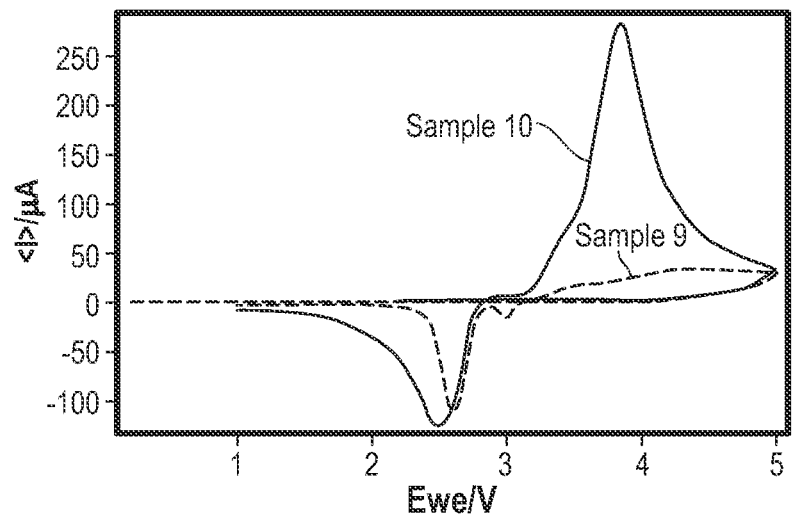
FIGS. 5 and 6 include cyclic voltammetry V-A diagram of battery samples.

The following samples were formed. Sample 9 includes a counter electrode of In/Li foil, a separator made of a solid solution of $Li_3YBr_2Cl_4$ that was formed in the same manner as described in Example 1, and a working electrode made of the mixture of $Li_3YBr_2Cl_4$ and carbon powder. Sample 10 is similar to Sample 9, with the only difference being the separator was made of $Li_3YBr_6$. The cyclic voltammetry V-A diagram of Samples 9 and 10 at the first charging/oxidation cycle is included in FIG. 5 and at the second charging/oxidation cycle is included in FIG. 6. The scan rate was 0.5 mV/s, and the cell area was 0.5 $cm^2$.

Figure 6:
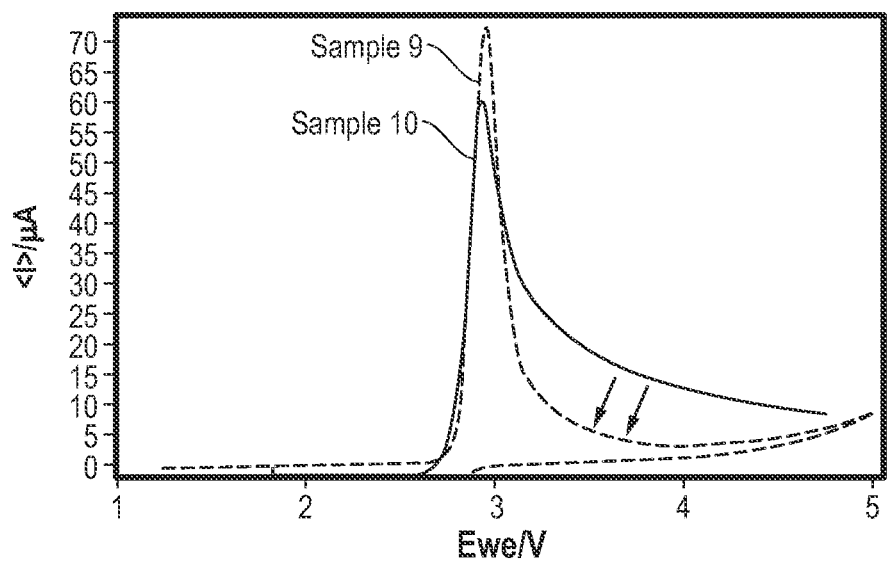

Sample 9 demonstrated significantly slowed oxidative decomposition when the bias exceeded the electrochemical stability critical value during the process of battery charging for the first and second time comparing to Sample 10. In particular, in the first charging cycle, when the oxidative peak observed for Sample 10 had a current exceeding 280 Sample 9 demonstrated an oxidative current lower than 40 µA. Moreover, in the second charging cycle/oxidation as illustrated in FIG. 6, Sample 9 demonstrated an absence of decomposition at moderate bias, while Sample 10 still demonstrated decomposition.

Example 3

Represented halide material samples were formed using the process with accelerated cooling as described in embodiments herein. In brief, ammonium-containing LYB and ammonium-containing LYC were formed in separate solutions that were subsequently combined and dried at 120° C. Solid-state reactions and sublimation of ammonium were performed in parallel by heating the reaction mixtures to 550° C. The cooling rate was approximately 100° C. Single-phased LYBC samples, LYBC-19, LYBC-41, LYBC-62, LYBC-67, LYBC-79, and LYBC-91 were formed. Single phased LYB and LYC were formed in the presence of ammonium. Ionic conductivity of the samples was measured as described in embodiments herein. As noted in Table 2, Samples LYBC-62, LYBC-67, and LYBC-79 demonstrated unexpected high ionic conductivity compared to LYB.

TABLE 2

| Sample/Formula | mol % Cl | Crystallography | Room Temperature Ionic Conductivity, mS/cm |
|---|---|---|---|
| LYB/$Li_3YBr_6$ | 0% | LYB-type C2/m or R-3m (layered) | 1.39 |
| LYBC-19/ $Li_3Y(Cl_{0.19}Br_{0.81})_6$ | 19% | LYB-type C2/m or R-3m (layered) | 1.57 |
| LYBC-41/ $Li_3Y(Cl_{0.41}Br_{0.59})_6$ | 41% | LYB-type C2/m or R-3m (layered) | 1.49 |
| LYBC-62/ $Li_3Y(Cl_{0.62}Br_{0.38})_6$ | 62% | LYB-type C2/m or R-3m (layered) | 1.87 |
| LYBC-67/ $Li_3Y(Cl_{0.67}Br_{0.33})_6$ | 67% | LYB-type C2/m or R-3m (layered) | 2.08 |
| LYBC-79 $Li_3Y(Cl_{0.79}Br_{0.21})_6$ | 79% | LYC-type P-3m1 or Pnma (non-layered) | 2.45 |
| LYBC-91 $Li_3Y(Cl_{0.9}Br_{0.1})_6$ | 91% | LYC-type P-3m1 or Pnma (non-layered) | 0.58 |
| LYC/$Li_3YCl_6$ | 100% | LYC-type P-3m1 or Pnma (non-layered) | 0.15 |

FIG. 9A includes the powder XRD pattern of Sample LYBC-79 and the reference XRD pattern of LYC. The two materials are isostructural with LYBC-79 showing lattice parameter expansion compared to LYC, suggested by peaks shifting to the left.

FIG. 9B includes the powder XRD pattern Sample LYBC-67 and the reference XRD pattern of LYB. The two materials are isostructural with LYBC-67 showing lattice parameter contraction compared to LYB, which is suggested by peaks shifting to the right.

Example 4

Representative halide materials were formed in the same manner as described in Example 10. The band at the crystallography phase transition boundary (MPB) and the phase transition range that can allow the halide material samples to have improved ionic conductivity is included in Tables 3 to 5.

TABLE 3

| No | Composition | MPB, $c/(c + c')_t$ | Range of effect $c/(c + c')$ |
|---|---|---|---|
| 1 | $Li_3Y(Cl_{0.8}Br_{0.2})_6$ | 0.75 | 0.63-0.87 |
| 2 | $Li_3(Y_{0.95}Yb_{0.05})_1(Cl_{0.83}Br_{0.17})_6$ | 0.77 | 0.65-0.89 |
| 3 | $Li_3(Y_{0.95}In_{0.05})(Cl_{0.9}Br_{0.1})_6$ | 0.82 | 0.69-0.95 |
| 4 | $Li_{2.95}(Y_{0.95}Zr_{0.05})(Cl_{0.9}Br_{0.1})_6$ | 0.85 | 0.72-0.98 |

TABLE 4

| Composition | MPB b/(b + b')$_t$ | Range of effect b/(b + b') |
|---|---|---|
| $Li_3(Y_{0.85}In_{0.15})Cl_6$ | 0.80 | 0.67-0.93 |

TABLE 5

| Composition | MPB a/(a + a')$_t$ | Range of effect a/(a + a') |
|---|---|---|
| $(Li_{0.955}Na_{0.045})_3Y_1Cl_6$ | 0.95 | 0.942-0.958 |

Example 12

The following samples were formed and tested for electrochemical stability of the electrolyte of the samples. Cell 60 includes an anode of In/Li foil, an electrolyte made of a single phase solid solution of $Li_3Y(Cl_{0.8}Br_{0.2})_6$ that was formed in the same manner as described in Example 10, and a cathode made of the mixture of $Li_3Y(Cl_{0.8}Br_{0.2})_6$ and carbon powder. Cell 74 is similar to Cell 60 except $Li_3Y(Cl_{0.8}Br_{0.2})_6$ is replaced with $Li_3Y(Cl_{0.65}Br_{0.35})_6$ of a single phase that was formed in the same manner as described in Example 10. Cell 69 is similar to Cell 60 except that $Li_3Y(Cl_{0.8}Br_{0.2})_6$ is replaced with $Li_3YBr_6$ for forming Sample Cell 69.

Figure 11A:
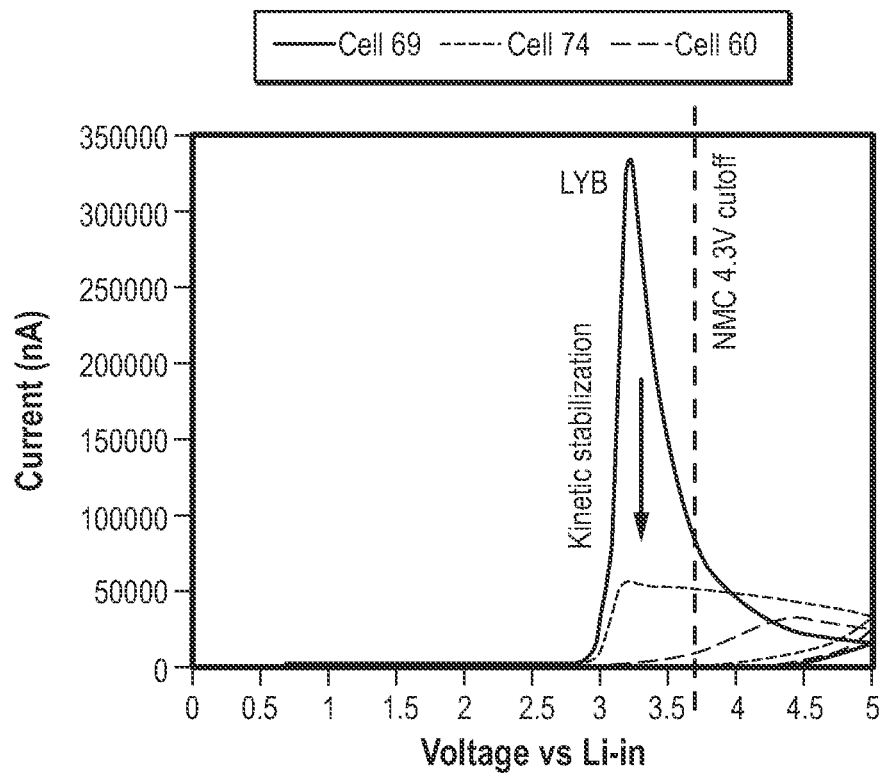
FIGS. 11A and 11B include illustrations of electrochemical stability of halide materials.
Figure 11B:
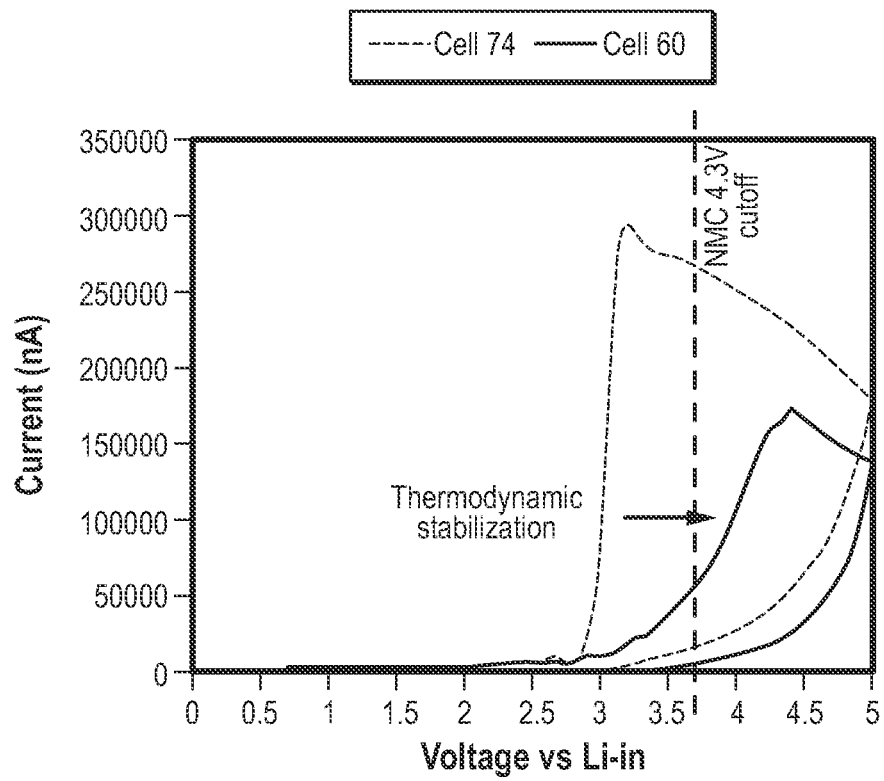

FIGS. 11A and 11B include illustrations of electrolyte electrochemical stability test results by the Cyclic Voltammetry (CV) method. FIG. 11A includes a scan of the first charging and discharging cycles of the cell samples. Voltage is referenced relatively to Li—In anode for the tested samples. As illustrated, when the voltage exceeds 2.9 V, the electrolyte ($Li_3YBr_6$) of Cell 69 starts to decompose, which is characterized by the relatively high electric current in the measurements, which suggests that $Li_3YBr_6$ electrolyte has limited electrochemical stability at the tested voltages. $Li_3Y(Cl_{0.8}Br_{0.2})_6$ of Cell 60 and $Li_3Y(Cl_{0.65}Br_{0.35})_6$ of Cell 74 demonstrated significantly lower electric current compared to Cell 69 at the same voltages, suggesting significantly improved electrochemical stability of $Li_3Y(Cl_{0.8}Br_{0.2})_6$ and $Li_3Y(Cl_{0.65}Br_{0.35})_6$ over $Li_3YBr_6$. Decomposition of $Li_3Y(Cl_{0.65}Br_{0.35})_6$ appears to start at a similar voltage compared to $Li_3YBr_6$, but the kinetics of decomposition of $Li_3Y(Cl_{0.65}Br_{0.35})_6$, as characterized by electric current, is significantly lower than $Li_3YBr_6$. Decomposition of $Li_3Y(Cl_{0.8}Br_{0.2})_6$ starts at a higher voltage compared to $Li_3Y(Cl_{0.65}Br_{0.35})_6$ and $Li_3YBr_6$, and the kinetics of decomposition is also significantly lower than $Li_3Y(Cl_{0.65}Br_{0.35})_6$ and $Li_3YBr_6$. Not wishing to be bound to any theory, improved stability of $Li_3Y(Cl_{0.8}Br_{0.2})_6$ and $Li_3Y(Cl_{0.65}Br_{0.35})_6$ may be attributed to the effect of the formation of thin passivation Cl-rich layers on the cathodes.

As illustrated in FIG. 11B, $Li_3Y(Cl_{0.8}Br_{0.2})_6$ starts to decompose when the voltage exceeds 3.2 V, demonstrating better electrochemical stability than $Li_3Y(Cl_{0.65}Br_{0.35})_6$. The improved electrochemical stability of $Li_3Y(Cl_{0.8}Br_{0.2})_6$ is unexpected, particularly in view of the higher Cl/Br ratio and non-layered crystalline structure of $Li_3Y(Cl_{0.8}Br_{0.2})_6$ comparing to $Li_3Y(Cl_{0.65}Br_{0.35})_6$, which has a layered crystalline structure.

The operational voltage of 3.7 V of a state-of-art cathode, the NMC cathode, relative to the Li—In anode is illustrated in FIG. 11B, which corresponds to 4.3 V relative to the Li/Li+ anode. It can be observed $Li_3Y(Cl_{0.8}Br_{0.2})_6$ has superior electrochemical stability, as suggested by the improved decomposition kinetics, which is characterized by the lower electric current at the operational voltage of the NMC cathode.

Example 13

Sample CS13 was synthesized as follows. The targeted formula was $Li_3YCl_3Br_3$.

28.23 g of $Y_2O_3$, 176.52 g of $NH_4Cl$, and 65.13 g of LiBr were weighed such that the molar ratio between $Y_2O_3$, $NH_4Cl$, and LiBr was $Y_2O_3:NH_4Cl:LiBr=1:13.2:6$ (i.e., weighed such that the amount of $NH_4Cl$ was excessively large relative to the amount of $Y_2O_3$ so as to be larger by 10 mol % than the predetermined amount based on the stoichiometric ratio). The raw materials were weighed and pulverized, and the fine powders were mixed in a quartz crucible in the nitrogen atmosphere having a dew point of less than or equal to −80° C. The synthesis was conducted in a furnace that had been ventilated by $N_2$ for 24 hours prior. The crucible was heated to 200° C. at the ramp rate of 50° C. per hour and held for 15 hours, and then the temperature was ramped up to 496° C. at 50° C. per hour and held for 1 hour in a nitrogen atmosphere. The crucible was cooled to room temperature, approximately 25° C., afterwards with the ramp rate of approximately 100° C. per hour. The temperatures were monitored by using thermocouples positioned inside the crucible. The crucible with the synthesized material was protected and positioned in a glove box at moisture free conditions (dew point −80° C.) to unload the synthesized block from the crucible. Organic residues on the top surface of the synthesized block were removed. The obtained block was crushed into the powder inside a glove box under $N_2$ atmosphere.

The XRD analysis of milled powder of Sample CS13 under dry conditions was performed. The powder demonstrated a hexagonal crystalline structure similar to conventionally made $Li_3YCl_6$. The Lebail refinement was performed using the XRD spectrum to determine the Br/Cl ratio in the material through the lattice parameter expansion. The ratio of Cl or Br to the total of the anions (i.e., the total of Cl and Br) was calculated, wherein the ratio of Br to the total of Cl and Br was 28%±2%, and the ratio of Cl to the total of Cl and Br was 72%±2%.

The refinement of Lebail is performed by processing the XRD diagram with the FullProf software package. First the background of the diffractogram is extracted via an automatic routine of the winPLOTR software. Then the XRD diagram is refined with the Lebail method implemented in the FullProf software by using the P-3ml space group and by refining the lattice parameters (i.e., a, b and c), the sample height correction parameter ("zero point") and the Lorentzian components associated with the size and the strain of the particles in the sample. The refinement is considered as completely converted when chit parameter is found below 6.

The total content of water insoluble impurity phase of Sample CS13 was determined as described in embodiments herein. In brief, 50 g of milled Sample CS13 was dissolved in distilled water. Even though the solution appeared visually pure, 60 mg of hydrated insoluble impurities (e.g., $YCl(OH)_2$) were collected from the filter. Sample CS13 had a total content of water insoluble impurities of 53.2 mg consisting of YOCl for the total weight of the water insoluble impurities. Sample CS13 included a total content of water insoluble impurity phase of 0.11 wt %.

Representative Sample S14 was formed as follows. The targeted formula was $Li_3YCl_3Br_3$.

27.71 g of $Li_2CO_3$, 28.23 g of $Y_2O_3$, 192 ml of 47% concentrated HBr, 160 g of $NH_4Br$ and 50 g of distilled $H_2O$ were measured and mixed at 95° C. to form a solution of the $Li_2YBr_6$ precursor material. The solution was then filtered through the 0.2—micron Millipore filter. Separately 138.5 g of $Li_2CO_3$, 141.1 g of $Y_2O_3$, 687 ml of 37% HCl, 435 g of $NH_4Cl$ and 150 g of distilled $H_2O$ were measured and mixed at 95° C. to form a solution of the $Li_3YCl_6$ precursor material. The solution was then filtered through the 0.2 microns Millipore filter.

Both precursor materials were dried in a rotary evaporator to obtain the solid form of the materials. The materials were crashed to form finer powder, weighed and mixed in in a quartz crucible in the nitrogen atmosphere having a dew point of less than or equal to −80° C. The synthesis was conducted in a furnace that had been ventilated by $N_2$ for 24 hours prior. The crucible was heated to 540° C. at the continuous ramp rate of 100° C. per hour and held for 1 hour at 540° C. The crucible was cooled to room temperature, approximately 25° C., afterwards, with the ramp rate of up to 100° C. per hour. The temperatures were monitored by using thermocouples positioned inside the crucible. The crucible with the synthesized material was protected and positioned in a glove box at moisture free conditions (dew point −80° C.) to unload the synthesized block from the crucible. Organic residues on the top surface of the synthesized block was removed. The obtained block was crushed into the powder inside a glove box under $N_2$ atmosphere.

The XRD analysis of milled powder of Sample S14 under dry conditions was performed. The powder demonstrated a hexagonal crystalline structure similar to conventionally made $Li_3YCl_6$. The Lebail refinement was performed using the XRD spectrum to determine the Br/Cl ratio in the material through the lattice parameter expansion. The ratio of Cl or Br to the total of the anions (the total of Cl and Br) was calculated, wherein the ratio of Br to the total of Cl and Br was 20%±2%, and the ratio of Cl to the total of Cl and Br was 80%±2%.

The total content of water insoluble impurity phase of Sample S14 was determined as described in embodiments herein. In brief, 50 g of milled Sample S14 was dissolved in distilled water. 9 mg of hydrated insoluble impurities, corresponding to 8.1 g non-hydrated water insoluble impurities, were collected from the filter. Sample S14 had a total content of water insoluble impurities of 0.016 wt. % for the total weight of the halide material.

Two symmetrical battery cells were formed including stainless steel electrodes and pressed electrolyte made with the powder of Sample CS13. The ionic conductivity and thickness of the electrolytes, and Ohmic resistance and the masses of the cells were measured and included in Table 6.

TABLE 6

| Cell Samples | Mass (mg) | Re(Z) mini (Ohm) | Pellet thickness (mm) | Conductivity (mS/cm) | Measurement validations |
|---|---|---|---|---|---|
| S13-1 | 105.32 | 133 | 0.98 | 1.47 | OK |
| S13-2 | 105.20 | 140 | 0.98 | 1.39 | OK |

Additional symmetrical battery cells were formed including stainless steel electrodes and pressed electrolyte (0.98 mm thickness) made with the powder of Sample S14. The ionic conductivity of the electrolyte was measured and included in Table 7.

TABLE 7

| Cell Samples | Mass (mg) | Re(Z) mini (Ohm) | Pellet thickness (mm) | Conductivity (mS/cm) | Measurement validations |
|---|---|---|---|---|---|
| S14-1 | 107.11 | 87 | 1.07 | 2.45 | OK |
| S14-2 | 109.33 | 97 | 1.08 | 2.41 | OK |

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Additionally, or in the alternative, in certain non-limiting embodiments, any of the compositions identified herein may be essentially free of materials that are not expressly disclosed. The embodiments herein include a range of contents for certain components within a material, and it will be appreciated that the contents of the components within a given material total 100%.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A solid electrolyte material, comprising a halide material including at least two halide anions selected from the group consisting of F, Cl, Br, and I and represented by $Li_{3-x-f}M_fRE_{1-y}Me^k{}_y(Cl_{1-u-p-q}Br_uF_pI_q)_{6-x+y*(k-3)}$, wherein:

$-1<=x<=1$;

$0<=y<=1$;

$0<=u<1$;

$0<=p<=1/3$;

$0<=q<=1/6$;

$0<(u+p+q)<1$;

$0<=f<=0.3$;

M is at least one alkali metal element other than Li;
RE is a rare-earth element;
k is a valence of Me; and
Me is at least one element from the group consisting of Group IIIB elements, Group IVB elements, V, Cr, Mn, Fe, Co, Ni, Cu, Zn, Zr, Al, Sn, Pb, Bi, Sb, Mg, Ca, Ga, and Ge, wherein Me is different from RE; and
wherein the halide material comprises for a total weight of the halide material:
a total content of one or more water insoluble impurity phase of less than 0.11 wt % and a total content of binary halide phase of at least 0.0001 wt % and not greater than 10 wt %, wherein the binary halide phase comprises lithium halide, rare-earth halide, or a combination thereof.

2. The solid electrolyte material of claim 1, wherein the halide material comprises for the total weight of the halide material, not greater than 2 wt % of the binary halide phase.

3. The solid electrolyte material of claim 1, wherein the one or more water insoluble impurity phase comprises an oxyhalide phase, a metal oxide phase, or a combination thereof.

4. The solid electrolyte material of claim 1, wherein the halide material is represented by $Li_{3-x}RE_{1-y}Me^k{}_y(Cl_{1-u}Br_u)_{6-x+y*(k-3)}$, wherein $0.08<=u<=0.67$.

5. An electrolyte material, comprising a halide material including at least two halide anions selected from the group consisting of F, Cl, Br, and I within a single phase, wherein the halide material is represented by $Li_{3-x-f}M_fRE_{1-y}Me^k{}_y(Cl_{1-u-p-q}Br_uF_pI_q)_{6-x+y*(k-3)}$, wherein:
$-1<=x<=1$;
$0<=y<=1$;
$0<=u<1$;
$0<=p<=\frac{1}{3}$;
$0<=q<=\frac{1}{6}$;
$0<(u+p+q)<1$;
$0<=f<=0.3$;
M is at least one alkali metal element other than Li;
RE is a rare-earth element;
k is a valence of Me; and
Me is at least one element selected from the group consisting of Group IIIB elements, Group IVB elements, V, Cr, Mn, Fe, Co, Ni, Cu, Zn, Zr, Al, Sn, Pb, Bi, Sb, Mg, Ca, Ga, and Ge, wherein Me is different from RE,
wherein the halide material comprises a total content of not greater than 9 wt % of binary halide phase for a total weight of the halide material, wherein the binary halide phase comprises lithium halide, rare-earth halide, or a combination thereof.

6. The solid electrolyte material of claim 5, wherein the halide material comprises for the total weight of the halide material, the total content of not greater than 2 wt % of a binary halide phas, and a total content of one or more water insoluble impurity phase of less than 0.11 wt %.

7. The solid electrolyte material of claim 5, wherein the halide material comprises a crystalline structure represented by a rhombohedral space group.

8. The solid electrolyte material of claim 5, wherein the crystalline structure comprises a unit cell that is smaller than the unit cell of $Li_3YBr_6$.

9. The solid electrolyte material of claim 5, wherein peaks of a powder diffraction pattern of the halide material are shifted to higher angles compared to corresponding peaks of a powder diffraction pattern of $Li_3YBr_6$.

10. The solid electrolyte material of claim 5, wherein the halide material is represented by $Li_{3-x-f}M_fRE_{1-y}Me^k{}_y(Cl_{1-p}F_p)_{6-x+y*(k-3)}$, wherein $0<=p<2$.

11. The solid electrolyte material of claim 5, wherein RE comprises Y, Ce, Gd, Er, La, or Yb; and Me comprises Y, Ce, Gd, Er, Sm, Eu, Pr, Tb, Al, Zr, La, Yb, Mg, Zn, Sn, Mg, Ca, or any combination thereof, wherein RE is different from Me.

12. The solid electrolyte material of claim 11, wherein RE consists of Y, and Me is at least one element selected from the group consisting of Gd, Yb, Zr, Zn, Mg, Al, and Ca.

13. The solid electrolyte material of claim 4, wherein the halide material comprises an average diffraction crystallite size of at least 25 nm.

14. An electrochemical device, comprising:
a solid electrolyte layer comprising the solid electrolyte material of claim 5, wherein the halide material comprises at least one of Cl and F;
an electrode layer comprising a cathode-active material in contact with the solid electrolyte material,
wherein the solid electrolyte layer is capable of forming a chlorine-deficient or a fluorine-deficient region proximal to the electrode layer under an oxidative condition, wherein the chlorine- or fluorine-deficient region comprises a lower concentration of chlorine or fluorine, respectively, comparing to a region of the solid electrolyte layer that is distal to the electrode layer.

15. A solid electrolyte material, comprising a halide material represented by $Li_aM_aMe_bMe'_bX_cX'_{c'}$,
wherein the halide material has a crystallography phase transition within the stoichiometry range of:
$(b/(b+b'))_t*0.84<b/(b+b')<(b/(b+b'))_t*1.16$, wherein $(b/(b+b'))_t$ corresponds to the crystallography phase transition on the crystallography phase diagram at a temperature from 20° C. to 25° C.;
$(c/(c+c'))_t*0.84<c/(c+c')<(c/(c+c'))_t*1.16$, wherein $(c/(c+c'))_t$ corresponds to the crystallography phase transition on the crystallography phase diagram at the temperature from 20° C. to 25° C.; or
$(a/(a+a'))_t*0.84<a/(a+a')<(a/(a+a'))_t*1.16$, wherein $(a/(a+a'))_t$ corresponds to the crystallography phase transition on the crystallography phase diagram at the temperature from 20° C. to 25° C.;
wherein:
Me is least one element from the group consisting of Group IIIB elements, Group IVB elements, V, Cr, Mn, Fe, Co, Ni, Cu, Zn, Zr, Al, In, Sn, Pb, Bi, Sb, Mg, Ca, Ga, and Ge;
Me' is at least one element other than Me and from the group consisting of Group IIIB elements, Group IVB elements, V, Cr, Mn, Fe, Co, Ni, Cu, Zn, Zr, Al, In, Sn, Pb, Bi, Sb, Mg, Ca, Ga, and Ge;
Where $b>=b'$; $c>=c'$; $a>=a'$; X is at least one halogen other than X';
X' is a halogen; and
M is at least one alkali metal element other than Li; and
wherein anions of the halide material are within a single phase; and
wherein the halide material comprises a total content or not greater than 9 wt % of binary halide phase for a total weight of the halide material, wherein the binary halide phase comprises lithium halide, rare-earth halide, or a combination thereof.

16. The solid electrolyte material of claim 15, wherein the crystallography phase transition comprises:
a transition from a layered crystal structure to a non-layered crystal structure;

a transition from a cubic close-packed structure to a hexagonal close-packed structure;

a transition from C2/m space group or R-3m space group to P-3m1 or Pnma space group;

a transition from a non-layered crystal structure to another non-layered crystal structure or to a layered crystal structure;

a transition from R3c to R3m; or a transition from P-3m1 or Pnma space group to C2/m space group or R-3m space group; and wherein the total content of the binary halide phase is not greater than 2 wt % for the total weight of the halide material, and wherein the halide material comprises a total content of one or more water insoluble impurity phase of less than 0.11 wt %.

17. The solid electrolyte material of claim 15, wherein the halide material is represented by $Li_{a-f}M_aRE_bMe'^k{}_{b'}(Cl_x Br_{c'})_{6-f+(k-3)*b'}$, wherein:

$a+a'=3$;

$-1 \leq f \leq 1$;

$c+c'=1$; and $b+b'=1$; and wherein the total content of the binary halide phase is not greater than 2 wt % for the total weight of the halide material; and wherein the halide material comprises a total content of one or more water insoluble impurity phsae of less than 0.11 wt %.

18. The solid electrolyte material of claim 15, wherein the halide material is represented by $Li_{3-f}RE_bMe'^k{}_{b'}(Cl_c Br_{c'})_{6-f+(k-3)*b'}$, wherein:

$-1 \leq f \leq 1$;

$c+c'=1$;

$b>0$;

$b'>0$;

$0.65 \leq c/(c+c') \leq 0.95$; and $b+b'=1$; and wherein the total content of the binary halide phase is not greater than 2 wt % for the total weight of the halide material; and wherein the halide material comprises a total content of one or more water insoluble impurity phase of less than 0.11 wt %.

19. The solid electrolyte material of claim 15, wherein the halide material is represented by $Li_{3-f}RE(Cl_cBr_{c'})_{6-f}$, wherein:

RE includes Y;

$0 \leq f \leq 0.3$;

$c+c'=1$; and $0.63 \leq c/(c+c') \leq 0.87$; and wherein the total content of the binary halide phase is not greater than 2 wt % for the total weight of the halide material; and wherein the halide material comprises a total content of one or more water insoluble impurity phase of less than 0.11 wt %.

20. The solid electrolyte material of claim 15, wherein the halide material is represented by $Li_aM_aREX_6$, wherein:

$a>a'>0$;

$a+a'=3$; and $0.942 \leq a/(a+a') \leq 0.958$; and wherein the total contnet of the binary halide phase is not greater than 2 wt % for the total weight of the halide material; and wherein the halide material comprises a total content of one or more water insoluble impurity phase of less than 0.11 wt %.

* * * * *

UNITED STATES PATENT AND TRADEMARK OFFICE
CERTIFICATE OF CORRECTION

| | | |
|---|---|---|
| PATENT NO. | : 11,848,414 B2 | Page 1 of 1 |
| APPLICATION NO. | : 17/746581 | |
| DATED | : December 19, 2023 | |
| INVENTOR(S) | : Gaurav Assat et al. | |

It is certified that error appears in the above-identified patent and that said Letters Patent is hereby corrected as shown below:

In the Claims

In Column 51, Claim 6, Line 55, please delete "of a" and insert --of the--

In Column 51, Claim 6, Line 56, please delete "phas" and insert --phase--

In Column 51, Claim 6, Line 57, please insert --, or any combination thereof-- after "0.11 wt %"

In Column 52, Claim 15, Line 59, please delete "content or" and insert --content of--

In Column 53, Claim 16, Line 13, please delete "; and, wherein the halide material comprises a total content of one or more water insoluble impurity phase of less than 0.11 wt %"

In Column 53, Claim 17, Line 26, please delete "; and, wherein the halide material comprises a total content of one or more water insoluble impurity phase of less than 0.11 wt %"

In Column 54, Claim 18, Line 6, please delete "; and, wherein the halide material comprises a total content of one or more water insoluble impurity phase of less than 0.11 wt %"

In Column 54, Claim 19, Line 19, please delete "; and, wherein the halide material comprises a total content of one or more water insoluble impurity phase of less than 0.11 wt %"

In Column 54, Claim 20, Line 28, please delete "contnet" and insert --content--

In Column 54, Claim 20, Line 30, please delete "; and, wherein the halide material comprises a total content of one or more water insoluble impurity phase of less than 0.11 wt %"

Signed and Sealed this
Twelfth Day of August, 2025

Coke Morgan Stewart
*Acting Director of the United States Patent and Trademark Office*